(12) United States Patent
Mattox, Jr. et al.

(10) Patent No.: US 12,118,187 B2
(45) Date of Patent: Oct. 15, 2024

(54) SYSTEMS AND METHODS FOR PROVIDING TAB PREVIEWS VIA AN OPERATING SYSTEM USER INTERFACE

(71) Applicant: Microsoft Technology Licensing, LLC, Redmond, WA (US)

(72) Inventors: Gregory Thomas Mattox, Jr., Bellevue, WA (US); Ross Nathaniel Luengen, Redmond, WA (US); Rose Elizabeth Higgins, Redmond, WA (US); William Joseph Devereux, Redmond, WA (US); Jessica Mary Hallett-Hook, Seattle, WA (US); Laurent Etienne Gilbert Mouton, Bellevue, WA (US); Kyle Thomas Brady, Seattle, WA (US); Kenneth Martin Tubbs, Jr., Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/171,763

(22) Filed: Feb. 21, 2023

(65) Prior Publication Data
US 2024/0281119 A1   Aug. 22, 2024

Related U.S. Application Data

(63) Continuation of application No. 17/065,330, filed on Oct. 7, 2020, now Pat. No. 11,620,034.

(51) Int. Cl.
*G06F 3/048* (2013.01)
*G06F 3/0483* (2013.01)
*G06F 3/04842* (2022.01)

(52) U.S. Cl.
CPC ........ *G06F 3/0483* (2013.01); *G06F 3/04842* (2013.01); *G06F 2203/04803* (2013.01)

(58) Field of Classification Search
CPC .............. G06F 3/0483; G06F 3/04842; G06F 2203/04803
See application file for complete search history.

(56) References Cited

U.S. PATENT DOCUMENTS

2010/0107115 A1* 4/2010 Sareen .................... G06F 9/451
715/783
2011/0145744 A1* 6/2011 Haynes ................ G06Q 10/107
715/779

(Continued)

*Primary Examiner* — Thanh T Vu

(57) ABSTRACT

Embodiments described herein are directed to simultaneously displaying proxy windows for application windows and/or tabs included in such application windows via a graphical user interface of an operating system. For instance, an application programming interface (API) associated with an application that supports a tabbed document interface (TDI) provides information associated with each tab opened within an application window associated with the application. An API of the operating system receives and utilizes such information to generate and display a proxy window for each tab. The proxy windows for the tabs may be displayed alongside proxy windows of application windows for other applications. The proxy windows may be generated and displayed in response to user invocation of various features of the operating system graphical user interface, including, but not limited to, a task switcher feature, a taskbar feature, or a window snap feature.

20 Claims, 42 Drawing Sheets

(56) References Cited

U.S. PATENT DOCUMENTS

2015/0310585 A1\* 10/2015 Gupta ........................ G06T 7/11
              382/199
2017/0285894 A1\* 10/2017 Barrus ................ G06F 3/04842

\* cited by examiner

SYSTEMS AND METHODS FOR PROVIDING TAB PREVIEWS VIA AN OPERATING SYSTEM USER INTERFACE

CROSS-REFERENCE TO RELATED APPLICATIONS

This application is a continuation of U.S. patent application Ser. No. 17/065,330 filed on Oct. 7, 2020, entitled "Systems and Methods for Providing tab previews via an Operation System User Interface," which is incorporated herein by reference in its entirety. To the extent appropriate a claim of priority is made.

BACKGROUND

Operating systems offer various user interfaces that enable a user to quickly switch between different tasks or applications. In such interfaces, the user is provided a preview of each application window that is currently opened. However, this does not provide a full and accurate view of all the tasks that the user is working on. For instance, certain applications may use a tabbed document interface (TDI), which is a graphical interface that allows multiple documents or panels to be contained within a single application window. Each document or panel is accessible using a respective tab, which is selected to view the corresponding document or panel. When providing previews for application windows, operating systems limit the preview of a particular application window to what is currently displayed by an application window (i.e., the contents displayed in the last active tab). Accordingly, any document or panel included in an inactive tab remains hidden from the user. Thus, in order to switch to that tab, the user must first navigate to the application window, and subsequently select the desired tab.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for simultaneously displaying proxy windows for application windows and/or tabs (sub-views) included in such application windows via a graphical user interface of an operating system. For instance, an application programming interface (API) associated with an application that supports a tabbed document interface (TDI) provides information associated with each tab opened within an application window associated with the application. An API of the operating system receives and utilizes such information to generate and display a proxy window for each tab. The proxy windows for the tabs may be displayed alongside proxy windows of application windows for other applications. The proxy windows may be generated and displayed in response to user invocation of various features of the operating system graphical user interface, including, but not limited to, a task switcher feature, a taskbar feature, or a window snap feature.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
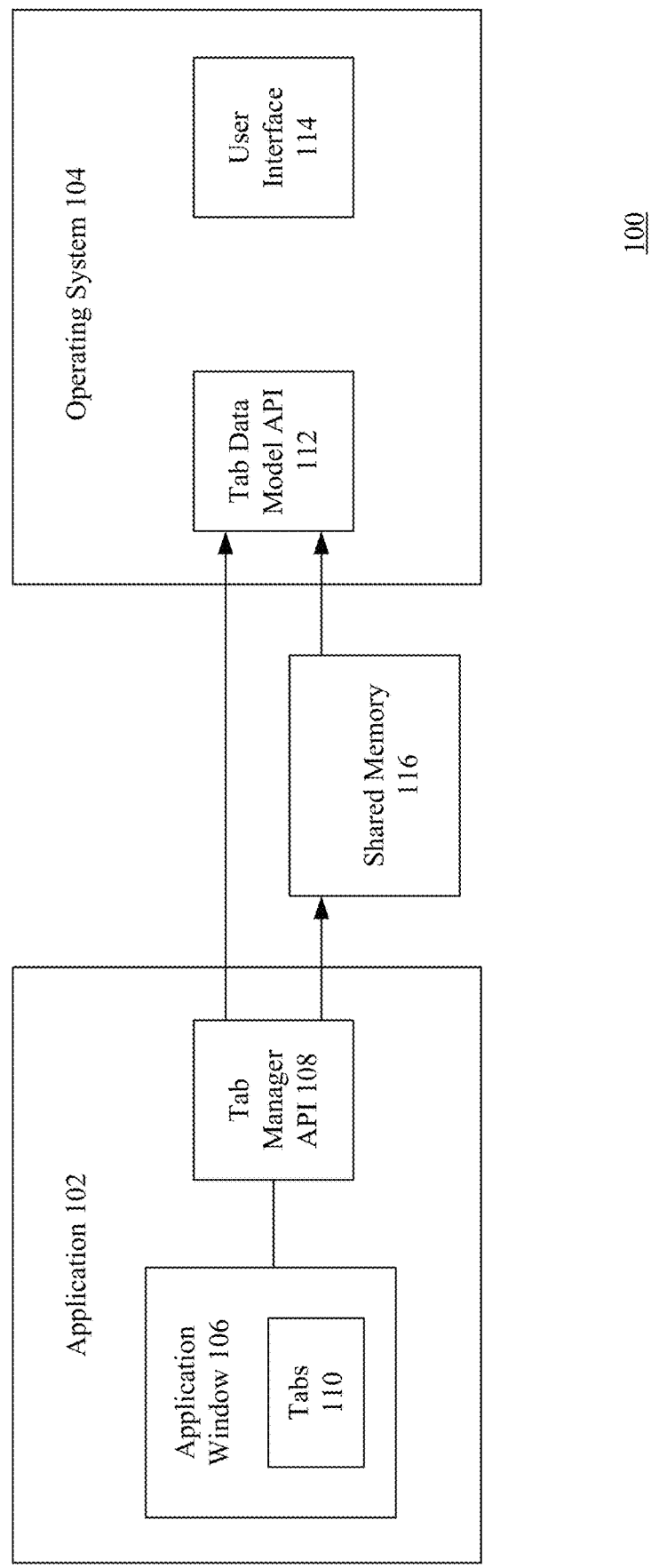
FIG. 1 shows a block diagram of a system for generating and displaying proxy windows for tabs via a graphical user interface of an operating system in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Applicants expressly disclaim any rights to any third-party trademarks or copyrighted images/text included in the figures. Such marks and images have been included for illustrative purposes only and constitute the sole property of their respective owners.

II. Example Embodiments

Embodiments described herein are directed to simultaneously displaying proxy windows for application windows and/or tabs (or sub-views) included in such application windows via a graphical user interface of an operating system. For instance, an application programming interface (API) associated with an application that supports a tabbed document interface (TDI) provides information associated with each tab opened within an application window associated with the application. An API of the operating system receives and utilizes such information to generate and display a proxy window for each tab. The proxy windows for the tabs may be displayed alongside proxy windows of application windows for other applications. The proxy windows may be generated and displayed in response to user invocation of various features of the operating system graphical user interface, including, but not limited to, a task switcher feature, a taskbar feature, or a window snap feature.

The techniques described herein advantageously improve a graphical user interface of an operating system, as the user interface provides an enhanced view of all the tasks being operated on by the user, rather than just the last task operated on. For instance, in an embodiment in which each tab presents Web-based content (e.g., a Web page, a Web application, etc.), a proxy window for each Web page and/or application is generated and displayed, thereby enabling a user to view all such Web pages or application and quickly switch to a particular Web page or application upon selection of its corresponding proxy window. In addition, the techniques described herein improve the functioning of a computing device. For instance, such techniques provide a more efficient user navigation means, which requires less user interaction with respect to the operating system's graphical user interface in order to switch to a particular task. Accordingly, a lesser amount of compute resources (e.g., input/output (I/O) operations, processor cycles, power, memory, etc.) are utilized when performing such operations.

For instance, FIG. 1 shows a block diagram of a system 100 for generating and displaying proxy windows for tabs via a graphical user interface of an operating system in accordance with an example embodiment. System 100 comprises an application 102, an operating system 104, and a shared memory 116. Application 102 may be any type of software application that provides a plurality of tabs, sub-views, or panels within a particular application window. Examples of such applications include, but are not limited to, a browser application (such as MICROSOFT® EDGE® published by Microsoft Corporation of Redmond, Washington), a spreadsheet application (such as MICROSOFT® EXCEL®, published by Microsoft Corporation), a flowchart/diagramming application (such as MICROSOFT® VISIO®, published by Microsoft Corporation), a remote desktop application (such as MICROSOFT® REMOTE DESKTOP™, published by Microsoft Corporation), etc. Operating system 104 may comprise one or more components that perform tasks relating to the execution of software application (e.g., application 102). Examples of operating system 104 include, but are not limited to, MICROSOFT® WINDOWS® Operating System (OS), published by Microsoft Corporation of Redmond, Washington, Apple macOS®, Google Android™, LINUX®, or other UNIX® variants. In accordance with an embodiment, both application 102 and operating system 104 execute locally on the same computing device (not shown). In accordance with another embodiment, each of application 102 and operating system 104 execute on a different computing device.

As also shown in FIG. 1, application 102 comprises an application window 106 and a tab manager application programming interface (API) 108. Application window 106 comprises a viewing area (generally, rectangular-shaped)

that is displayed via a graphical user interface (e.g., user interface 114) of operating system 104. Application window 106 displays the contents and/or a user interface (e.g., a graphical user interface) associated with application 102. As further shown in FIG. 1, application window 106 may comprise a tabbed document interface (TDI) in which documents, Web pages, spreadsheet etc., are displayed via a respective tab of tabs 110 within application window 106. Each tab of tabs 110 is user-selectable. Selection of a particular tab of tabs 110 causes the corresponding document, Web page, spreadsheet, etc., to be displayed within application window 106. For instance, in an embodiment in which application 102 is a browser application, each tab may display a particular Web page. In an embodiment in which application 102 is a spreadsheet application, each tab may display a particular spreadsheet. In an embodiment in which, application 106 is a flowchart/diagramming application, each tab may display a particular flowchart/drawing sheet. In an embodiment in which application 102 is a remote desktop application, each of tabs 110 may represent a particular application window of an application executing on a different computer and accessible via the remote desktop application. In accordance with such an embodiment, each of tabs 110 may be referred to as a sub-view, where each sub-view represents an application executing within the remote desktop application (i.e., a sub-application).

Tab manager API 108 is configured to share information associated with tabs 110 to operating system 104, which utilizes such information to integrate the tabs within the operating system 104. For instance, operating system 104 may utilize such information to intelligently provide a proxy (or preview) window representative of each of tabs 110 included in application window 106 (as opposed to only providing a proxy window for the last active tab (i.e., the tab that was last engaged with by a user) of tabs 110) with respect to various user interface features provided by operating system 104.

Tab manager API 108 may be instantiated for each application window (e.g., application window 106) opened for application 102 and may be associated with its corresponding application window using a window identifier (e.g., HWND) of the application window. Accordingly, each instantiated tab manager API 108 provides tab information with respect to the tabs opened within the application window for which tab manager API 108 is instantiated.

As also shown in FIG. 1, operating system 104 comprises at least one tab data model API 112 and a user interface 114. Operating system 104 may instantiate at least one tab data model API 112 for each instantiated tab manager API 108. For example, operating system 104 may instantiate a tab data model API 112 for each user experience (UX) surface supported by operating system 104. Tab data model API 112 may also be associated with the application window (e.g., application window 106) using the window identifier of the application window. Tab data model API 112 is configured to receive the tab information from the tab manager API associated therewith.

Examples of tab information, includes, but are not limited to, a number of the tabs 110 opened in application window 106, an identifier that uniquely-identifies the tab (i.e., a tab identifier), an icon representative of application 102 (e.g., the icon displayed by operating system 104 that a user interacts with to launch application 102), a title associated with each of the plurality of tabs (e.g., a title of a document, a title of a Web page, a title of a spreadsheet, a title of a drawing or flowchart, etc.), a thumbnail representative of the contents being displayed in each of tabs 110 (e.g., the contents of documents displayed via tabs 110, the contents and/or metadata/schema associated therewith of Web pages displayed via tabs 110, the contents of spreadsheets displayed via tabs 110, the contents of drawings or flowcharts displayed via tabs 110, etc.). The tab information may also include a uniform resource identifier, deep link, or any other identifier of Web pages displayed via tabs 110, an indication of a tab of tabs 112 that is currently active, a time stamp representative of a time at which each of tabs 110 is created, a time stamp representative of a time at which each of tabs 110 is activated (or was last activated).

In an embodiment in which application 102 is a browser application, the tab information may also include a group identifier that identifies a group in which a tab of tabs 110 is included. In one example, the group may be indicative of a domain (e.g., company or organization name) associated with a Web site displayed in a particular tab. Web pages associated with the same domain may have the same group identifier. For instance, Web pages associated with Amazon.com®, published by Amazon.com, Inc. of Seattle, Washington may each be associated with a first group identifier, and Web pages associated with YouTube.com®, published by YouTube, LLC of San Bruno, California, may each be associated with a second group identifier. In accordance with such an embodiment, the tab information may further comprise a favicon associated with a domain for each Web site displayed in tabs 110. A favicon comprises an icon associated with a particular Web site, which is representative of the domain (e.g., a company's logo) associated with the Web site. In another example, the group identifier identifies a category (e.g., work, personal, document, Web site, shopping, entertainment, etc.) or a user identity or profile to which a tab of tabs 110 belongs.

Tab manager API 108 may be configured to provide some or all of the tab information to operating system 104 via a memory shared between application 102 and operating system 104. For instance, tab manager API 108 may store some or all of the tab information in shared memory 116. Shared memory 116 may comprise a page file stored on a storage device of the computing device on which operating system 104 and/or application 102 execute. For instance, the page file may be memory mapped into the process of application 102 (thereby enabling application 102 to write the tab information thereto) and may be memory mapped into the process of operating system 104 (thereby enabling operating system 104 to read the tab information therefrom).

After tab manager API 108 stores the tab information to shared memory 116, tab manager API 108 may provide a notification event to tab data model API 112. Responsive to receiving the notification event, tab data model API 112 may retrieve the tab information from shared memory 116.

In accordance with an embodiment, tab manager API 108 is configured to provide the notification after expiration of a predetermined period of time. For instance, tab manager API 108 may utilize a timer. The timer may be reset each time a change is made with respect to a tab (e.g., each time a new Web page, document, spreadsheet, etc., is loaded in a tab, each time a new tab is opened, each time a tab is closed, etc.). Upon expiration of the predetermined period of time (meaning that no activity has occurred with respect to tabs 110 displayed via application window 106), tab manager API 108 provides the notification. This ensures that tab data model API 112 is provided with tab information reflective of the current state of tabs 110 (i.e., tab data model API 112 is not provided with stale tab information). The foregoing techniques advantageously batch changes associated with tabs 110 to avoid committing updates too frequently to shared memory 116. By doing so, the input/output (I/O) transactions to shared memory 116 are reduced, thereby improving the performance of system 100.

In accordance with an embodiment, certain tab information is not stored in shared memory 116, but instead, is provided directly to tab data model API 112. For instance, the thumbnails, icons, favicons, and/or group identifier associated with each of tabs 110 may be provided directly to tab data model API 112. For example, responsive to receiving the notification, tab data model API 112 provides a request to tab manager API 108. The request specifies the requested tab information (e.g., the thumbnails, icons, favicons and/or group identifier) that is to be provided to tab data model API 112. Responsive to receiving the request, tab manager API 108 requests and obtains the requested tab information from application 102 and provides the requested tab information to tab data model API 112.

The request may further specify one or more dimensions of the thumbnails to be provided. For instance, tab data model API 112 identifies the application window (i.e., application window 106) in which tabs 110 are located using the handle associated with tab manager API 108 and tab data model API 112. Tab data model API 112 determines dimension(s) associated with application window 106 (e.g., the height and width) and includes the dimension(s) in the request to tab manager API 108. Tab manager API 108 provides the dimension(s) to application 102, and application 102 generates a thumbnail for each of tabs 110 in accordance with the dimension(s) and provides the thumbnails to tab manager API 108, which in turn, provides the thumbnail(s) to tab data model API 112. In accordance with an embodiment, tab data model API 112 may also provide a scale factor in the request, which application 102 utilizes to size the thumbnails such that each of the thumbnails are proportional to the contents (e.g., Web page, spreadsheet, drawing, etc.) displayed in application window 106. For instance, if the dimensions of the contents displayed via application window are 300 pixels by 500 pixels, and the scale factor is 1:5, application 102 scales the contents in accordance to the scale factor to generate a thumbnail having the dimensions 60 pixels by 100 pixels. In accordance with another embodiment, tab manager API 108 provides the contents to tab data model API 112 in its original form and tab data model API 112 scales the contents to generate the thumbnails.

User interface 114 may comprise an operating system shell and/or one or more graphical user interface features of operating system 104. User interface 114 may comprise a plurality of different user-interactable elements or features, such as a desktop, a taskbar, a task switcher, an application window manager, etc. Such elements or features may also be referred to as UX surfaces. User interface 114 may utilize the tab information retrieved by tab data model API 112 to generate and provide a proxy (or preview) window representative of each of tabs 110 included in application window 106 via various user-interactable features. Subsection A below describes embodiments for generating and providing proxy windows via a task switcher feature of user interface 114. Subsection B below describes embodiments for generating and providing proxy windows via a taskbar feature of user interface 114. Subsection C below describes embodiments for generating and providing proxy windows via a window snap feature of user interface 114. Subsection D below describes embodiments for generating and providing proxy windows with respect to a remote desktop application.

A. Task Switcher Feature for Displaying Proxy Windows for Tabs

As described above with reference to FIG. 1, user interface 114 may comprise a task switcher feature. The task switcher feature, when activated, causes the operating system to simultaneously display each of the applications that are currently executing on the user's device. In particular, the operating system displays a proxy window for each application window that is opened (whether it is minimized or maximized) for each application that is currently executing. As will be described below, if an application window comprises a plurality of tabs, a separate proxy window will be displayed for each of the plurality of tabs. The foregoing features will now be described with reference to example GUI screens 200A-200G, as shown in FIGS. 2A-2G.

Figure 2A:
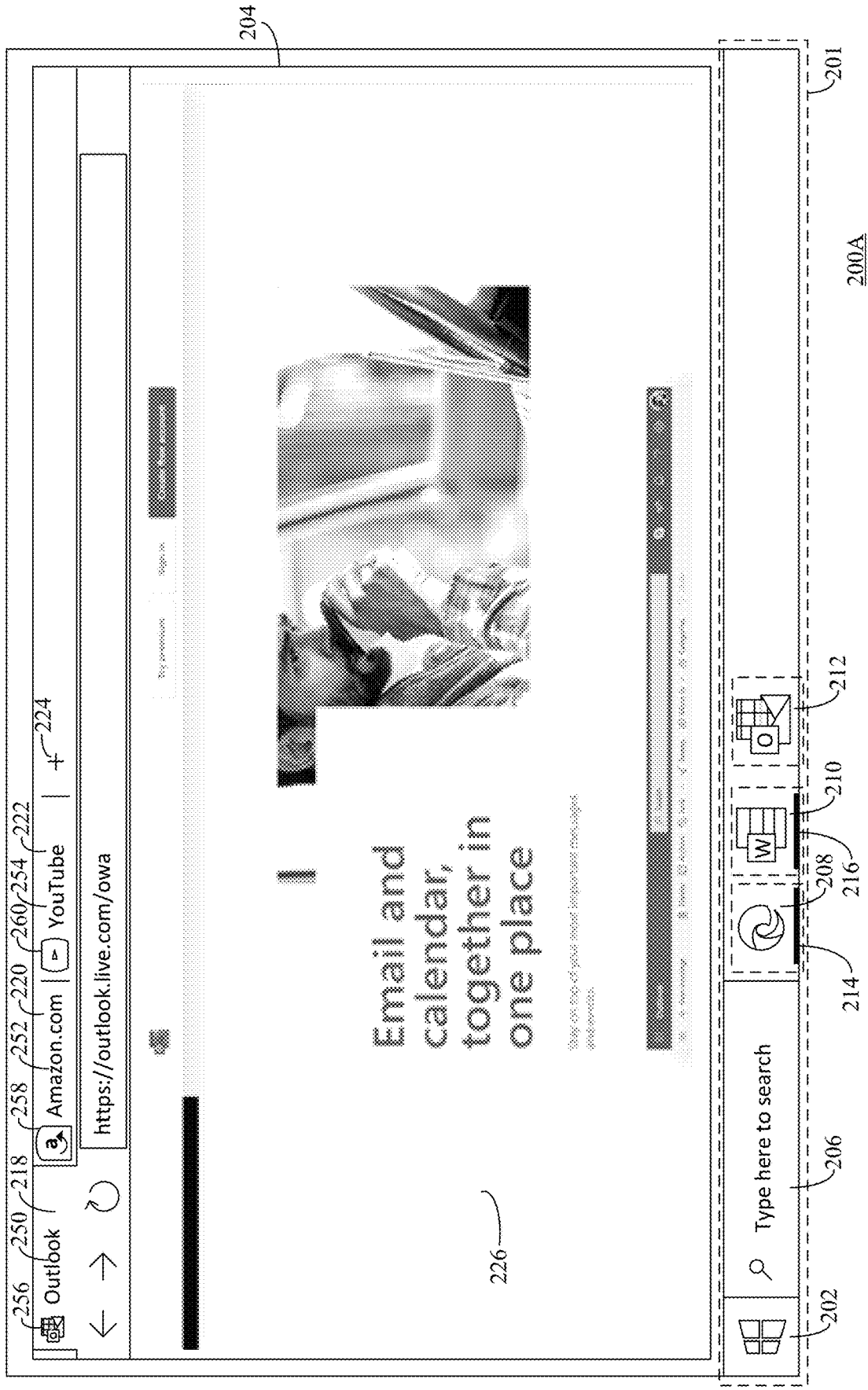
FIGS. 2A-2G depict example GUI screens that illustrate the use of a task switcher feature to display and manipulate proxy windows for tabs in accordance with example embodiments.

FIGS. 2A-2G depict example GUI screens that illustrate the use of a task switcher feature to display and manipulate proxy windows for tabs in accordance with example embodiments. For instance, FIG. 2A depicts an example GUI screen 200A in accordance with an example embodiment. As shown in FIG. 2A, GUI screen 200A comprises a taskbar user interface (or "taskbar") 201 and an application window 204. Application window 204 is an example of application window 106, as described above with reference to FIG. 1. Taskbar 201 comprises a start menu user interface element 202, a search bar user interface element 206, and a plurality of application icons 208, 210, and 212. Each of user interface elements, 204, 206, 208, 210, and 212 are user-interactable. A user may provide input, for example, via a mouse, keyboard, touch screen, etc., to activate each of user interface elements 204, 206, 208, 210, and 212. When activated, each of user interface elements 204, 206, 208, 210, and 212 perform a particular action.

For instance, start menu user interface element 204, when activated, causes a menu to be displayed that provides a listing of the applications installed on the user's computing device. Search bar user interface element 206, when activated, enables the user to enter a text-based search query, which, when executed, searches for applications installed on the computing device, documents stored on the computing device, etc. Application icon 208, when activated, causes an application corresponding to application icon 208 to be launched and executed. Application icon 210, when activated, causes an application corresponding to application icon 210 to be launched and executed. Application icon 212, when activated, causes an application corresponding to application icon 212 to be launched and executed. In the example shown in FIG. 2, application icon 208 corresponds to a web browser application (e.g., Microsoft® Edge®, published by Microsoft Corporation), application icon 210 corresponds to a word processing application (e.g., Microsoft® Word®, published by Microsoft Corporation, and application icon 212 corresponds to an e-mail client application (e.g., Microsoft® Outlook®, published by Microsoft Corporation).

As further shown in FIG. 2A, application icons 210 and 212 are associated with a user interface element 214 and 216, respectively. User interface element 214, when visible, indicates that the browser application associated with application icon 208 is executing on the computing device. Similarly, user interface element 216, when visible, indicates that the word processing application associated with application icon 210 is executing on the computing device. As indicated by GUI screen 200A, the e-mail client application corresponding to application icon 212 is not executing, as a corresponding user interface element is not displayed therefor.

Application window 204 is associated with the browser application corresponding to application icon 208. As shown in FIG. 2A, application window 204 comprises three tabs 218, 220, and 222 that are opened within application window 204. Tabs 218, 220, and 222 are examples of tabs 110, as described above with reference to FIG. 1. Additional tabs may be opened via user interaction with user interface element 224. Tab 218 has a first Web site opened (i.e., www.outlook.com), tab 220 has a second Web site opened (i.e., www.amazon.com), and tab 222 has a third Web site opened (i.e., www.youtube.com). In the example shown in FIG. 2A, tab 218 is active, and therefore, the contents of Web site (shown as Web site 226) opened in tab 218 is displayed in application window 204. A user may cause application window 204 to display the contents of the second Web site by selecting tab 220 and may cause application window 204 to display the contents of the third Web site by selecting tab 222. Each of tabs 218, 220, and 222 also display a title and a favicon associated with the Web site displayed therein. For instance, tab 218 displays a title 250 and a favicon 256 associated with the Web site displayed therein, tab 220 displays a title 252 and a favicon 258 associated with the Web site displayed therein, and tab 222 displays a title 254 and a favicon 260 associated with the Web site. The application window(s) opened for the word processing application corresponding to application icon 208 are minimized, and therefore, are not displayed. It is noted that while FIGS. 2A-2G depict tabs 218, 220, and 222 as being flat (i.e., a single tab for a single Web site), the embodiments described herein are not so limited. For instance, each of tabs 218, 220, and 222 may be configured to group a plurality of Web sites (e.g., by domain name, tab creation time, tab activation time, or any other grouping technique).

The operating system (e.g., operating system 104, as shown in FIG. 1) is configured to detect user input that causes the operating system to activate the task switcher user interface. Upon detection of such user input, the operating system presents a task switcher user interface that simultaneously displays each opened application windows and each opened tab in a respective proxy window. In accordance with an embodiment, the user input comprises an interaction with one or more keys. In one example, the one or more keys may be a combination of two keys, such 'Alt' and 'Tab'. In such an example, the task switcher user interface is activated upon the operating system detecting a user pressing both the 'Alt' and 'Tab' keys. It is noted that this combination of keys is purely exemplary and that a combination of one or more other keys may be utilized to activate the task switcher user interface. In accordance with another embodiment, the user input comprises a selection of a user interface element presented by the operating system (e.g., a button, slider, etc.) that, when selected, causes the operating system to display the task switcher user interface.

Figure 2B:
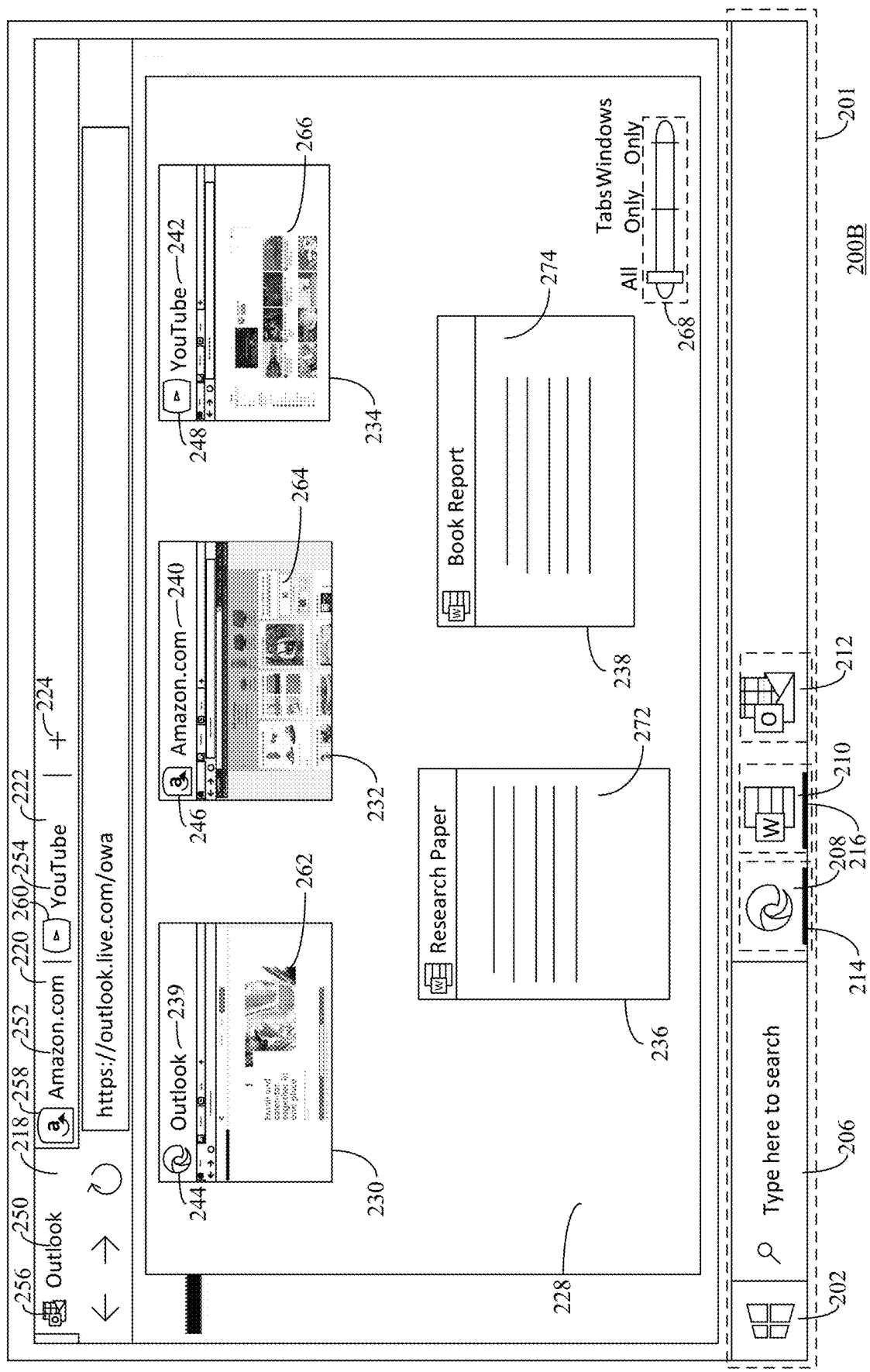

FIG. 2B depicts an example GUI screen 200B in which a task switcher feature 228 has been activated in accordance with an embodiment. As shown in FIG. 2B, task switcher feature 228 comprises a GUI window that simultaneously displays a plurality of proxy windows 230, 232, 234, 236, and 238. In the example shown in FIG. 2B, proxy window 230 displays the contents of tab 218 (i.e., Web page 226), proxy window 232 displays the contents of tab 220 (i.e., the Web page displayed in tab 220), and proxy window 234 display the contents of tab 222 (i.e., the Web page displayed in tab 222). Proxy window 236 displays the contents of a first application window (not shown) of the word processing application associated with application icon 210, and proxy window 238 displays the contents of a second application window (not shown) of the word processing application associated with application icon 210.

The manner in which proxy windows 230, 232, and 234 are displayed is in accordance with the tab information received via the browser application (e.g., application 102), as described above with reference to FIG. 1. For instance, responsive to receiving the tab information for tabs 218, 220, and 222, the operating system analyzes the tab information to determine a title to display for each of proxy windows 230, 232, and 234, an application icon to display for each of proxy windows 230, 232, and 234, a favicon to display for each of proxy windows 230, 232, and 234, and/or a thumbnail to display for each of proxy windows 230, 232, and 234.

In the example shown in FIG. 2B, task switcher feature 228 displays a title 239 ("Outlook") for proxy window 230, a title 240 ("Amazon.com") for proxy window 232, and a title 242 ("YouTube") for proxy window 234. Title 239 corresponds to title 250, title 240 corresponds to title 252, and title 242 corresponds title 254.

Task switcher feature 228 further displays a favicon 244 for proxy window 230, a favicon 246 for proxy window 232, and a favicon 248 for proxy window 234. Favicon 244 corresponds to favicon 256, favicon 246 corresponds favicon 258, and favicon 248 corresponds to favicon 260.

Task switcher feature 228 also displays a thumbnail representative of the contents displayed in each of tabs 218, 220, and 222 for each of proxy windows 230, 232, and 234. For instance, task switch feature 228 displays a thumbnail 262 for proxy window 230, a thumbnail 264 for proxy window 232, and a thumbnail 266 for proxy window 234. Thumbnail 262 corresponds to the Web site displayed in tab 218, thumbnail 264 corresponds to the Web site displayed in tab 220, and thumbnail 266 corresponds to the Web site displayed in tab 222. Each of thumbnails 262, 264, and 266 maintain the same aspect ratio utilized when displaying the corresponding contents via application window 204. That is, thumbnail 262 is proportional to the corresponding contents displayed via tab 218 of application window 204, thumbnail 264 is proportional to the corresponding contents displayed via tab 220 of application window 204, and thumbnail 266 is proportional to the corresponding contents displayed via tab 222 of application window 204.

In accordance with an embodiment, task switcher feature 228 further comprises a user interface element 268 that enables a user to select whether only proxy windows representative of tabs are to be displayed, whether only proxy windows representative of application windows not utilizing a TDI are to be displayed, or whether both proxy windows representative of tabs and application windows not utilizing a TDI are to be displayed. In the example shown in FIG. 2B, user interface element 268 comprises a slider-based user interface element comprising three positions, although the embodiments described herein are not so limited. As shown in FIG. 2B, the slider is in the first position ("All"), which causes both proxy windows representative of tabs and application windows to be displayed. A user may move the slider to the second position ("Tabs Only") or the third position ("Windows Only") by sliding the slider to such positions.

Figure 2C:
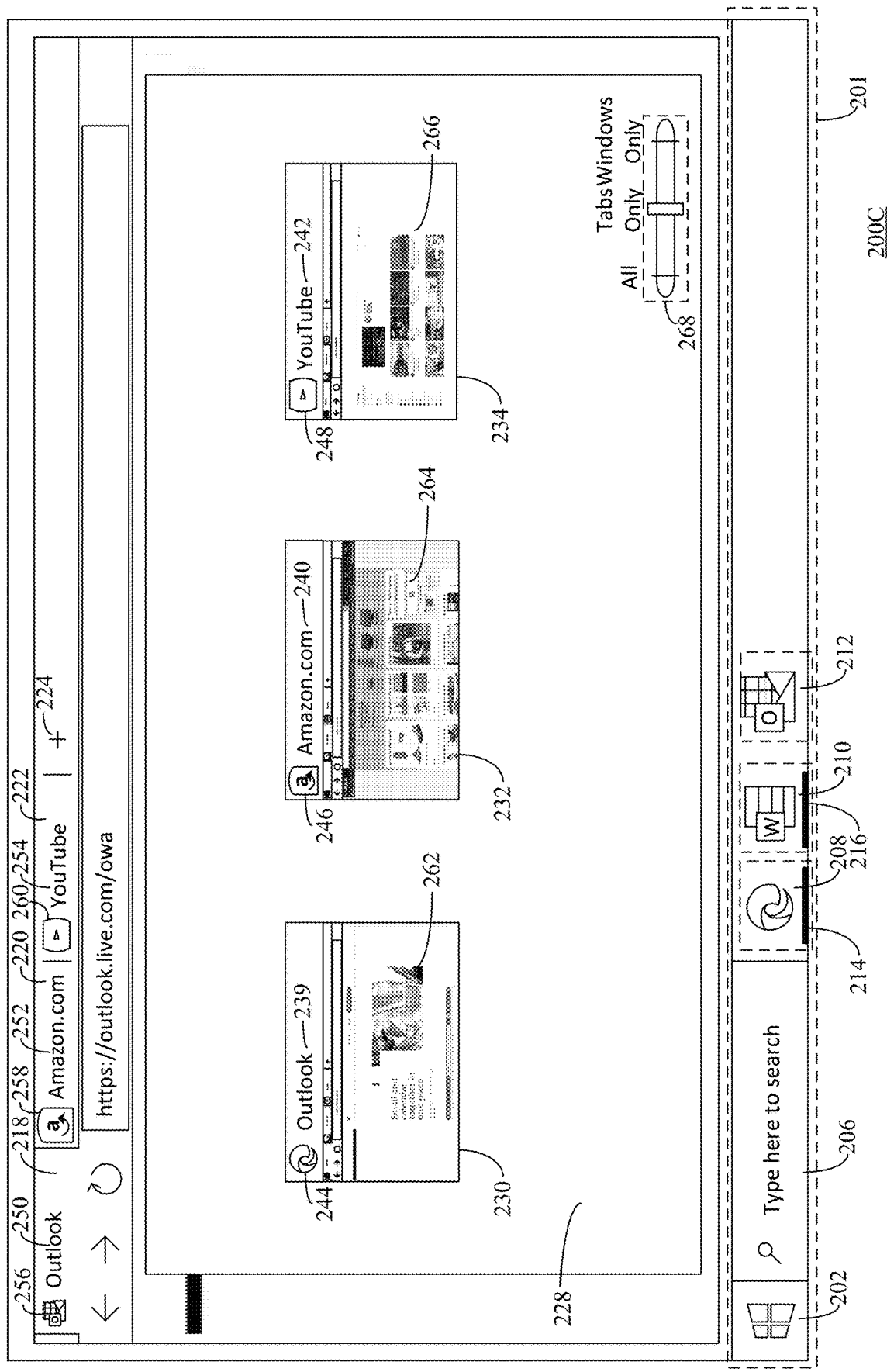

For instance, FIG. 2C depicts a task switcher feature 228 in which the slider of user interface element 268 is in the second position. Responsive to detecting that the slider has been placed in the second position, the operating system causes the proxy windows corresponding to application windows not utilizing a TDI (e.g., proxy windows 236 and 238) to be hidden while the proxy windows corresponding to tabs of an application window (e.g., proxy windows 230, 232, and 234) to be maintained. As shown in FIG. 2C, only proxy windows 230, 232, and 234 are displayed, while proxy windows 236 and 238 are no longer displayed.

Figure 2D:
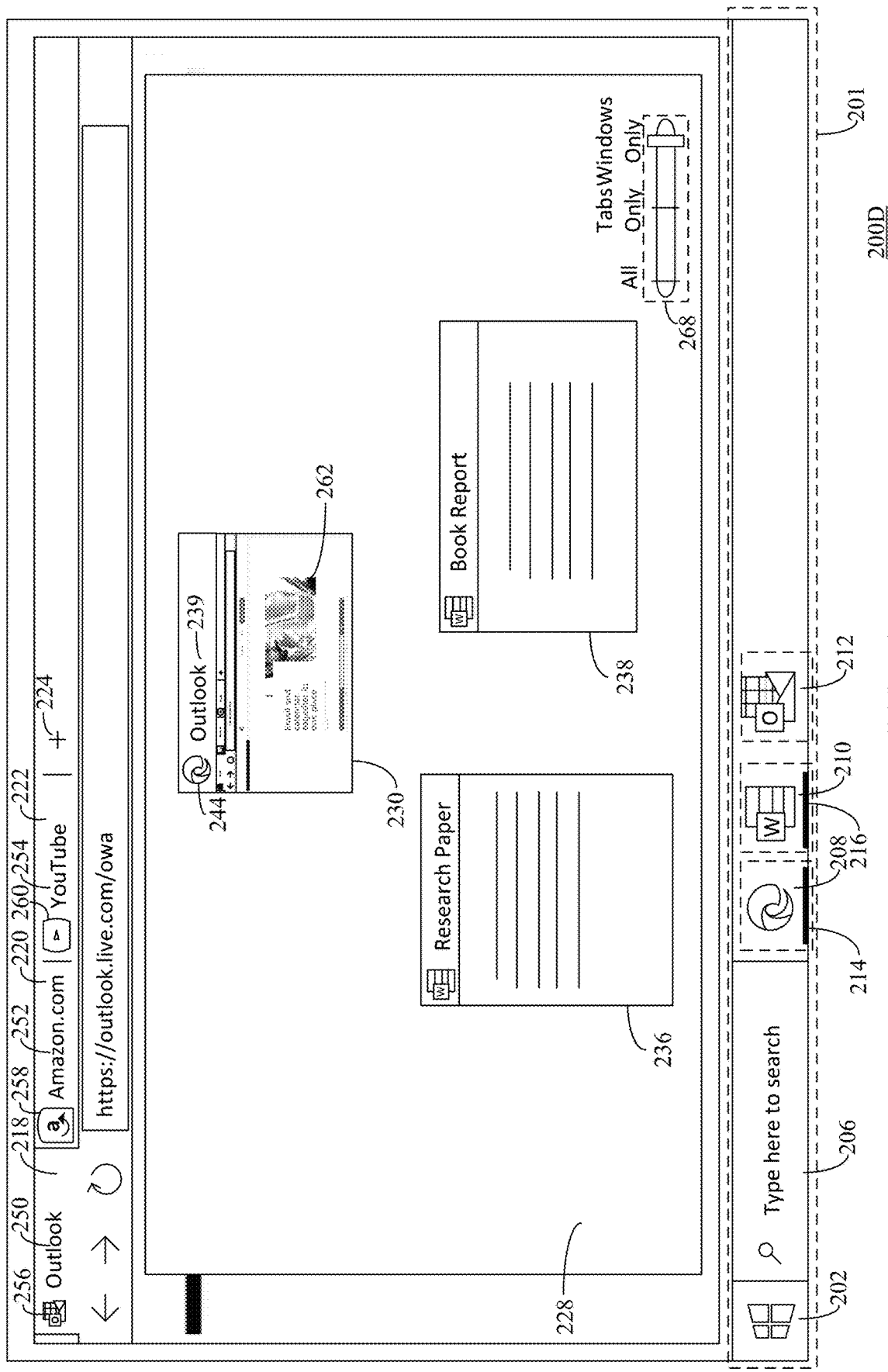

FIG. 2D depicts a task switcher feature 228 in which the slider of user interface element 268 is in the third position. Responsive to detecting that the slider has been placed in the third position, the operating system causes the proxy windows corresponding to tabs of an application that are not currently active (e.g., proxy windows 232 and 234) to be hidden while the proxy windows corresponding to application windows not utilizing a TDI (e.g., proxy windows 236 and 238) and a proxy window representative of the last active tab of application window 204 (i.e., proxy window 230) to be displayed. As shown in FIG. 2D, only proxy windows 230, 236 and 238 are displayed, while proxy windows 232 and 234 are no longer displayed.

Figure 2E:
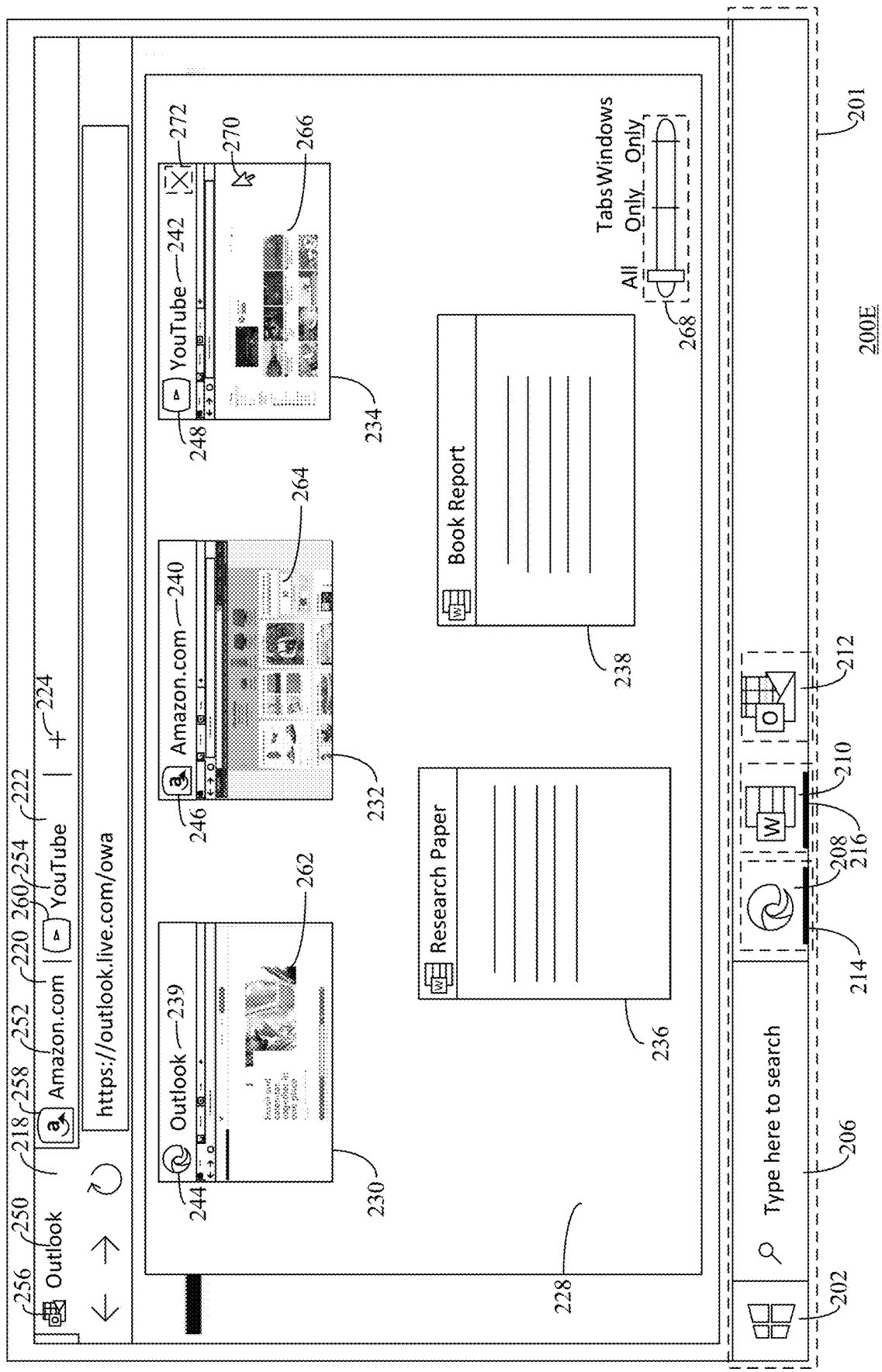
Figure 2F:
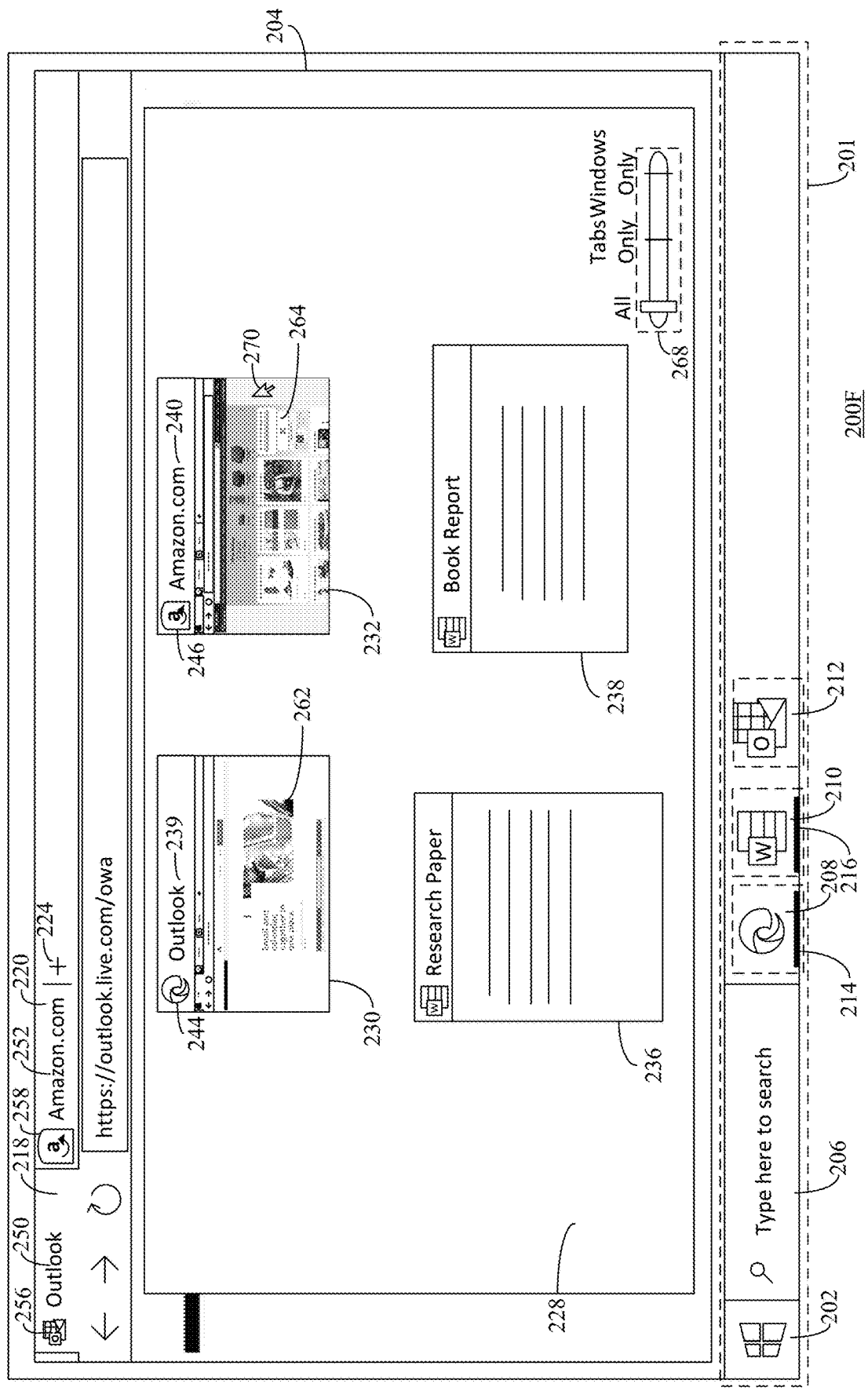

In accordance with an embodiment, a user is enabled to close opened application windows and/or tabs via task switcher feature 228. For instance, as shown in FIG. 2E, a user may select a proxy window to close, for example, by hovering a cursor 270 over the proxy window (e.g., proxy window 234). Upon doing so, a user-interactable element 272 may be displayed proximate to the proxy window. User-interactable element 272, when selected by the user, closes the proxy window and the application window or tab corresponding thereto. For instance, in the example shown in FIG. 2E, a user may select user-interactable element 272 to close proxy window 234. Referring to FIG. 1, responsive to operating system 104 detecting user input with respect to user-interactable element 272, tab data model API 112 may send a command to tab manager API 108 to close the corresponding tab. The command may comprise an identifier of the proxy window (e.g., a tab identifier or the title of the proxy window). Responsive to receiving the command, application 102 identifies the corresponding tab based on the identifier and closes the tab. As shown in FIG. 2F, responsive to selecting user-interactable element 272, both proxy window 234 and tab 222 are closed and no longer displayed.

Figure 2G:
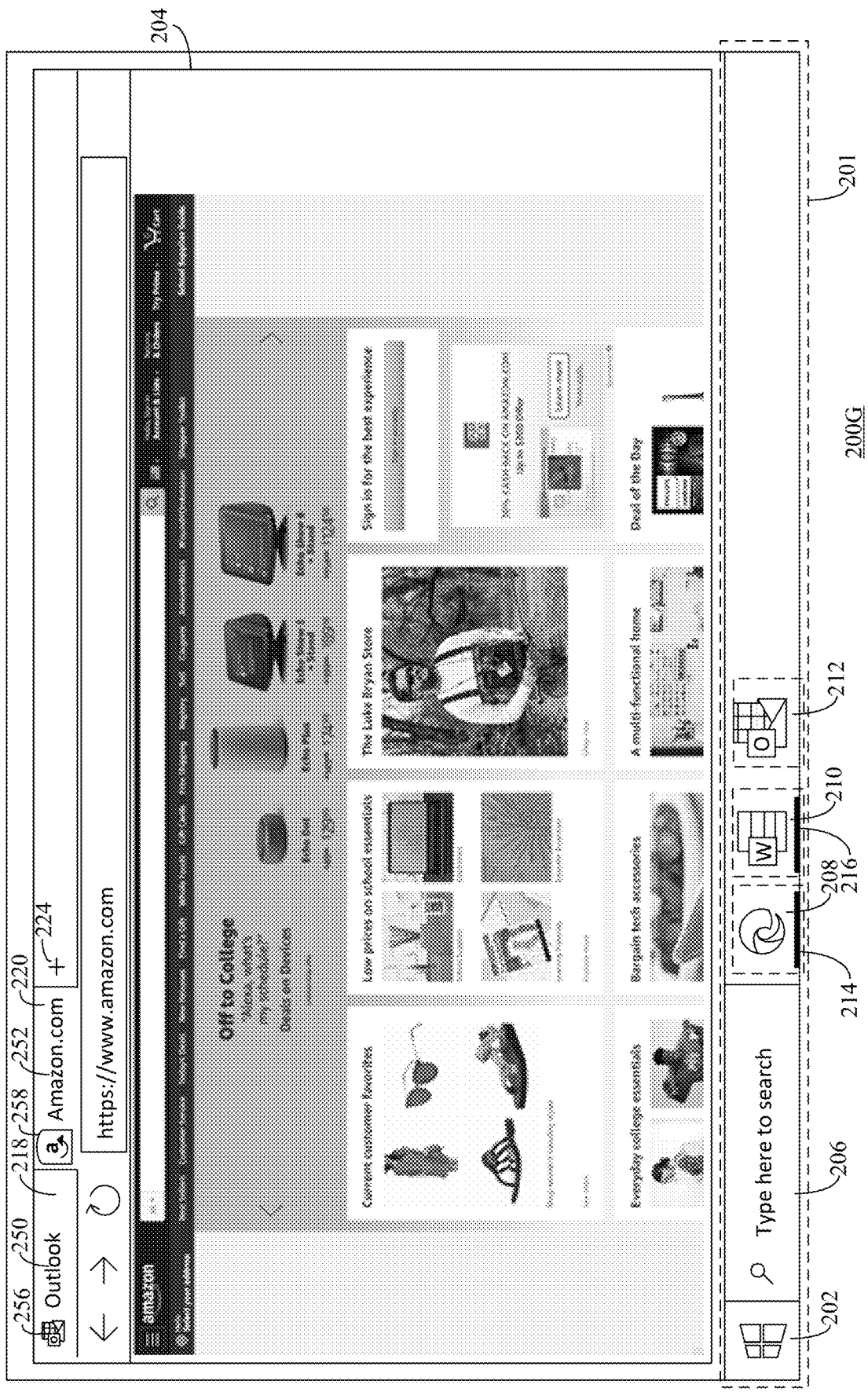

In accordance with an embodiment, a user is enabled to switch tabs utilizing task switcher feature 228. For instance, referring again to FIG. 2F, a user may select a proxy window corresponding to an open tab, for example, by clicking on the proxy window (e.g., proxy window 232) Upon selecting the proxy window, task switcher feature 228 is no longer displayed and application window 204 switches to the tab corresponding to the selected proxy window. For instance, in the example shown in FIG. 2F, a user selects proxy window 232. Referring to FIG. 1, responsive to operating system 104 detecting user input that selects proxy window 232, tab data model API 112 may send a command to tab manager API 108 that comprises an identifier of the selected proxy window (e.g., a tab identifier or title of the proxy window). Responsive to receiving the command, application 102 identifies the corresponding tab using the identifier and switches to tab 220, as tab 220 corresponds to selected proxy window 232. As shown in FIG. 2G, tab 220 is now active and the contents of the Web page loaded via tab 220 is displayed in application window 204.

Figure 3:
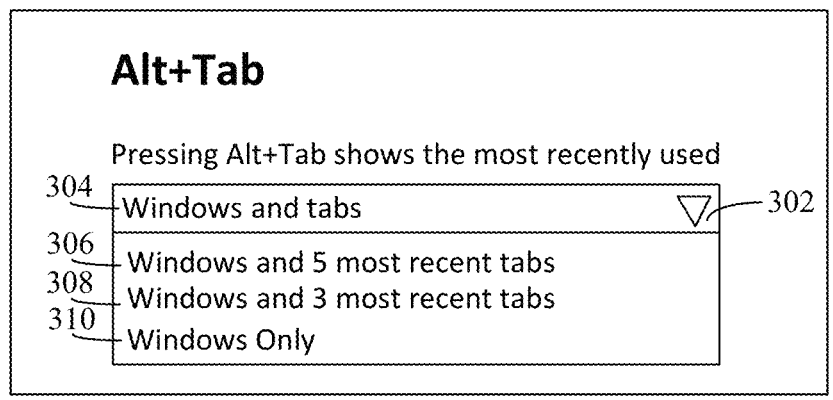
FIG. 3 depicts an example GUI menu that enables a user to designate a number of most recent tabs to be displayed via proxy windows when a task switcher feature is activated in accordance with an example embodiment.

In accordance with an embodiment, a user is enabled is designate the number of most recent tabs to be displayed via proxy windows. For instance, the operating system may comprise an option or setting to make this designation. For instance, FIG. 3 depicts an example GUI menu that enables a user to designate a number of most recent tabs to be displayed via proxy windows when a task switcher feature is activated in accordance with an example embodiment. As shown in FIG. 3, GUI-based menu 300 comprises a pull-down menu 302. Pull-down menu 302 comprises a plurality of user-selectable options 304, 306, 308, and 310. User-selectable option 304, when activated, causes the task switcher user interface (e.g., task switcher feature 228) to display proxy windows (e.g., proxy windows 230, 232, 234, 236, and 238) representative for each opened application window (not utilizing a TDI) and each tab opened in application windows utilizing a TDI. User-selectable option 306, when activated, causes the task switcher user interface (e.g., task switcher feature 228) to display proxy windows representative for each opened application window (not utilizing a TDI) and the five most recent (or active) tabs opened in each application windows utilizing a TDI, or alternatively, the five most recent tabs opened across all application windows utilizing a TDI. User-selectable option 308, when activated, causes the task switcher user interface (e.g., task switcher feature 228) to display proxy windows representative for each opened application window (not utilizing a TDI) and the three most recent (or active) tabs opened in each application windows utilizing a TDI, or alternatively, the three most recent tabs opened across all application windows utilizing a TDI. User-selectable option 310, when activated, causes the task switcher user interface (e.g., task switcher feature 228) to display proxy windows representative for each opened application window only. For application windows utilizing a TDI, a proxy window is displayed representative of the most recent tab in those application windows.

It is noted that GUI-based menu 300 are purely exemplary and that GUI-based menu 300 may be implemented using other types of user-interactable GUI elements (e.g., buttons, sliders, etc.). It is further noted that the options and settings included in GUI-based menu 300 are purely exemplary and that GUI-based menu 300 may specify different options or settings (e.g., that specify different values for the most recent tabs to be displayed via the task switcher user interface).

Figure 4:
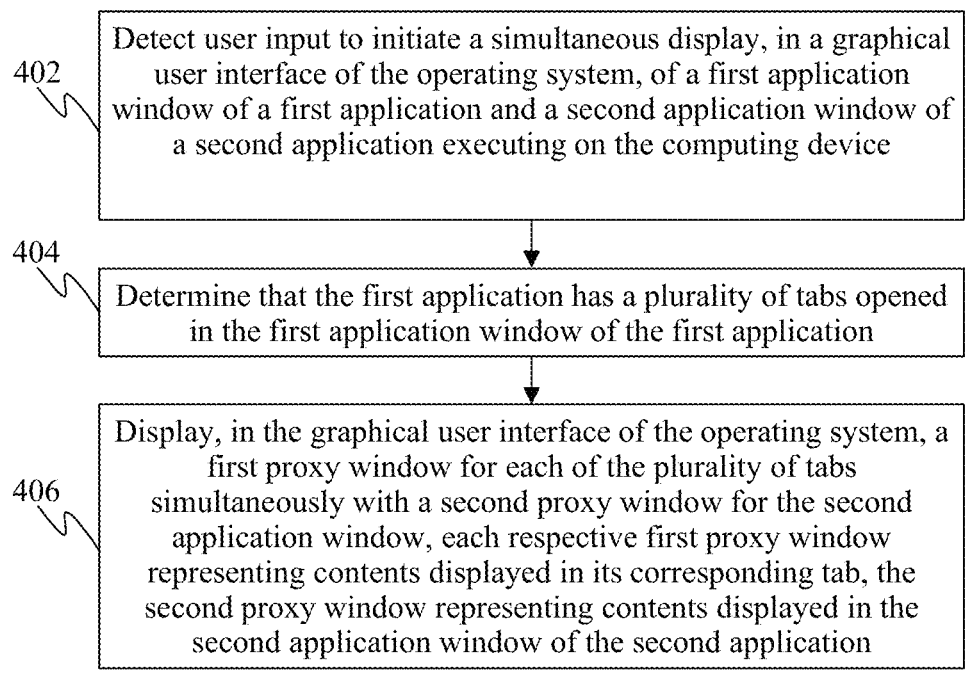
FIG. 4 shows a flowchart of a method performed by an operating system executing on a computing device to simultaneously display proxy windows for application windows and tabs included in application windows in accordance with example embodiment.
Figure 5:
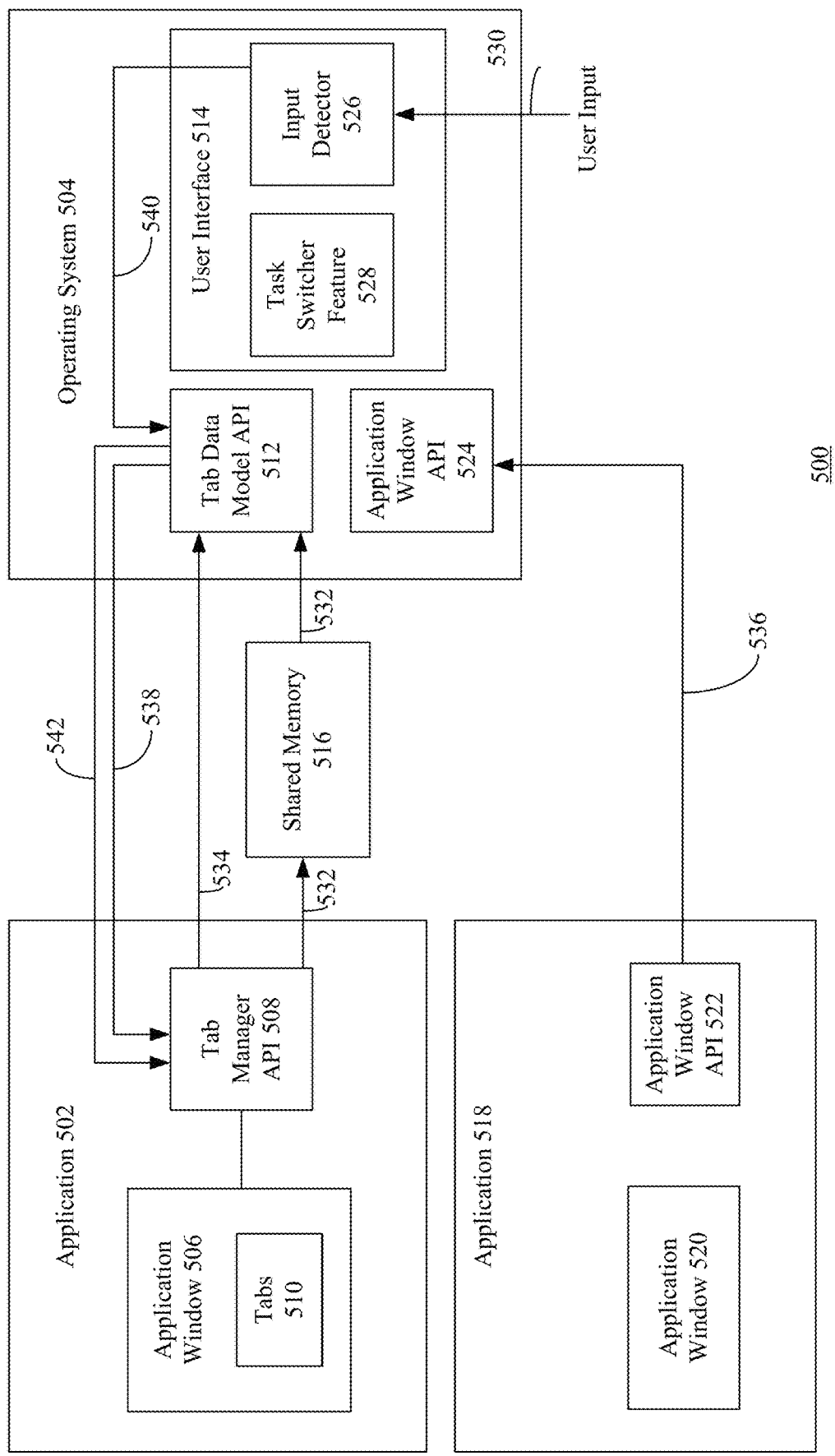
FIG. 5 shows a block diagram of a system for simultaneously displaying proxy windows for application windows and tabs included in application windows in accordance with an example embodiment.

Accordingly, proxy windows for application windows and tabs included in application windows may be simultaneously displayed in many ways. For example, FIG. 4 shows a flowchart 400 of a method performed by an operating system executing on a computing device to simultaneously display proxy windows for application windows and tabs included in application windows in accordance with example embodiment. In an embodiment, flowchart 400 may be implemented by system 500, as described in FIG. 5. FIG. 5 shows a block diagram of a system 500 for simultaneously displaying proxy windows for application windows and tabs included in application windows in accordance with an example embodiment. As shown in FIG. 5, system 500 includes a first application 502, a second application 518, an operating system 504, and a shared memory 516. Application 502, operating system 504, and shared memory 516 are examples of application 102, operating system 104, and shared memory 116, as respectively described above with reference to FIG. 1. Application 502 comprises an application window 506 and a tab manager API 508. Application window 506 comprises a plurality of tabs 510. Application window 506 is an example of application window 106 and application window 204, as respectively described above with reference to FIGS. 1 and 2. Tabs 510 are examples of tabs 110 and tabs 218, 220, and 222, as respectively described above with reference to FIGS. 1 and 2A-2G. Tab manager API 508 is an example of tab manager API 108, as described above with reference to FIG. 1. Operating system 504 comprises a tab data model API 512, user interface 514, and an application window API 524. Tab data model API 512 and user interface 514 are examples of tab data model API 112 and user interface 114, as respectively described above with reference to FIG. 1. User interface 514 comprises an input detector 526 and a task switcher feature 528. Task switcher feature 228 is an example of task switcher feature 228, as described above with reference to FIGS. 2A-2G. Application 518 comprises an application window 520 and an application window API 522. Application 518 may be any software application not utilizing a TDI, although the embodiments described herein are not so limited. Other structural and operational embodiments will be apparent to persons skilled in the relevant art(s) based on the following discussion regarding flowchart 400 and system 500.

Flowchart 400 of FIG. 4 begins with step 402. In step 402, user input is detected to initiate a simultaneous display, in a graphical user interface of the operating system, of a first application window of a first application and a second application window of a second application executing on the computing device. For example, with reference to FIG. 5, input detector 526 detects user input 530 that initiates task switcher UI 526, which is configured to simultaneously display proxy windows for opened application windows and tabs. Input detector 526 is configured to detect various types of user input, e.g., touch screen input, mouse input, keyboard input, stylus input, etc.

In accordance with one or more embodiments, user input 530 comprises an interaction with one or more keys. In one example, the one or more keys may be a combination of two keys, such 'Alt' and 'Tab'. In such an example, task switcher feature 528 is activated upon input detector 526 detecting a user pressing both the 'Alt' and 'Tab' keys. It is noted that this combination of keys is purely exemplary and that a combination of one or more other keys may be utilized to activate task switcher feature 528. In accordance with another embodiment, user input 530 comprises a selection of a user interface element (e.g., a button, slider, etc.) that, when selected, causes operating system 504 to display the task switcher user interface.

At step 404, a determination is made that the first application has a plurality of tabs opened in the first application window of the first application. For example, with reference to FIG. 5, tab data model API 512 determines that first application 502 has a plurality of tabs 510 opened in first application window 506. Tab data model API 512 may determine that first application 502 has a plurality of tabs 510 opened in application window 506 based on tab information received via tab manager API 508

In accordance with one or more embodiments, tab manager API 508 may provide tab information (shown as tab information 532) to shared memory 516. Tab manager API 508 may further provide a notification 534 to tab data model API 512 indicating that tab information 532 has been stored in shared memory 516. Responsive to receiving notification 534, tab data model API 512 retrieves tab information 532 from shared memory 516.

In accordance with one or more embodiments, tab information 532 comprises characteristic(s) of tabs 510. Such characteristic(s) include, but are not limited, a number of tabs 510 opened in first application window 506, a tab identifier that uniquely identifies each of tabs 510, an icon representative of first application 502, a group identifier for each of tabs 510, a title associated with each of tabs 510, a thumbnail representative of the contents displayed for each of tabs 510, an indication of a most recently-active tab of tabs 510, a time stamp representative of a time at which each of tabs 510 was created, or an indication of a most recently-active tab of tabs 510, a time stamp representative of a time at which each of tabs 510 was last active. Tab data model API 512 may determine that a plurality of tabs 510 are opened in application window 506 based on the number of tabs 510, tab identifiers, and/or title received via tab information 532.

It is noted that certain tab information may be received directly from tab manager 508 rather than from shared memory 516. For example, the thumbnails and/or icons may be provided directly from tab manager API 508, and therefore, tab manager API 508 may not store the thumbnails and/or icons in shared memory 516.1

At step 406, responsive to detecting the user input and determining that the first application has the plurality of tabs opened in the first application window of the application, a respective first proxy window for each of the plurality of tabs is displayed, in the GUI of the operating system, simultaneously with a second proxy window for the second application window, each respective first proxy window representing contents displayed in its corresponding tab, the second proxy window representing contents displayed in the second application window of the second application. For example, with reference to FIGS. 2B and 5, operating system 504 causes task switcher feature 528 (or task switcher feature 228) to display a respective first proxy window (proxy windows 230, 232, and 234) for each of tabs 218, 220, and 222 simultaneously with a second proxy window (e.g., proxy windows 236 or 238) for second application window 520. Proxy window 230 represents the contents displayed in tab 218 (i.e., Web site 226, as shown in FIG. 2A), proxy window 232 represents the contents displayed in tab 220, and proxy window 234 represents the contents displayed in tab 222. Proxy window 236 represents the contents displayed in application window 520, and proxy window 238 represents the contents of another application window (not shown) opened for application 518.

In accordance with one or more embodiments, each respective first proxy window comprises a thumbnail representative of the contents displayed in its corresponding tab, and the second proxy window comprises a thumbnail representative of the contents displayed in the second application window. For example, with reference to FIGS. 2B and 5, proxy window 230 comprises thumbnail 262, which is representative of the contents (i.e., Web page 226, as shown in FIG. 2A) displayed in tab 218. Proxy window 232 comprises thumbnail 264, which is representative of the contents displayed in tab 220. Proxy window 234 comprises thumbnail 266, which is representative of the contents displayed in tab 222. Proxy window 236 comprises a thumbnail 272 representative the contents displayed in application window 520, and proxy window 238 comprises a thumbnail 274 representative of the contents displayed in another application window (not shown) opened for application 518. As shown in FIG. 5, application window API 522 may provide application window information 536 to application window API 524 of operating system 504. Application window information 536 may comprise characteristics of application windows (e.g., application window 520) opened for application 518. Such characteristics include, but are not limited, a number of application windows opened for application 518, a window identifier that uniquely identifies each of the application windows, an icon representative of application 518, a title associated with each of the application windows opened for application 518, or a thumbnail representative of the contents displayed for each of the application windows opened for application 518. Application window API 524 provides the application window information to task switcher feature 528. Task switch feature 528 generates and displays the proxy windows (e.g., proxy windows 236 and 238) in accordance with the received application window information 536.

In accordance with one or more embodiments, each thumbnail is sized proportionally to the size of the first application window. For example, with reference to FIG. 5, tab data model API 512 may provide a request 538 to tab manager API 508 for a thumbnail for each proxy window to be generated and displayed. Request 538 may specify one or more dimensions of the thumbnails to be provided. For instance, tab data model API 512 identifies the application window (i.e., application window 506) in which tabs 510 are located using a handle of application window 506 associated with tab manager API 508 and tab data model API 512. Tab data model API 512 determines dimension(s) associated with application window 506 (e.g., the height and width) and includes the dimension(s) in request 538. Tab manager API 508 provides the dimension(s) to application 502, which generates a thumbnail for each of tabs 510 in accordance with the dimension(s) in the request and provides the thumbnails to tab manager API 508, which in turn provides the thumbnails to data model API 112. In accordance with an embodiment, tab data model API 512 may also provide a scale factor in request 538, which application 502 utilizes to size the thumbnails such that each of the thumbnails are proportional to the contents displayed in application window 506. For instance, if the dimensions of the contents displayed via application window 506 are 300 pixels by 500 pixels, and the scale factor is 1:5, tab manager API 508 scales the contents in accordance to the scale factor to generate a thumbnail having the dimensions 60 pixels by 100 pixels. In accordance with another embodiment, tab manager API 508 provides the contents to tab data model API 512 in its original form and tab data model API 512 scales the contents to generate the thumbnails.

In accordance with one or more embodiments, a user interface element is provided that enables a designation of an N most recently active tabs of the plurality of tabs to be represented via third proxy windows representing the contents displayed in the N most recently active tabs, wherein N is a positive integer greater than one. For example, with reference to FIGS. 2B, 3 and 5, user interface 514 of operating system 504 provides a user interface element 300 that enables a designation of an N most recently active tabs of tabs 510 to be represented via proxy windows (e.g., proxy windows 230, 232, and 234) representing contents displayed in the N most recently active tabs.

In accordance with one or more embodiments, a user interface element is provided that, when activated, causes the second proxy window to be hidden while maintaining the display of the first proxy windows. For example, with reference to FIGS. 2C and 5, task switcher feature 528 provides user interface element 268 that, when activated (e.g., placed in a second position, as shown in FIG. 2C), causes proxy windows 236 and 238 to be hidden while maintaining the display of proxy windows 230, 232, and 234.

In accordance with one or more embodiments, user input is detected to close a particular first proxy window of the first proxy windows, and, responsive to detecting the user input to close the particular first proxy window of the first proxy windows, a command is provided to the first application to close a tab of the plurality of tabs corresponding to the particular first proxy window. For example, with references to FIGS. 2E, 2F, and 5, input detector 526 is configured to detect user input to close proxy window 234. For instance, input detector 526 may detect that the user has activated user interface element 272. Responsive to input detector 526 detecting such user input, input detector 526 provides a notification 540 to tab data model API 512 that causes tab data model API 512 to provide a command 542 to tab manager API 508. Responsive to receiving command 542, application 502 closes tab 222, which corresponds to proxy window 234. As shown in FIG. 2F, both proxy window 234 and tab 222 have been closed, and therefore, are no longer displayed.

B. Taskbar User Interface for Displaying Proxy Windows for Tabs

As described above with reference to FIG. 1, user interface 114 may comprise a task bar that comprises a plurality of different user interface elements, including, but not limited to, a start menu user interface element, a search bar user interface element and a plurality of application icons. In accordance with an embodiment, a user is enabled to pin Web sites to the taskbar. For instance, a browser application executing on a user's computing device may comprise a menu option and/or a user-interactable element that enables a user to pin a Web site being displayed in a particular tab of the browser application to the taskbar. The aforementioned features will now be described with reference to FIGS. 6A-6H.

Figure 6A:
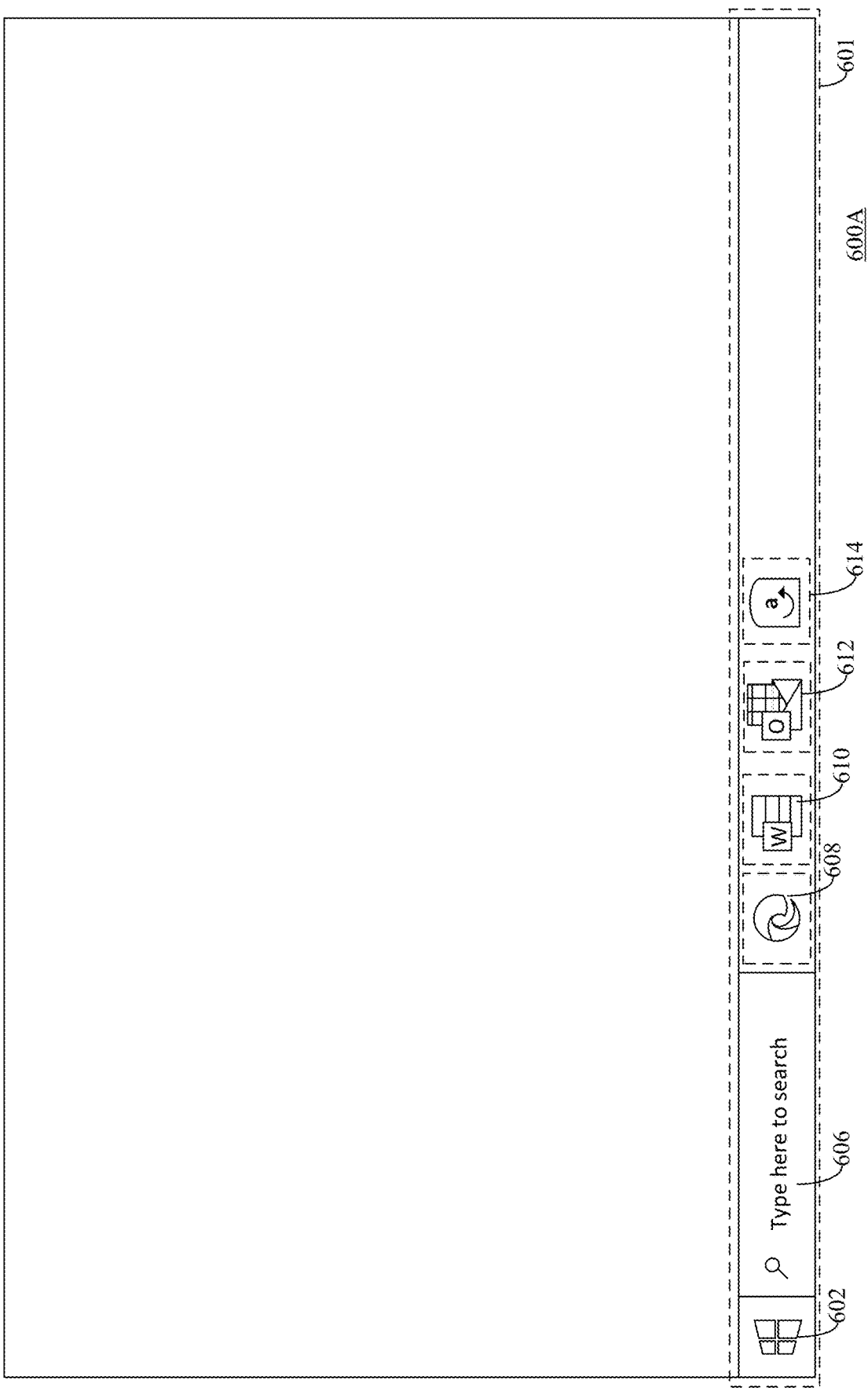
FIGS. 6A-6H depict example GUI screens that illustrate the use of a taskbar feature to display and manipulate proxy windows for tabs in accordance with example embodiments.

FIGS. 6A-6H depict example GUI screens that illustrate the use of a taskbar feature to display and manipulate proxy windows for tabs in accordance with example embodiments. For instance, FIG. 6A depicts an example GUI screen 600A in which a Web site has been pinned to a taskbar in accordance with an example embodiment. As shown in FIG. 6A, GUI screen 600A comprises a taskbar 601, which is an example of taskbar 201, as described above with reference to FIGS. 2A-2G. Taskbar 601 comprises a start menu user interface element 602, a search bar user interface element 606 and a plurality of application icons 608, 610, and 612. Start menu user interface element 602, search bar user interface element 606 and application icons 608, 610, and 612 are examples of start menu user interface element 202, search bar user interface element 206 and application icons 208, 210, and 212, as respectively described above with reference to FIGS. 2A-2G. As further shown in FIG. 6A, taskbar 601 comprises a pinned site icon 614. Pinned site icon 614 corresponds to a Web site that has been pinned to taskbar 601. Pinned site icon 614 may be associated with metadata comprising a uniform resource identifier (e.g., an Internet protocol (IP)) of the Web site, a favicon associated with the Web site, and/or an identifier of a browser application that is to be launched upon activation of pinned site icon 614. In the example shown in FIG. 6A, a user has pinned the Amazon.com® Web site to taskbar 601. Accordingly, pinned site icon 614 is represented with a favicon associated with Amazon.com® and is associated with the uniform resource identifier of Amazon.com® (e.g., http://www.amazon.com).

Figure 6B:
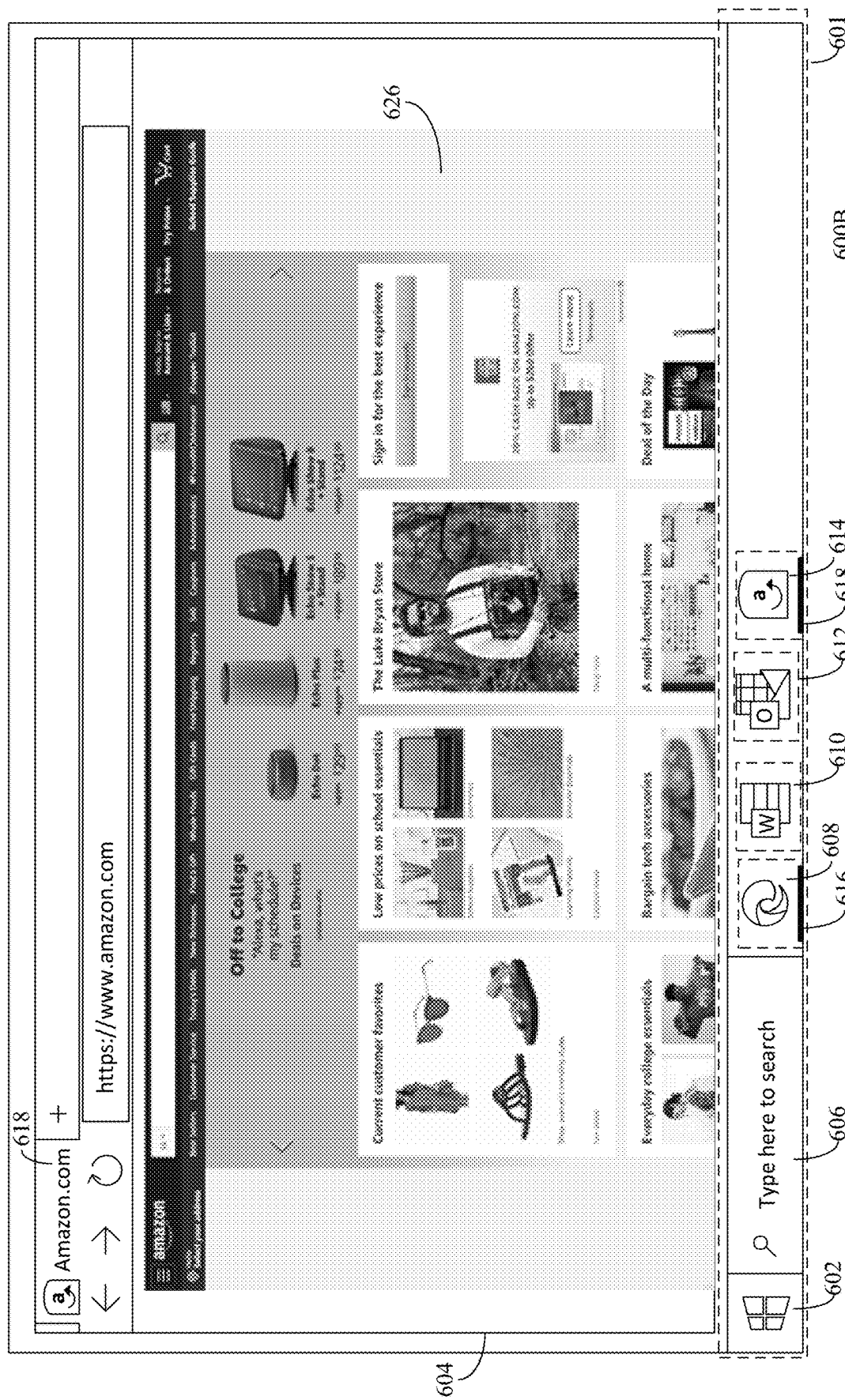

Pinned site icon 614 is user-interactable. When selected by a user (e.g., using a mouse, a keyboard, a touch screen interface, a stylus, etc.), a browser application (e.g., a browser application associated with application icon 608) is launched and/or is navigated to the uniform resource identifier associated with pinned site icon 614 (e.g., www.amazon.com). For example, FIG. 6B depicts an example GUI screen 600B in which pinned site icon 614 has been activated in accordance with an example embodiment. As shown in FIG. 6B, the selection of pinned site icon 614 causes the browser application corresponding to application icon 608 to be launched, causes the browser application to open an application window 604 with a tab 618, and/or causes the browser application to navigate to the uniform resource identifier associated with pinned site icon 614. The contents (e.g., Web page 626) located at the uniform resource identifier is displayed within tab 618.

For instance, the operating system (e.g., operating system 504) may detect user input that selects pinned site icon 614, analyzes the metadata associated therewith to determine which browser application to launch and/or the uniform resource identifier to which the browser application is to navigate. The operating system automatically launches the browser application identified by the metadata and provides the uniform resource identifier to the browser application for navigation thereby. The operating system may also cause user interface elements 616 and 618 to be displayed proximate to application icons 616 and 618, respectively. User interface element 616, when visible, indicates that the browser application associated with application icon 208 is executing on the computing device. User interface element 618, when visible, indicates that an application window (e.g., application window 604) of the browser application comprises a tab (e.g., tab 618) that displays the pinned Web site (e.g., www.amazon.com).

Figure 6C:
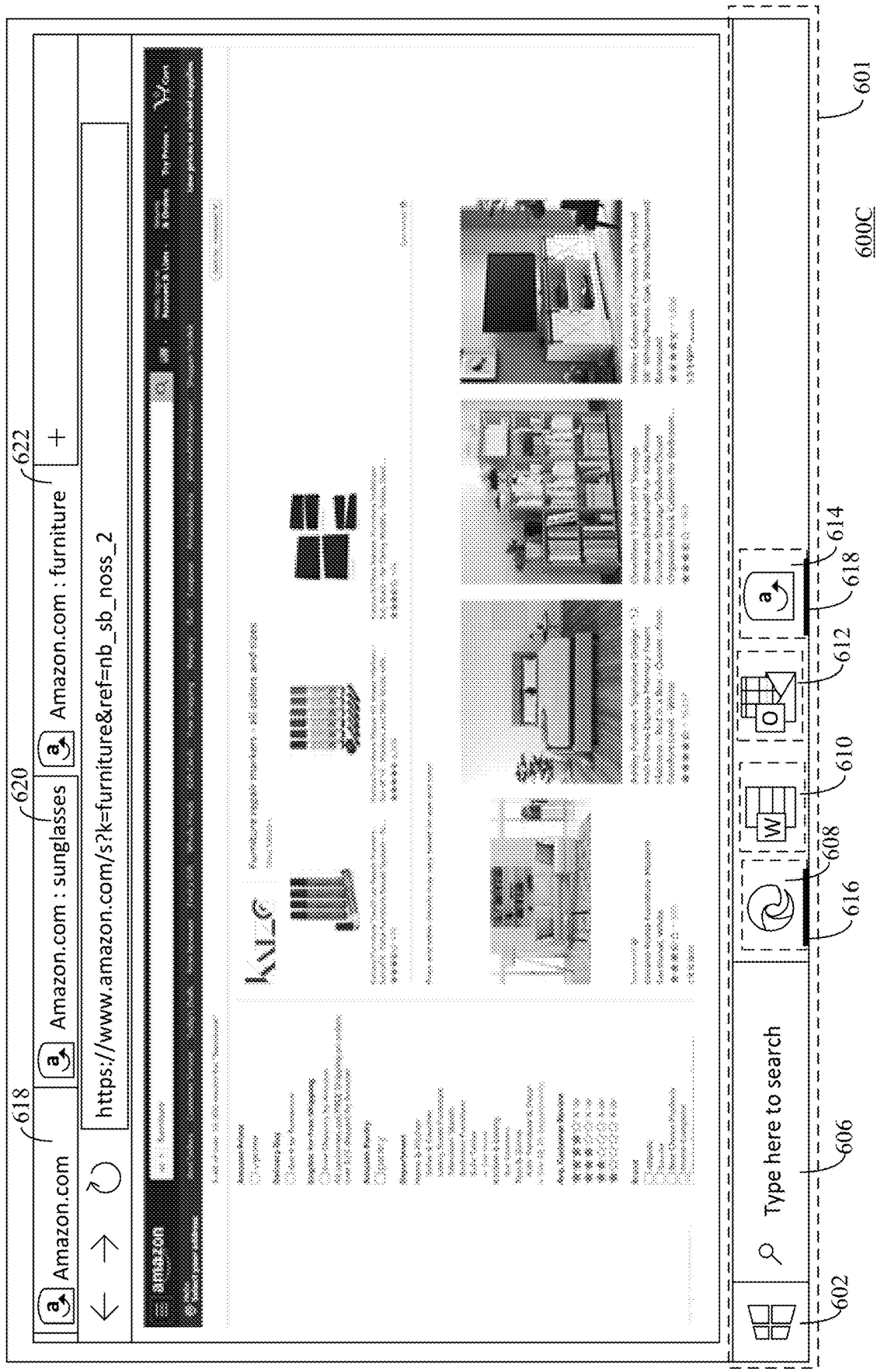

As shown in FIG. 6C, a user may open additional tabs (e.g., tabs 620 and 622) and navigate to other Web pages or Web sites. In the example shown in FIG. 6C, the user has navigated to other Web pages maintained by the same domain as the Web site pinned to task bar 601 via pinned site icon 614, although the embodiments described herein are not so limited.

Figure 6D:
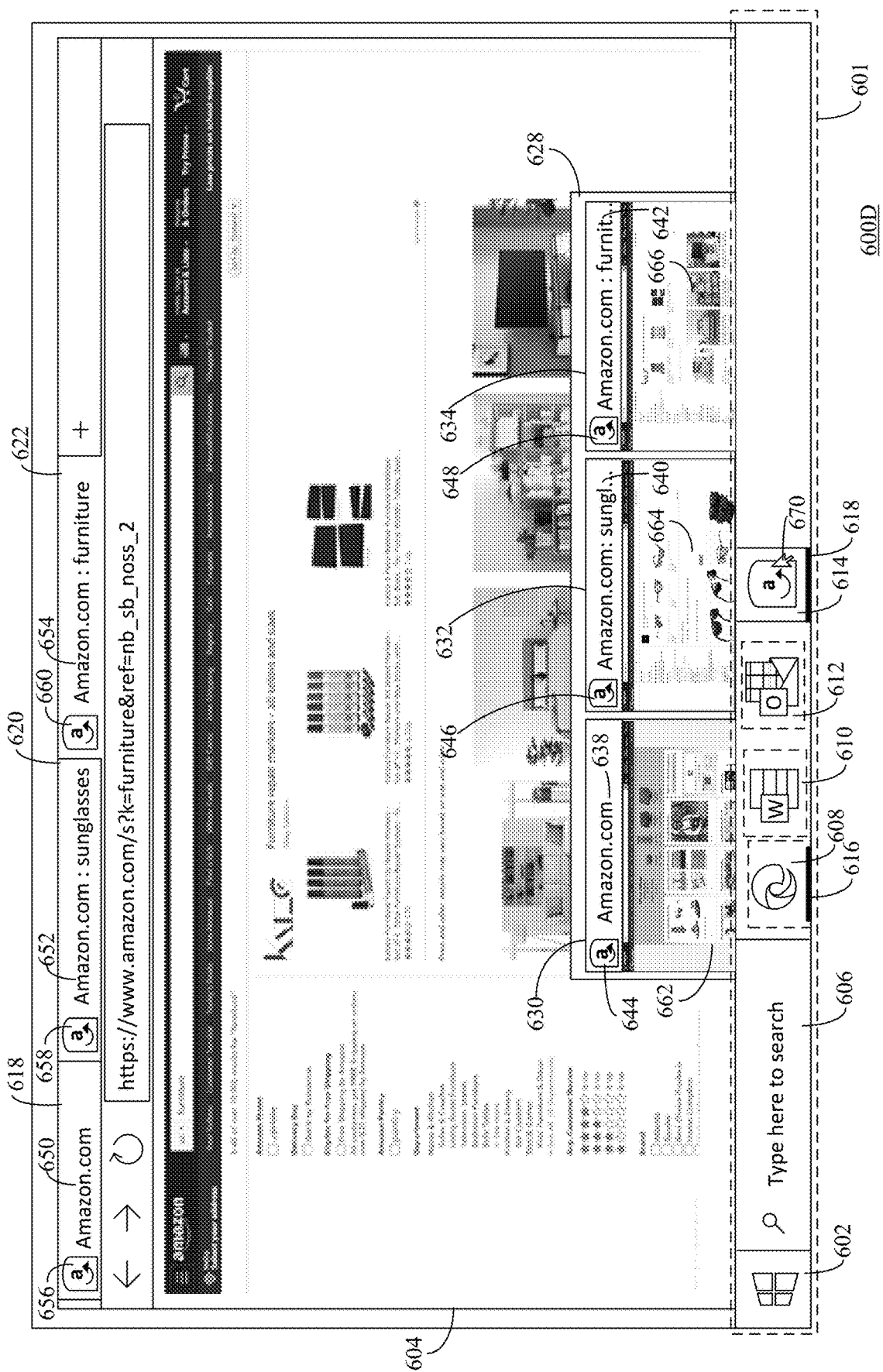

The operating system (e.g., operating system 504, as shown in FIG. 5) is configured to detect user input that causes the operating system to activate a tab preview feature via taskbar 601. Upon detection of such user input, the operating system presents a tab preview feature that simultaneously displays each tab that displays a Web page or Web site having the same domain as the Web site pinned to taskbar 601 via pinned site icon 614. Such tabs may be included in a single application window or via multiple application windows. In accordance with an embodiment, the user input comprises an interaction with pinned site icon 614. In one example, a user may hover a cursor (e.g., cursor 670, as shown in FIG. 6D) over pinned site icon 614. In such an example, the tab preview feature is activated upon the operating system detecting that the cursor has hovered over pinned site icon 614 over a predetermined period of time. It is noted that this user input is purely exemplary and that other types of user input may be utilized to activate the tab preview feature.

FIG. 6D depicts an example GUI screen 600D that shows a tab preview feature 628 in accordance with an example embodiment. Tab preview feature 628 simultaneously displays a plurality of proxy windows 630, 632, and 634. In the example shown in FIG. 6D, proxy window 630 displays the contents of tab 618 (i.e., Web page 626), proxy window 632 displays the contents of tab 620 (i.e., the Web page displayed in tab 620), and proxy window 634 display the contents of tab 622 (i.e., the Web page displayed in tab 622).

The manner in which proxy windows 630, 632, and 634 are displayed is in accordance with the tab information received via the browser application (e.g., application 502), as described above with reference to FIG. 5). For instance, responsive to receiving the tab information for tabs 618, 620, and 622, the operating system analyzes the tab information to determine a title to display for each of proxy windows 630, 632, and 634, a favicon to display for each of proxy windows 630, 632, and 634, an indication of a tab of tabs 618, 620, and 622 that is currently active, a time stamp representative of a time at which each of tabs 618, 620, and 622 was created, a time stamp representative of a time at which each of tabs 110 was last activated, and/or a thumbnail to display for each of proxy windows 630, 632, and 634. The operating system also determines which tabs are to have a proxy window generated therefor based on a group identifier included in the tab information. For instance, as described above, the group identifier identifies a group in which each opened tab is included. The group may be indicative of a domain (e.g., a company or organization name) associated with a Web site displayed in a particular tab. Web pages associated with the same domain may have the same group identifier, regardless of whether the tabs are included in the same application window or a different application window. For instance, Web pages associated with Amazon.com®, may each be associated with a first group identifier, and Web pages associated with YouTube.com®, may each be associated with a second group identifier.

In the example shown in FIG. 6D, tab preview feature 628 displays a title 638 ("Amazon.com") for proxy window 630, a title 640 ("Amazon.com: sunglasses") for proxy window 632, and a title 642 ("Amazon.com: furniture") for proxy window 634. Title 238 corresponds to a title 650 of the Web site displayed via tab 618, title 640 corresponds to a title 252 of the Web site displayed via tab 620, and title 642 corresponds to a title 654 of the Web site displayed via tab 622.

Tab preview feature 628 further displays a favicon 644 for proxy window 630, a favicon 646 for proxy window 632, and a favicon 648 for proxy window 634. Favicon 644 corresponds to a favicon 656 associated with the Web site displayed in tab 618, favicon 646 corresponds a favicon 658 associated with the Web site displayed in tab 620, and favicon 648 corresponds to favicon 660 associated with the Web site displayed in tab 622.

Tab preview feature 628 also displays a thumbnail representative of the contents displayed in each of tabs 618, 620, and 622 for each of proxy windows 630, 632, and 634. For instance, tab preview feature 628 displays a thumbnail 662 for proxy window 630, a thumbnail 664 for proxy window 632, and a thumbnail 666 for proxy window 634. Thumbnail 662 represents the Web site displayed in tab 618, thumbnail 664 represents the Web site displayed in tab 620, and thumbnail 666 represents the Web site displayed in tab 622. Each of thumbnails 662, 664, and 666 maintains the same aspect ratio utilized when displaying the corresponding contents via the application window from which its corresponding tab is included. In the example shown in FIG. 6D, each of thumbnails 662, 664, and 666 are proportional to the corresponding contents displayed via tabs 618, 620, and 622 of application window 604.

Figure 6E:
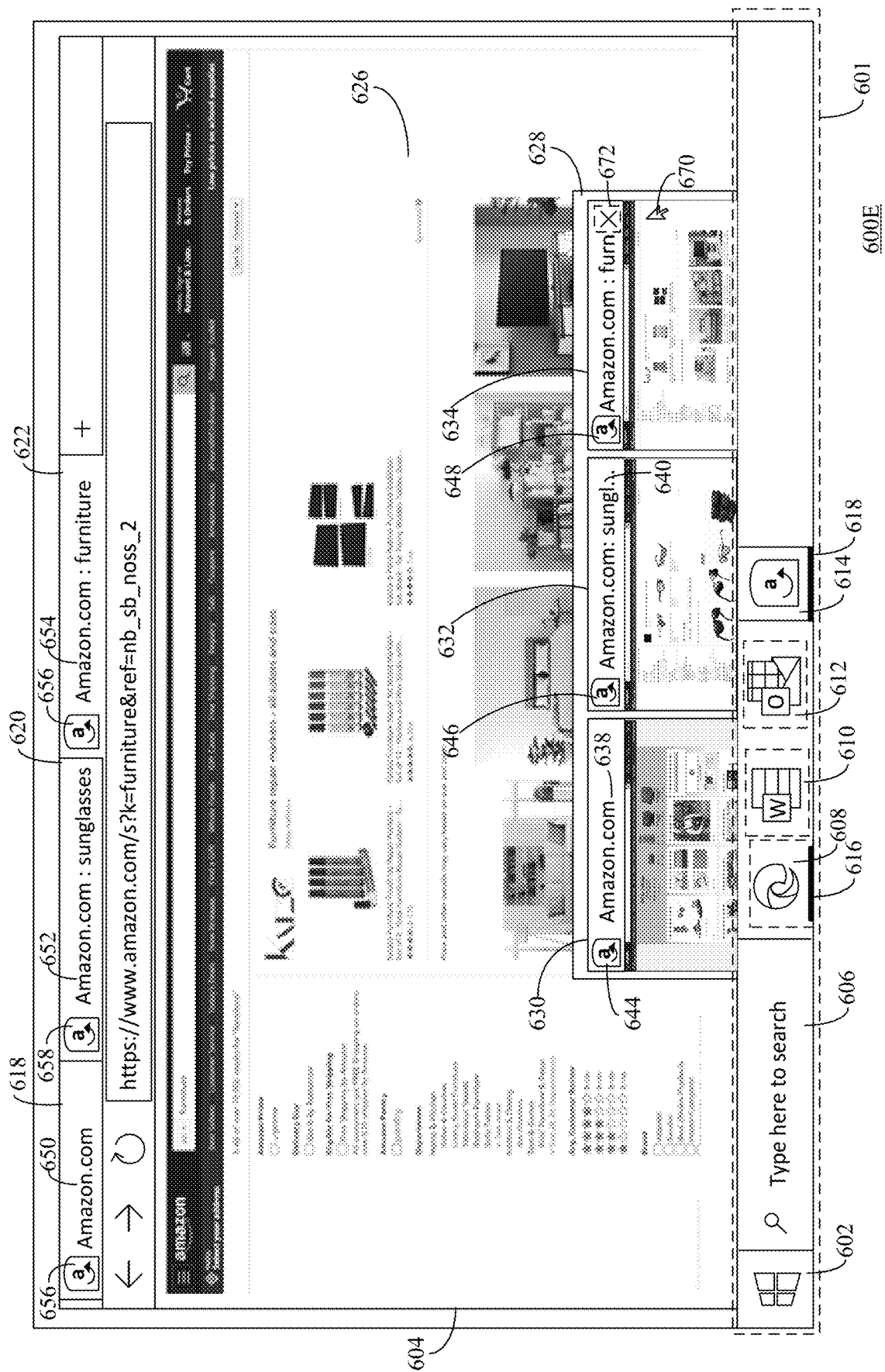
Figure 6F:
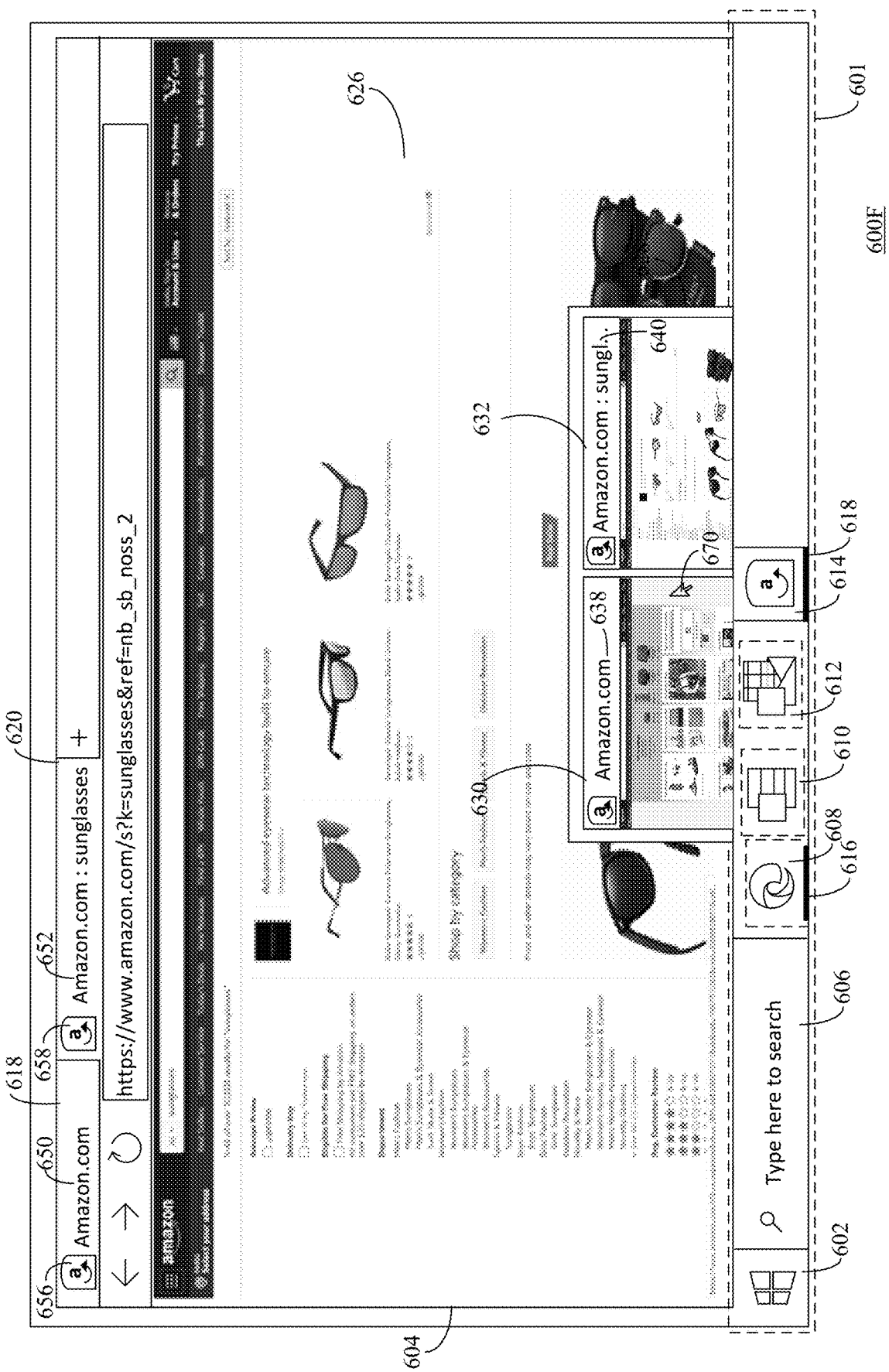

In accordance with an embodiment, a user is enabled to close tabs via tab preview feature 628. For instance, as shown in FIG. 6E, a user may select a proxy window to close, for example, by hovering a cursor 670 over the proxy window (e.g., proxy window 634). Upon doing so, a user-interactable element 672 may be displayed proximate to the proxy window. User-interactable element 672, when selected by the user, closes the proxy window and the tab corresponding thereto. For instance, in the example shown in FIG. 6E, a user may select user-interactable element 672 to close proxy window 634. Referring to FIG. 5, responsive to operating system 504 detecting user input with respect to user-interactable element 272, tab data model API 512 may send a command to tab manager API 508 to close the corresponding tab. The command may comprise an identifier of the proxy window (e.g., a tab identifier or the title of the proxy window). Responsive to receiving the command, application 502 identifies the corresponding tab based on the identifier and closes the tab. As shown in FIG. 6F, responsive to selecting user-interactable element 672, both proxy window 634 and tab 622 are closed and no longer displayed.

Figure 6G:
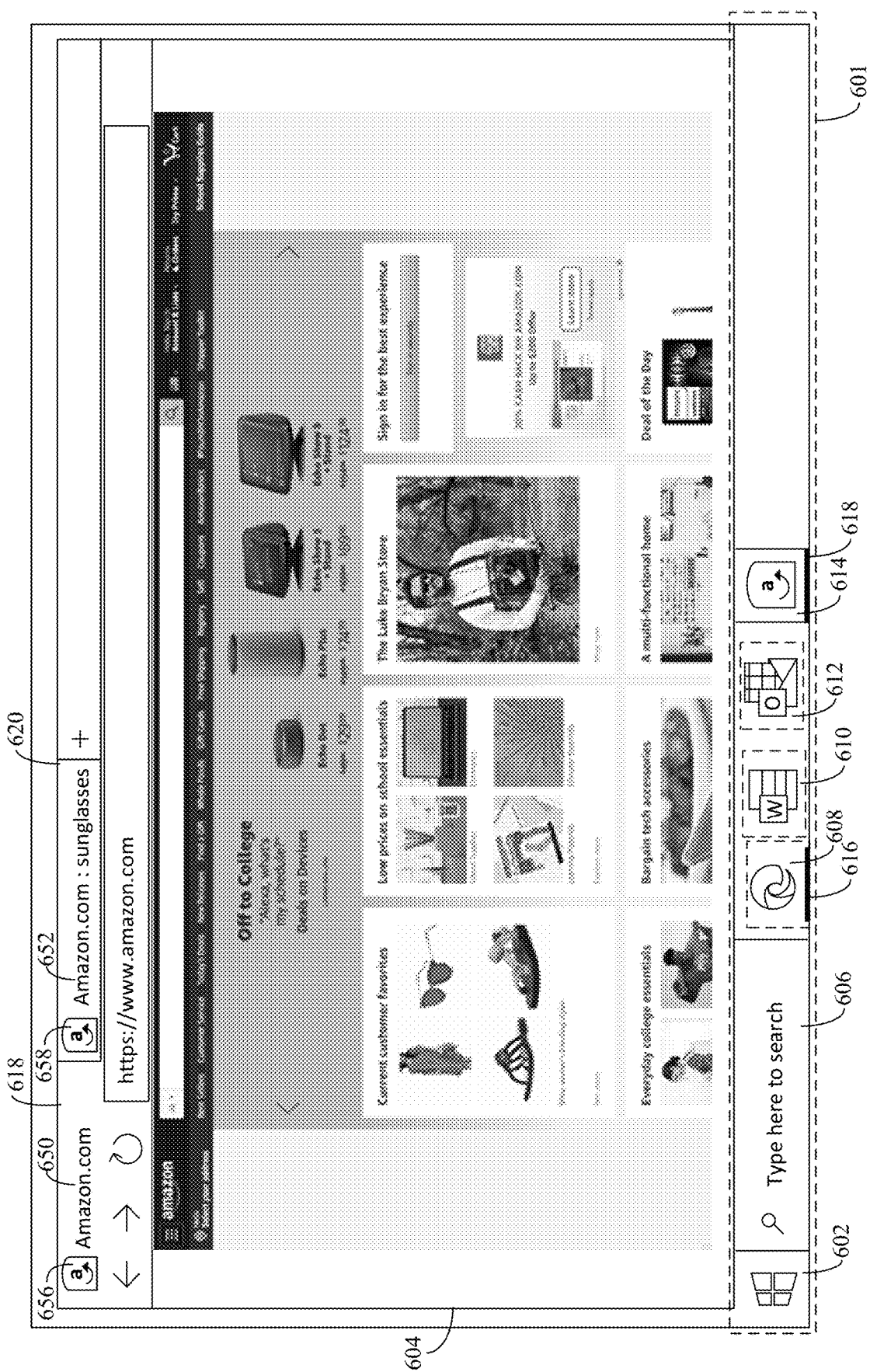

In accordance with an embodiment, a user is enabled to switch tabs utilizing tab preview feature 228. For instance, referring again to FIG. 6F, a user may select a proxy window displaying an open tab, for example, by clicking on the proxy window (e.g., proxy window 630). Upon selecting the proxy window, tab preview feature 628 is no longer displayed and application window 604 switches to the tab corresponding to the selected proxy window. For instance, in the example shown in FIG. 6F, a user selects proxy window 630 via cursor 670. Referring to FIG. 5, responsive to operating system 504 detecting user input that selects proxy window 630, tab data model API 512 may send a command to tab manager API 508 that comprises an identifier of the selected proxy window (e.g., a tab identifier or title of the proxy window). Responsive to receiving the command, application 502 identifies the corresponding tab using the identifier and switches to tab 618, as tab 618 corresponds to selected proxy window 630. As shown in FIG. 6G, tab 618 is now active and the Web page of tab 618 is displayed in application window 604.

In accordance with an embodiment, upon detecting that a user has hovered cursor 670 over a proxy window displayed via tab preview feature 628, the corresponding tab is displayed while tab preview feature 628 is maintained. Upon selecting the proxy window (e.g., via a mouse click), tab preview feature 628 is no longer displayed while the display of the corresponding tab is maintained.

Figure 6H:
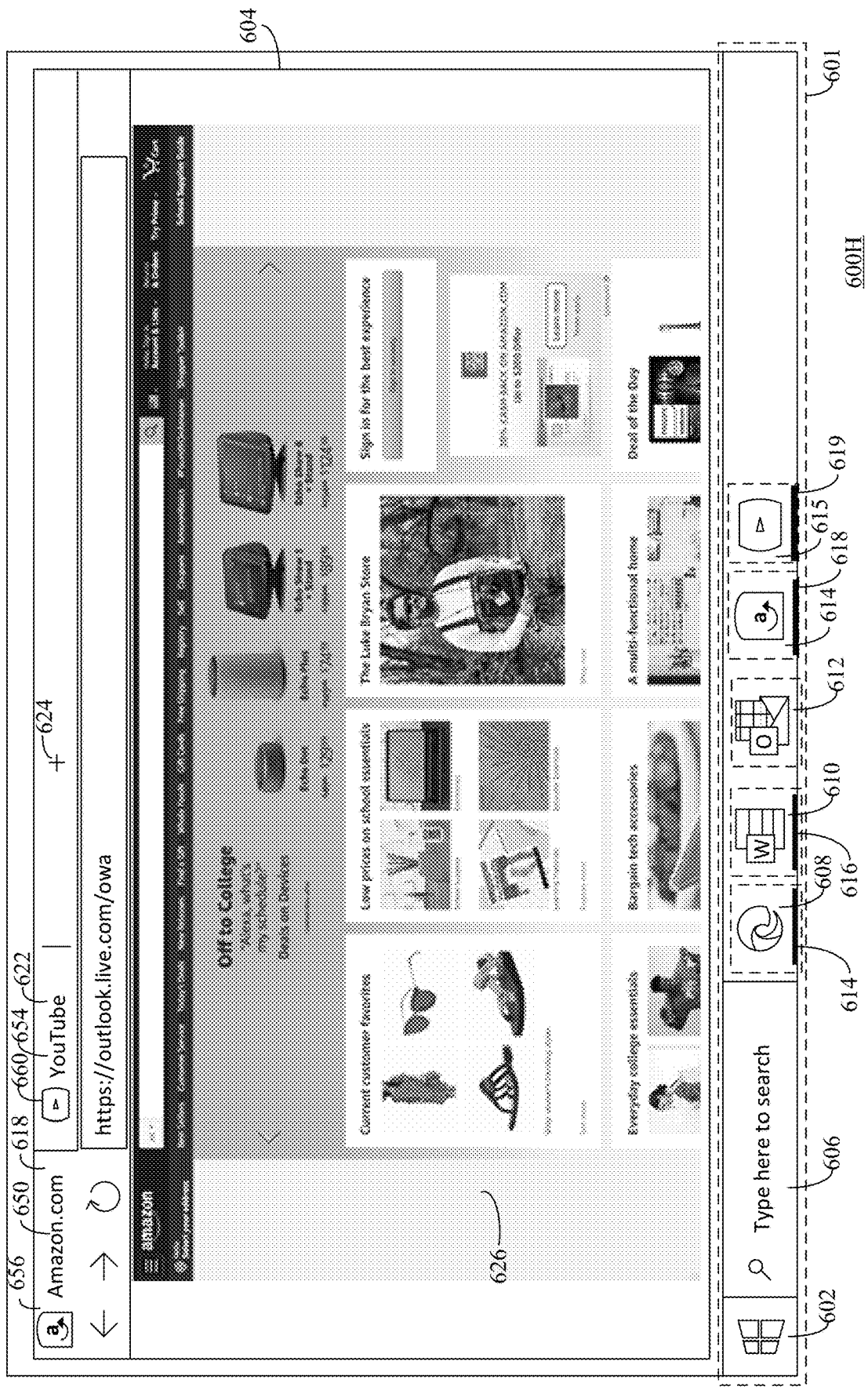

In accordance with an embodiment, a favicon may be displayed in taskbar 601 for each domain associated with Web sites opened via tabs opened in an application window. For instance, as shown in FIG. 6H, application window 604 comprises tab 618 and tab 622. Tab 618 is associated with a first domain (e.g., Amazon.com) and favicon 656, and tab 622 is associated with a second domain (e.g., youtube.com) and favicon 660). Accordingly, taskbar 601 comprises favicon 614, as described above, along with favicon 615, which corresponds to favicon 660. As further shown in FIG. 6H, user interface element 618 is shown proximate to favicon 614, and user interface element 619 is shown proximate to favicon 615. User interface element 618 indicates that an application window (e.g., application window 604) of the browser application comprises a tab (i.e., tab 618) associated with the first domain and favicon 656, and user interface element 619 indicates that an application window (e.g., application window 604) of the browser application comprises a tab (i.e., tab 622) associated with the second domain and favicon 660.

The operating system may activate a tab preview feature, as described above, upon detecting user input with respect to either favicon 614 or favicon 615. For instance, upon detecting user input with respect to favicon 614, a tab preview feature is displayed, which displays proxy windows for all tabs associated with the first domain. Upon detecting user input with respect to favicon 615, a tab preview feature is displayed, which displays proxy windows for all tabs associated with the second domain.

Upon closing all the tabs displaying a Web site associated with a particular domain, the corresponding favicon may be removed from taskbar 601 (unless such a Web site is pinned to taskbar 601). For instance, upon closing tab 622, favicon 615 may be removed from taskbar 201, along with user interface element 619. Upon closing tab 618, favicon 614 may remain on taskbar, as it is pinned to taskbar 601. However, user interface element 618 is no longer displayed.

As described above, proxy windows for tabs may be displayed via an interaction with a pinned site icon. In accordance with an embodiment, proxy windows for tabs may also be displayed via an interaction with an application icon for an application that utilizes a TDI. The aforementioned features will now be described with reference to FIGS. 7A-7E.

Figure 7A:
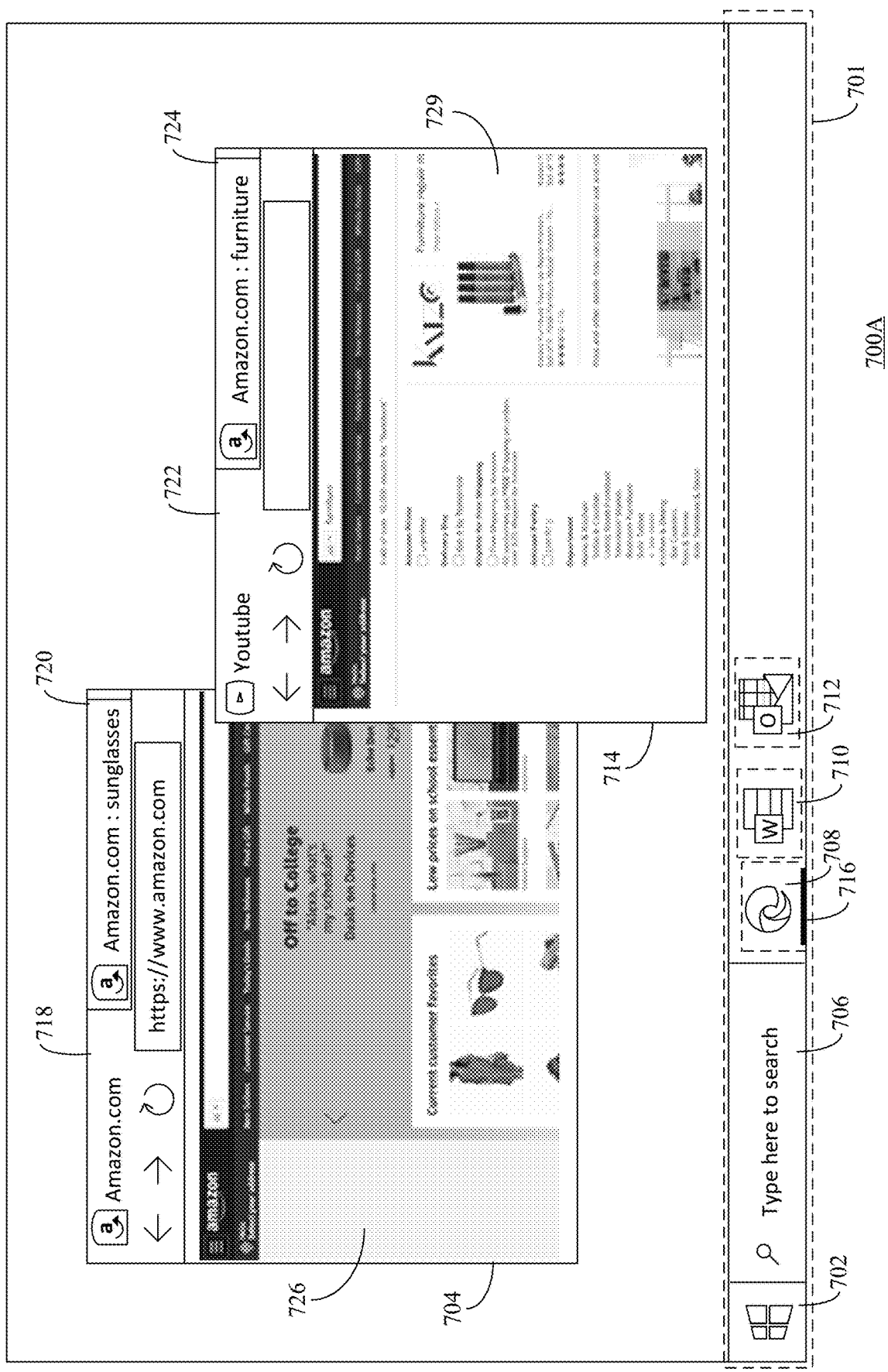
FIGS. 7A-7E depict example GUI screens that illustrate the use of a taskbar feature to display and manipulate proxy windows for tabs in accordance with additional example embodiments.

FIGS. 7A-7E depict example GUI screens that illustrate the use of a taskbar feature to display and manipulate proxy windows for tabs in accordance with additional example embodiments. For instance, FIG. 7A depicts an example GUI screen 700A in which a first application window 704 and a second application window 714 are opened in accordance with an example embodiment. As shown in FIG. 7A, GUI screen 700A comprises a taskbar 701, which is an example of taskbar 601, as described above with reference to FIGS. 6A-6G. Taskbar 701 comprises a start menu user interface element 702, a search bar user interface element 706 and a plurality of application icons 708, 710, and 712. Start menu user interface element 702, a search bar user interface element 706 and application icons 708, 710, and 712 are examples of start menu user interface element 602, search bar user interface element 606 and application icons 608, 610, and 612, as respectively described above with reference to FIGS. 6A-6H.

As further shown in FIG. 7A, application icon 708 is associated with a user interface element 716. User interface element 716, when visible, indicates that the browser application associated with application icon 708 is executing on the computing device.

Each of application windows 704 and 714 is associated with the browser application corresponding to application icon 708. As shown in FIG. 7A, application window 704 comprises two tabs 718 and 720 that are opened within application window 704, and application window 714 comprises two tabs 722 and 724 that are opened within application window 714. Tab 718 has a first Web site opened (i.e., www.amazon.com) therein, tab 720 has a second Web site opened therein, which is in the same domain as the first Web site, tab 722 has a third Web site opened (i.e., www.youtube.com) therein, and tab 724 has a fourth Web site opened therein, which is also in the same domain as the first and second Web sites. In the example shown in FIG. 7A, tab 718 of application window 704 is active, and therefore, the contents of Web site (shown as Web site 726) opened in tab 718 is displayed in application window 704. Tab 722 of application window 714 is active, and therefore, the contents of Web site (shown as Web site 729) opened in tab 722 is displayed in application window 714. A user may cause application window 704 to display the contents of the second Web site by selecting tab 720 and may cause application window 714 to display the contents of the fourth Web site by selecting tab 724. Each of tabs 718, 720, 722, 724 also display a title and a favicon associated with the Web site displayed therein as described above with reference to FIGS. 6A-6H.

The operating system (e.g., operating system 504, as shown in FIG. 5) is configured to detect user input that causes the operating system to activate the tab preview feature. Upon detecting of such user input, the operating system presents a tab preview feature that simultaneously displays a plurality of proxy windows representative of one or more of the tabs opened in application windows 704 and 714. In accordance with an embodiment, the user input comprises an interaction with application icon 708. In one example, a user may hover a cursor over application icon 708. In such an example, the tab preview feature is activated upon the operating system detecting that the cursor has hovered over application icon 708 over a predetermined period of time. It is noted that this user input is purely exemplary and that other types of user input may be utilized to activate the tab preview feature.

Figure 7B:
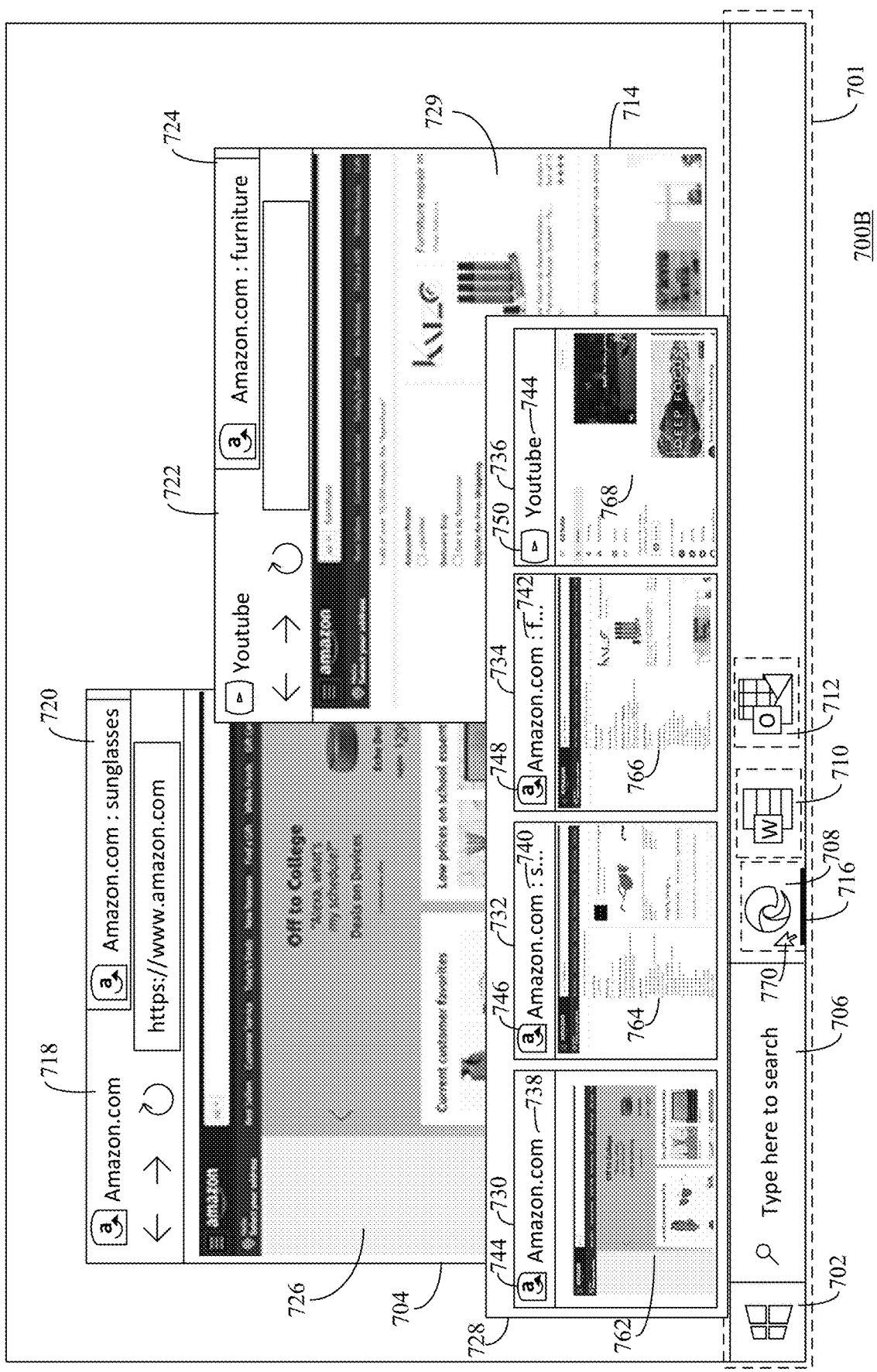

FIG. 7B depicts an example GUI screen 700B that shows a tab preview feature 728 in accordance with an example embodiment. Tab preview feature 728 simultaneously displays a plurality of proxy windows 730, 732, 734, and 736. In the example shown in FIG. 7B, proxy window 730 displays the contents of tab 718 (i.e., Web page 726), proxy window 732 displays the contents of tab 720 (i.e., the Web page displayed in tab 720), proxy window 734 display the contents of tab 722 (i.e., Web page 728), and proxy window 736 displays the contents of tab 724 (i.e., the Web page displayed in tab 724).

The manner in which proxy windows 730, 732, 734, and 736 are displayed is in accordance with the tab information received via the browser application corresponding to application icon 708, as described above with reference to FIG. 5. For instance, the operating system (e.g., operating system 504) may receive tab information for tabs 718 and 720 from a first instance of tab manager API 508 associated with application window 704 and may receive tab information for tabs 722 and 724 from a second instance of tab manager API 508 associated with application window 714. The tab information for tabs 718 and 720 may be received by a first instance of tab data model API 512, and the tab information for tabs 722 and 724 may be received by a second instance of tab data model API 512. Responsive to receiving the tab information for tabs 718, 720, 722, and 724, the operating system analyzes the tab information to determine a title to display for each of proxy windows 730, 732, 734, and 736, a favicon to display for each of proxy windows 730, 732, 734, and 736, and/or a thumbnail to display for each of proxy windows 730, 732, 734, and 736.

In the example shown in FIG. 7B, tab preview feature 728 displays a title 738 ("Amazon.com") for proxy window 730, a title 740 ("Amazon.com: sunglasses") for proxy window 732, a title 742 ("Amazon.com: furniture") for proxy window 734, and a title 744 ("YouTube") for proxy window 736. Each of titles 738, 740, 742, and 744 corresponds to the respective title of its corresponding tab, as described above with reference to FIGS. 6A-6H.

Tab preview feature 728 further displays a favicon 744 for proxy window 730, a favicon 746 for proxy window 732, a favicon 748 for proxy window 734, and a favicon 750 for proxy window 736. Each of favicons 744, 746, 748, and 750 correspond to the respective favicon of its corresponding tab, as described above with reference to FIGS. 6A-6H.

The order in which each of tabs 718, 720, 722, and 724 is displayed may be in accordance with the received tab information. For instance, the order may be based on the indication of a tab of tabs 718, 720, 722, and 724 that is currently active, a time stamp representative of a time at which each of tabs 718, 720, 722, and 724 is created, a time stamp representative of a time at which each of tabs 718, 720, 722, and 724 is activated (or was last activated). The order in which each of tabs 718, 720, 722, and 724 is displayed may be configurable and changed by the user, e.g., via a user interface element (not shown) that enables the user to change the order.

Tab preview feature 728 also displays a thumbnail representative of the contents displayed in each of tabs 718, 720, 722, and 724 for each of proxy windows 730, 732, 734, and 736. For instance, tab preview feature 728 displays a thumbnail 762 for proxy window 730, a thumbnail 764 for proxy window 732, a thumbnail 766 for proxy window 734, a thumbnail 768 for proxy window 736. Thumbnail 762 represents the Web site displayed in tab 718 (i.e., Web site 726), thumbnail 764 represents the Web site displayed in tab 720, thumbnail 766 represents the Web site (i.e., Web site 729) displayed in tab 722, and thumbnail 768 represents the Web site displayed in tab 724. Each of thumbnails 762, 764, 766, and 768 maintains the same aspect ratio of the application window in which its corresponding tab is included. In the example shown in FIG. 7B, thumbnails 762 and 764 are proportional to the size of application window 704, and thumbnails 766 and 768 are proportional to the size of application window 714.

In accordance with an embodiment, tab preview feature 728 is configured to group proxy windows by domain in accordance with a group identifier included in the tab information. For instance, as described above, the group identifier identifies a group in which each opened tab is included. The group may be indicative of a domain (e.g., company name) associated with a Web site displayed in a particular tab. Web pages associated with the same domain may have the same group identifier, regardless of whether the tabs are included in the same application window or a different application window. For instance, Web pages associated with Amazon.com®, may each be associated with a first group identifier, and Web pages associated with YouTube.com®, may each be associated with a second group identifier.

Figure 7C:
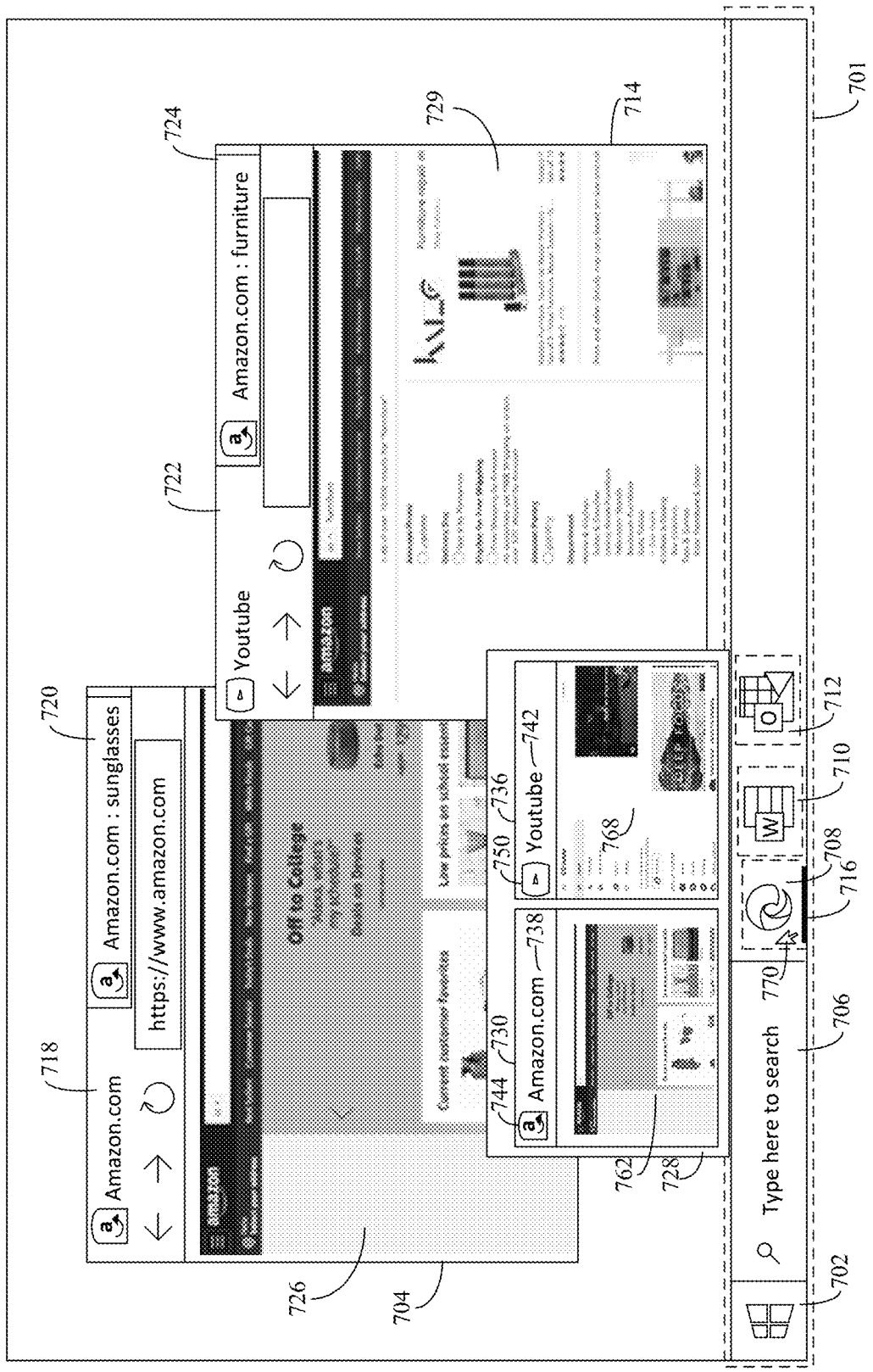

In accordance with such an embodiment, tab preview feature 728 may initially display a single proxy window for each group. For instance, tab preview feature 728 may display a proxy window representative of the last active (or most recently engaged with) tab included in that group. For instance, FIG. 7C depicts an example GUI screen 700C in which a tab preview feature groups proxy windows in accordance with an example embodiment. As shown in FIG. 7C, upon detecting user input that initiates tab preview feature 728 (e.g., by hovering cursor 770 over application icon 708 for a predetermined period of time), the operating system displays tab preview feature 728. Tab preview feature 728 displays a proxy window for each group, as specified by the group identifier. For instance, a first group identifier may indicate that one group of tabs (e.g., tabs 718, 720, and 722) display Web pages associated with a first domain (e.g., www.amazon.com). Accordingly, tab preview feature 728 displays a proxy window (i.e., proxy window 730) representative of the group. Proxy window 730 represents the last active tab associated with that group. A second group identifier may indicate that another group of tabs (e.g., tab 722) that display Web pages associated with a second domain (e.g., www.youtube.com). Accordingly, tab preview feature 728 displays a proxy window (i.e., proxy window 736) representative of that group. Proxy window 736 represents the last active tab associated with that group.

Figure 7D:
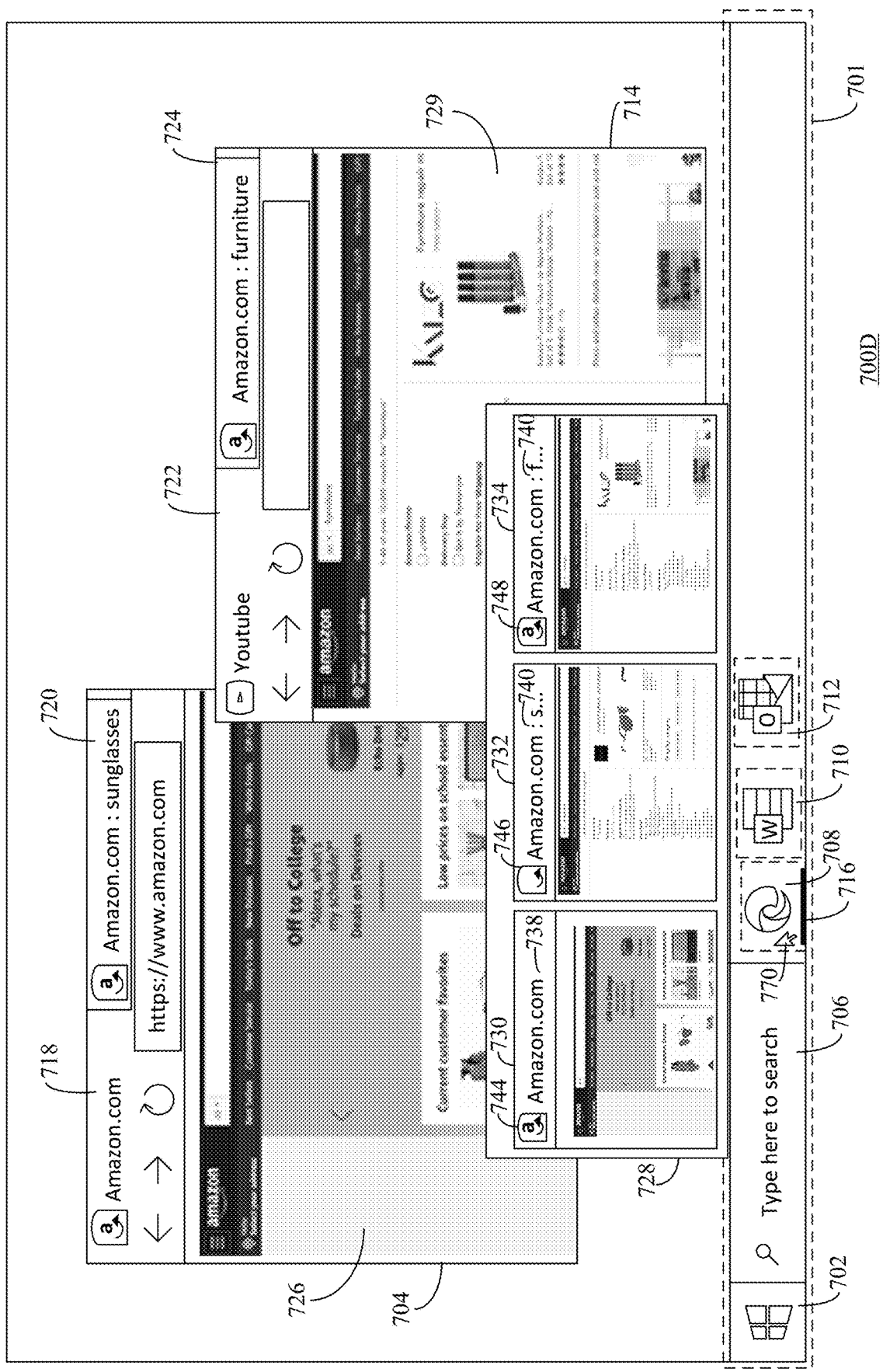

To display all the tabs associated with a particular group, a user may select the representative proxy window (either proxy window 730 or 736). For instance, FIG. 7D depicts an example GUI screen 700D in which a proxy window representative of a group is selected in accordance with an embodiment. As shown in FIG. 7D, upon selecting proxy window 730, as shown in FIG. 7D, tab preview feature 728 displays a proxy window for each tab associated with the group associated with the proxy window 730. For instance, as shown in FIG. 7D, tab preview feature 728 displays proxy windows 730, 732, and 734, which each represent tabs (i.e., tabs 718, 720, and 722) displaying Web pages associated with the same domain (i.e., www.amazon.com).

If proxy window 736 of FIG. 7C is selected, tab preview tab interface 728 displays a proxy window for each tab displaying a Web site associated with another group or domain (i.e., www.youtube.com). In the examples shown in FIGS. 7A-7D, since only one tab displays content from www.youtube.com, only a single proxy window for that tab is provided via tab preview feature 728. Referring again to FIG. 7D, tab preview feature 728 further enables a user to select any of proxy windows 730, 732, and 734. Upon selecting a proxy window, its corresponding tab is displayed and tab preview feature 728 is no longer is displayed in a similar manner as described above with reference to FIGS. 6F and 6G.

Tab preview feature 728 enables a user to close proxy windows in a similar manner as described above with reference to FIGS. 6E-6F. As described above, upon closing a proxy window, its corresponding tab is also close.

In accordance with another embodiment, rather than grouping proxy windows by domain, tab preview feature 728 may group proxy windows based on application windows. For instance, referring again to FIG. 7C, when a user selects proxy window 730, proxy windows representative of tabs 718 and 720 are displayed, as they are both included in application window 704. Similarly, when a user selects proxy window 736, proxy windows representative of tabs 722 and 724 are displayed, as they are both included in application window 714.

Figure 7E:
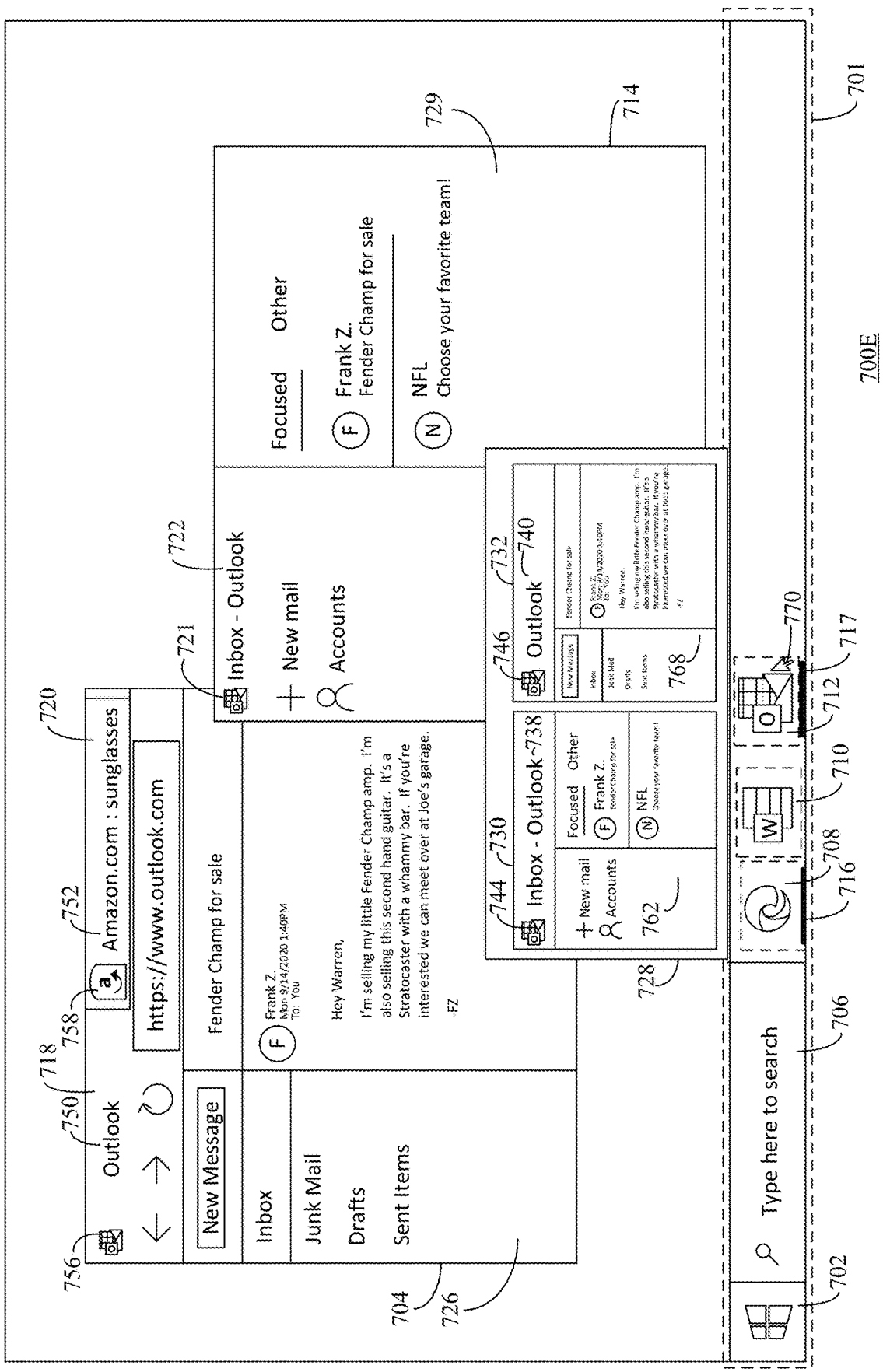

In an embodiment, tab preview feature 728 displays proxy windows for application windows opened for client-based applications simultaneously with proxy windows for application windows comprising tabs in which an online version of the client application is opened. For instance, with reference to FIG. 7E, application icon 712 corresponds to an e-mail client application (e.g., Microsoft® Outlook®, published by Microsoft Corporation). As shown in FIG. 7E, application icon 712 is associated with a user interface element 717. User interface element 717, when visible, indicates that the client application associated with application icon 712 is executing on the computing device. Application window 714 is associated with the client application. Application window 714 comprises a title 722 and displays contents 729.

As further shown in FIG. 7E, the browser application associated with application icon 708 is also executing, as is made apparent via user interface element 716. Application window 704 is associated with the browser application and comprises two tabs 718 and 720. Tab 718 is opened to a Web site executing an online version of the client application represented by application icon 712. Tab 718 comprises a favicon 756 representative of the domain on the Web site, and a title 750. Tab 718 displays a Web site 726 associated with the online version of the client application. The user may be signed in to both the client application and the online version of the client application via the same user account, although the embodiments described herein are not so limited.

As shown in FIG. 7E, upon detecting user input that initiates tab preview feature 728 (e.g., by hovering cursor 770 over application icon 712 for a predetermined period of time), the operating system displays tab preview feature 728. Tab preview feature 728 displays a proxy window for each tab and/or application window (e.g., tab 718 and application window 714) associated with the client application and the online version of the client application. For instance, tab preview feature 728 displays a first proxy window 730 and a second proxy window 732. Proxy window 730 corresponds application window 714, and proxy window 732 corresponds to tab 718. Proxy window 730 comprises a favicon 744 and a title 738, which respectively correspond to favicon 721 and title 722 of application window 714. Proxy window 732 comprises a favicon 746 and a title 740, which respectively correspond to favicon 756 and title 750 of tab 718. In accordance with an embodiment, tab preview feature 728 displays application icon 708 in lieu of favicon 746 to better distinguish which of proxy windows 730 and 732 correspond to the online version versus the client application. As further shown in FIG. 7E, proxy window 730 displays a thumbnail 762 representative of contents 729 of application window 714, and proxy window 732 displays a thumbnail 768 representative of contents 726 of tab 718.

The operating system (e.g., operating system 104) may utilize the tab information received via tab manager API 108 to associate (or group) proxy window 730 with proxy window 732. For instance, the operating system may utilize the title of tab 718 and/or a group identifier (that corresponds with the name of the client application) associated therewith. If the title and/or group identifier matches the name of the client application, the operating system associates application window 714 with tab 718 and generates and groups together proxy windows (i.e., proxy windows 730 and 732) corresponding to application window 714 and tab 718 via tab preview feature 728.

Figure 8:
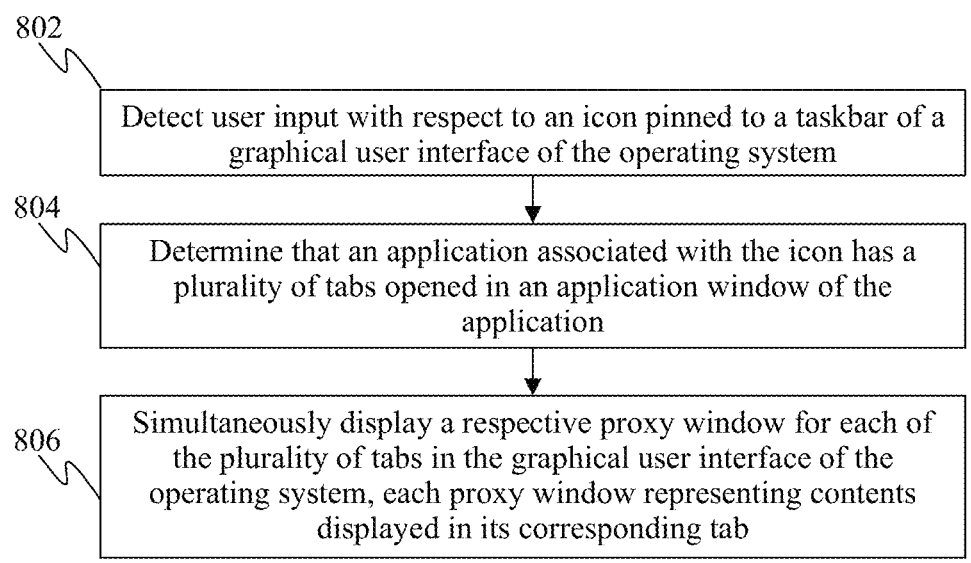
FIG. 8 shows a flowchart of a method performed by an operating system executing on a computing device to simultaneously display proxy windows for tabs via a taskbar in accordance with example embodiment.
Figure 9:
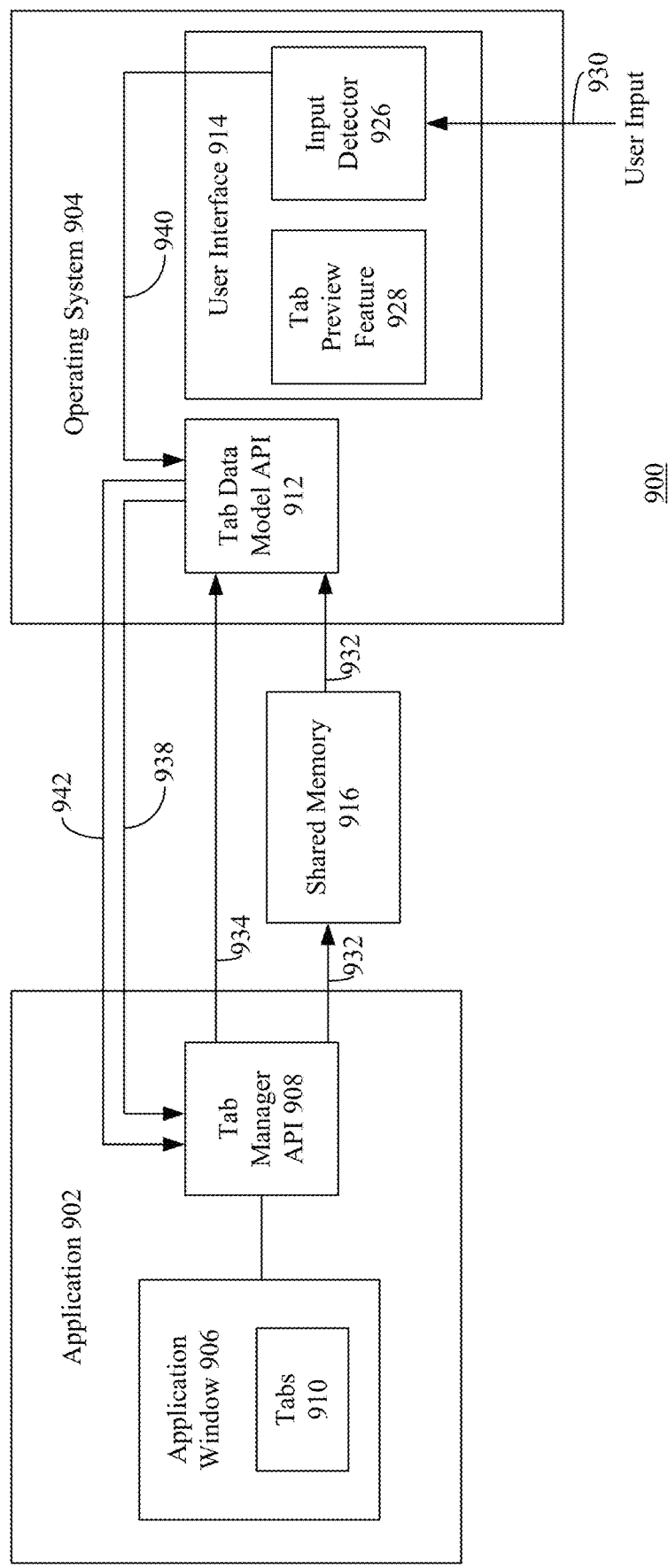
FIG. 9 shows a block diagram of a system for simultaneously displaying proxy windows for tabs via a taskbar in accordance with an example embodiment.

Accordingly, proxy windows for tabs may be simultaneously displayed via a taskbar in many ways. For example, FIG. 8 shows a flowchart 800 of a method performed by an operating system executing on a computing device to simultaneously display proxy windows for tabs via a taskbar in accordance with example embodiment. In an embodiment, flowchart 800 may be implemented by system 900, as described in FIG. 9. FIG. 9 shows a block diagram of a system 900 for simultaneously displaying proxy windows for tabs via a taskbar in accordance with an example embodiment. As shown in FIG. 9, system 900 includes an application 920, an operating system 904, and a shared memory 916. Application 902, operating system 904, and shared memory 916 are examples of application 102, operating system 104, and shared memory 116, as respectively described above with reference to FIG. 1. Application 902 comprises an application window 906 and a tab manager application programming interface (API) 908. Application window 906 comprises a plurality of tabs 910. Application window 906 is an example of application window 106 and application windows 604, 704, and 714, as respectively described above with reference to FIGS. 1, 6, and 7. Tabs 910 are examples of tabs 110 and tabs 618, 620, 622, 718, 720, 722, or 724, as respectively described above with reference to FIGS. 1, 6A-6H, and 7A-7D. Tab manager API 908 is an example of tab manager API 108, as described above with reference to FIG. 1. Operating system 904 comprises a tab data model API 912, and user interface 914. Tab data model API 912 and user interface 914 are examples of tab data model API 112 and user interface 114, as respectively described above with reference to FIG. 1. User interface 914 comprises an input detector 926 and a tab preview feature 728. Input detector 926 is an example of input detector 526, as respectively described above with reference to FIG. 5. Tab preview feature 728 is an example of tab switcher feature 628 and 728, as described above with reference to FIGS. 6A-6H and 7A-7E. Other structural and operational embodiments will be apparent to persons skilled in the relevant art(s) based on the following discussion regarding flowchart 800 and system 900.

Flowchart 800 of FIG. 8 begins with step 802. In step 802, user input is detected with respect to an application icon pinned to a taskbar of a graphical user interface of the operating system. For example, with reference to FIG. 9, input detector 926 detects user input 930 that initiates tab preview feature 728, which is configured to simultaneously display proxy windows for opened tabs via a taskbar. Input detector 926 is configured to various types of user input, e.g., touch screen input, mouse input, keyboard input, stylus input, etc.

In accordance with one or more embodiments, user input 930 comprises hovering a cursor over an icon pinned to a taskbar for a predetermined period of time. For example, with reference to FIG. 6D, cursor 670 hovers over pinned site icon 614 pinned to taskbar 601 for a predetermined period of time, and tab preview feature 628 is initiated in response. In another example, with reference to FIG. 7B, cursor 770 hovers over application icon 708 pinned to taskbar 701 for a predetermined period of time, and tab preview feature 728 is initiated in response It is noted user input 930 is purely exemplary and other types of user input may be utilized to initiate tab preview feature 728.

In accordance with one or more embodiments, the icon pinned to the taskbar represents a Web site and comprises a favicon associated with a domain of the Web site. For example, with reference to FIG. 6A, the icon corresponds to pinned site icon 614, which is associated with a Web site and comprises a favicon associated with a domain of the Web site (e.g., www.amazon.com).

At step 804, a determination is made that an application associated with the icon has a plurality of tabs opened in an application window of the application. For example, with reference to FIG. 9, tab data model API 912 determines that application 902 has a plurality of tabs 910 opened in application window 906. Tab data model API 912 may determine that application 902 has a plurality of tabs 910 opened in application window 906 based on tab information received via tab manager API 908

In accordance with one or more embodiments, tab manager API 908 may provide tab information 932 to shared memory 916. Tab manager API 918 may further provide a notification 934 to tab data model API 912 indicating that tab information 934 has been stored in shared memory 916. Responsive to receiving notification 934, tab data model API 912 retrieves tab information 932 from shared memory 916.

In accordance with one or more embodiments, tab information 932 comprises characteristics of tabs 912. Such characteristics include, but are not limited, a number of the tabs 910 opened in application window 906, a tab identifier that uniquely identifies each of tabs 910, an icon representative of application 902, a title associated with each of tabs 910, a thumbnail representative of the contents displayed for each of tabs 910, a group identifier that identifies a group in which each of tabs 910 is included, an indication of a most recently-active tab of tabs 910, a time stamp representative of a time at which each of tabs 910 was created, or an indication of a most recently-active tab of tabs 910, a time stamp representative of a time at which each of tabs 910 was last active. Tab data model API 912 may determine that a plurality of tabs 910 are opened in application window 906 based on the number of tabs 910, tab identifiers, and/or title received via tab manager API 908.

It is noted that certain tab information is received directly from tab manager API 908 rather than from shared memory 916. For examples, the thumbnails and/or icons may be provided directly from tab manager API 908, and therefore, tab manager API 908 may not store the thumbnails and/or icons in shared memory 916.

At step 806, responsive to detecting the user input and determining that the application associated with the icon has the plurality of tabs opened in the application window of the application, simultaneously display a respective proxy window for each of the plurality of tabs in the graphical user interface of the operating system, each respective proxy window representing contents displayed in its corresponding tab. For example, with reference to FIGS. 6D and 9, operating system 904 causes tab preview feature 628 (or tab preview feature 728) to simultaneously display a respective proxy window (proxy windows 630, 632, and 634) for each of tabs 618, 620, and 622. Proxy window 630 represents the contents displayed in tab 618 (i.e., Web site 626), proxy window 632 represents the contents displayed in tab 620, and proxy window 634 represents the contents displayed in tab 622. In another example, with reference to FIGS. 7B and 9, operating system 904 causes tab preview feature 728 (or tab preview feature 728) to simultaneously display a proxy window (proxy windows 730, 732, 734, and 736) for each of tabs 718, 720, 722, and 724. Proxy window 730 represents the contents displayed in tab 718 (i.e., Web site 726), proxy window 732 represents the contents displayed in tab 720, proxy window 734 represents the contents displayed in tab 722 (i.e., Web site 729), and proxy window 736 represents the contents displayed in tab 724.

In accordance with one or more embodiments, a respective proxy window for each tab of the plurality of tabs that is associated with a same group identifier is simultaneously displayed. The group identifier identifies that each said tab displays a Web site associated with the domain of the Web site. The respective proxy window, for each said tab, represents the contents of the Web site displayed in its corresponding tab. For example, with reference to FIG. 6D, each of proxy windows 630, 632, and 634 are associated with the same group identifier, which identifies that its associated tab (i.e., tabs 618, 620, and 622) displays a Web site associated with the same domain (e.g., www.amazon.com).

In accordance with one or more embodiments, a user interface element is provided proximate to the icon. The user interface element indicates that the application is executing and that a Web site associated with the domain is displayed in at least one tab of the plurality of tabs. For example, with reference to FIGS. 6B and 9, operating system 904 provides user interface element 618 proximate to pinned site icon 614. User interface element 618 indicates that application 902 is executing (i.e., the application associated with application icon 608) and that a Web site (e.g., Web site 626) associated with the domain (e.g., www.amazon.com) is displayed in at least one tab of tabs 910 (e.g., tab 618).

In accordance with one or more embodiments, each respective proxy window comprises a thumbnail representative of the contents displayed in its corresponding tab. For example, with reference to FIGS. 6D and 9, proxy window 630 comprises thumbnail 662, which is representative of the contents (i.e., Web page 626) displayed in tab 618. Proxy window 632 comprises thumbnail 664, which is representative of the contents displayed in tab 620. Proxy window 634 comprises thumbnail 666, which is representative of the contents displayed in tab 622.

In accordance with one or more embodiments, each thumbnail is sized proportionally to the size of the application window. For example, with reference to FIG. 9, tab data model API 912 may provide a request 938 to tab manager API 908 for a thumbnail for each proxy window to be generated and displayed. Request 938 may specify one or more dimensions of the thumbnails to be provided. For instance, tab data model API 912 identifies the application window (i.e., application window 906) in which tabs 910 are located using a handle of application window 906 associated with tab manager API 908 and tab data model API 912. Tab data model API 912 determines dimension(s) associated with application window 906 (e.g., the height and width) and includes the dimension(s) in request 938. Tab manager API 908 provides the dimension(s) to application 902, which generates a thumbnail for each of tabs 910 in accordance with the dimension(s) in the request and provides the thumbnails to tab manager API 908, which in turns provides the thumbnails to data model API 912. In accordance with an embodiment, tab data model API 912 may also provide a scale factor in request 938, which application 902 utilizes to size the thumbnails such that each of the thumbnails are proportional to the contents displayed in application window 906. For instance, if the dimensions of the contents displayed via application window 906 are 300 pixels by 500 pixels, and the scale factor is 1:5, tab manager API 908 scales the contents in accordance to the scale factor to generate a thumbnail having the dimensions 60 pixels by 100 pixels. In accordance with another embodiment, tab manager API 908 provides the contents to tab data model API 912 in its original form and tab data model API 912 scales the contents to generate the thumbnails.

In accordance with one or more embodiments, user input is detected to close a particular proxy window of the proxy windows, and, responsive to detecting the user input to close the particular proxy window of the proxy windows, a command is provided to the application to close a tab of the plurality of tabs corresponding to the particular proxy window. For example, with references to FIGS. 6E, 6F, and 9, input detector 926 is configured to detect user input to close proxy window 634. For instance, input detector 926 may detect that the user has activated user interface element 672. Responsive to input detector 926 detecting such user input, input detector 926 provides a notification 940 to tab data model API 912 that causes tab data model API 912 to provide a command 942 to tab manager API 908. Responsive to receiving command 942, application 902 closes tab 622, which corresponds to proxy window 634. As shown in FIG. 6F, both proxy window 634 and tab 622 have been closed, and therefore, are no longer displayed.

C. Window Snap User Interface for Displaying Proxy Windows for Tabs

As described above with reference to FIG. 1, user interface 114 may comprise a window snap user interface. The window snap user interface, when activated, causes an application window to be snapped to a first portion of the operating system's GUI (e.g., the operating system's desktop user interface) and causes a plurality of proxy windows to be displayed for opened application windows in a second portion of the operating system. A user may select one of the proxy windows. The selected proxy window causes the corresponding application window to be snapped to the second portion of the operating system's GUI, thereby providing a "split-screen" view of the two application windows. As used herein, the term "snapping" is defined as automatically maximizing an application window such that it covers a predefined portion (e.g., a quarter or half) of the operating system's GUI (e.g., the operating system's desktop). As will be described below, if an application window comprises a plurality of tabs, a separate proxy window will be displayed for each of the plurality of tabs. The foregoing features will now be described with reference to example GUI screens 1000A-1000H, as shown in FIGS. 10A-10H.

Figure 10A:
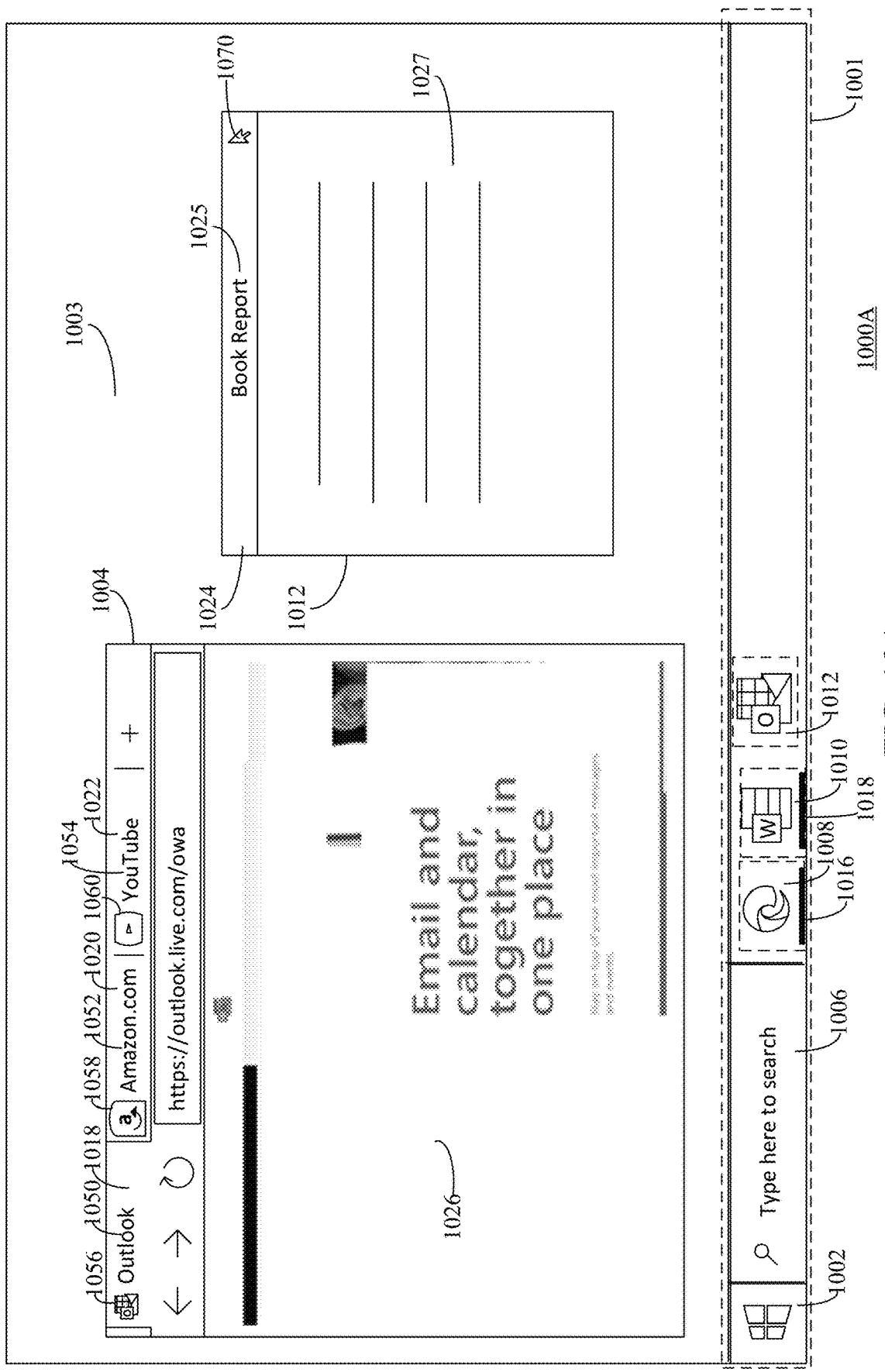
FIGS. 10A-10H depict example GUI screens that illustrate the use of a window snap feature to display and manipulate proxy windows for tabs in accordance with example embodiments.

FIGS. 10A-10H depict example GUI screens that illustrate the use of a window snap feature to display and manipulate proxy windows for tabs in accordance with example embodiments. For instance, FIG. 10A is an example GUI screen 1000A in accordance with an example embodiment. As shown in FIG. 10A, GUI screen 1000A comprises a taskbar 1001, a desktop 1003, a first application window 1004, and a second application window 1012. Taskbar 1001 comprises a start menu user interface element 1002, a search bar user interface element 1006 and a plurality of application icons 1008, 1010, and 1012. Start menu user interface element 1002, search bar user interface element 1006 and application icons 1008, 1010, and 1012 are examples of start menu user interface element 602, search bar user interface element 606 and application icons 608, 610, and 612, as respectively described above with reference to FIGS. 6A-6H. Desktop 1003 comprises a portion of the operating system's GUI in which application windows 1004 and 1012 and/or shortcuts (e.g., application icons) may be displayed and enables a user to interact with applications in various ways.

As further shown in FIG. 10A, application icons 1008 and 1010 are associated with a user interface element 1016 and 1018, respectively. User interface element 1016, when visible, indicates that the browser application associated with application icon 1008 is executing on the computing device. Similarly, user interface element 1018, when visible, indicates that the word processing application associated with application icon 1010 is executing on the computing device.

Application window 1004 is associated with the browser application corresponding to application icon 1008. As shown in FIG. 10A, application window 1004 comprises three tabs 1018, 1020, and 1022 that are opened within application window 1004. Tab 1018 has a first Web site opened (i.e., www.outlook.com), tab 1020 has a second Web site opened (i.e., www.amazon.com), and tab 1022 has a third Web site opened (i.e., www.youtube.com). In the example shown in FIG. 10A, tab 1018 is active, and therefore, the contents of Web site (shown as Web site 1026) opened in tab 1018 is displayed in application window 1004. A user may cause application window 1004 to display the contents of the second Web site by selecting tab 1020 and may cause application window 1004 to display the contents of the third Web site by selecting tab 1022. Each of tabs 1018, 1020, and 1022 also display a title and a favicon associated with the Web site displayed therein. For instance, tab 1018 displays a title 1050 and a favicon 1056 associated with the Web site displayed therein, tab 1020 displays a title 1052 and a favicon 1058 associated with the Web site displayed therein, and tab 1022, displays a title 1054 and a favicon 1060 associated with the Web site.

Application window 1012 is associated with the word processing application corresponding to application icon 1010. Application window 1012 may comprise a title bar 1024, which displays a title 1025 of the document (e.g., document 1027) displayed in application window 1012.

The operating system (e.g., operating system 104, as shown in FIG. 1) is configured to detect user input that causes the operating system to activate the window snap user interface. Upon detection of such user input, the operating system presents, in a predetermined portion of the operating system's GUI, a window snap user interface that simultaneously displays each application window presently opened and each tab opened in such application windows in a respective proxy window. In accordance with an embodiment, the user input comprises an interaction with one or more keys. In one example, the one or more keys may be a combination of two keys, such as a "windows" key and an arrow key (e.g., the left arrow key or the right arrow key). In such an example, the window snap user interface is activated upon the operating system detecting a user pressing both the "windows" key and the arrow key. It is noted that this combination of keys is purely exemplary and that a combination of one or more other keys may be utilized to activate the window snap user interface.

Figure 10B:
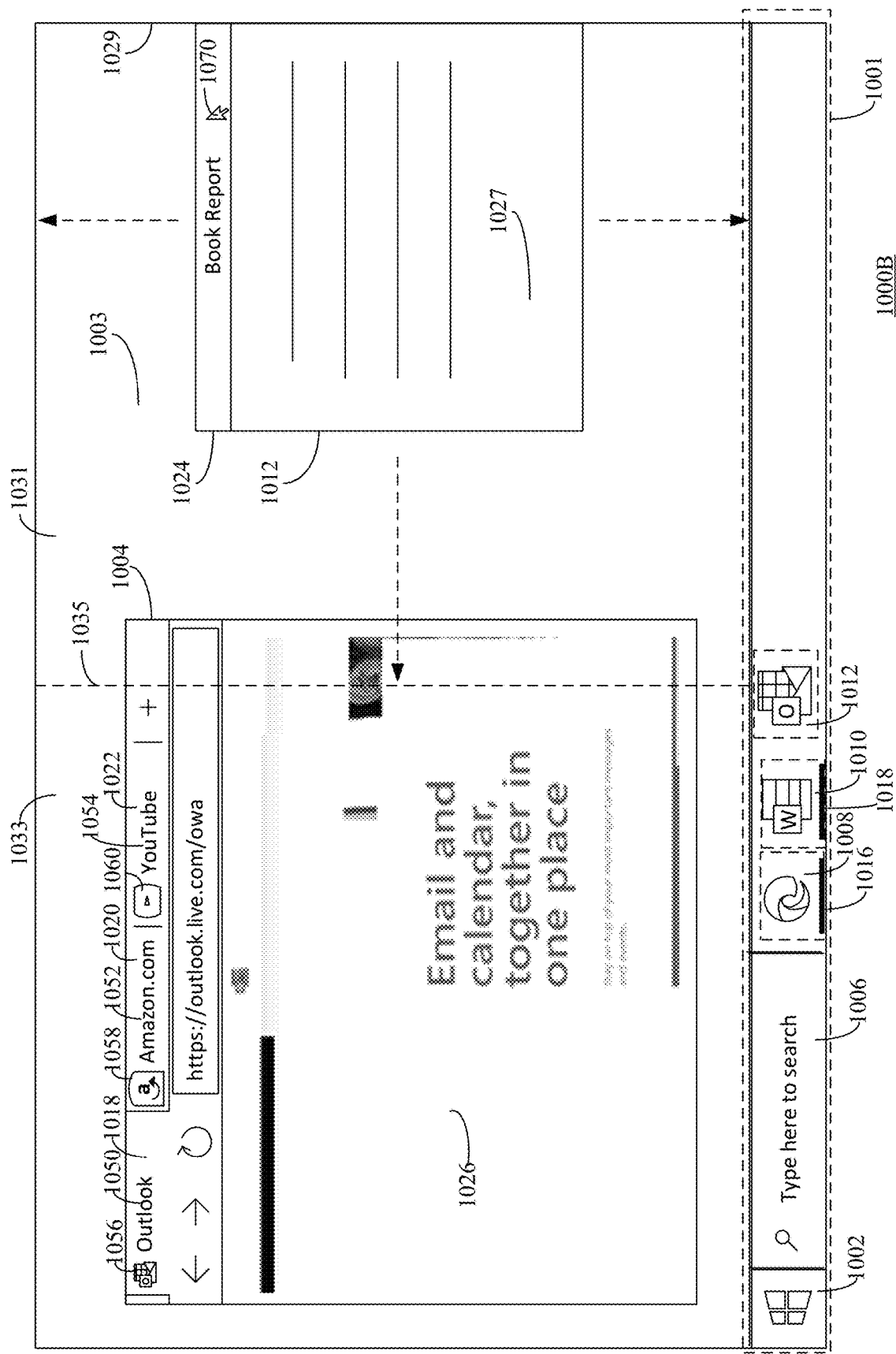

In accordance with another embodiment, the user input comprises a user dragging an application window to an edge of the operating system's GUI (e.g., the operating system's desktop). For example, as shown in FIG. 10A, a user may place a cursor 1070 over a title bar (e.g., title bar 1024) of an application window (e.g., application window 1012). As shown in FIG. 10B, a user may select and move (or drag) application window 1012 to an edge (e.g., edge 1029) of GUI screen 1000B. Responsive to detecting application window 1012 being dragged to edge 1029, the operating enlarges (e.g., maximizes) application window 1012 such that it covers a first portion 1031 of GUI screen 1000B. Dashed line 1035 is used to demarcate different portions of desktop 1003, where the portion to the right of dashed line 1035 corresponds to first portion (or half) 1031 of desktop 1003 and the portion to the left of dashed line 1035 corresponds to a second portion (or half) 1033 of desktop 1003.

Figure 10C:
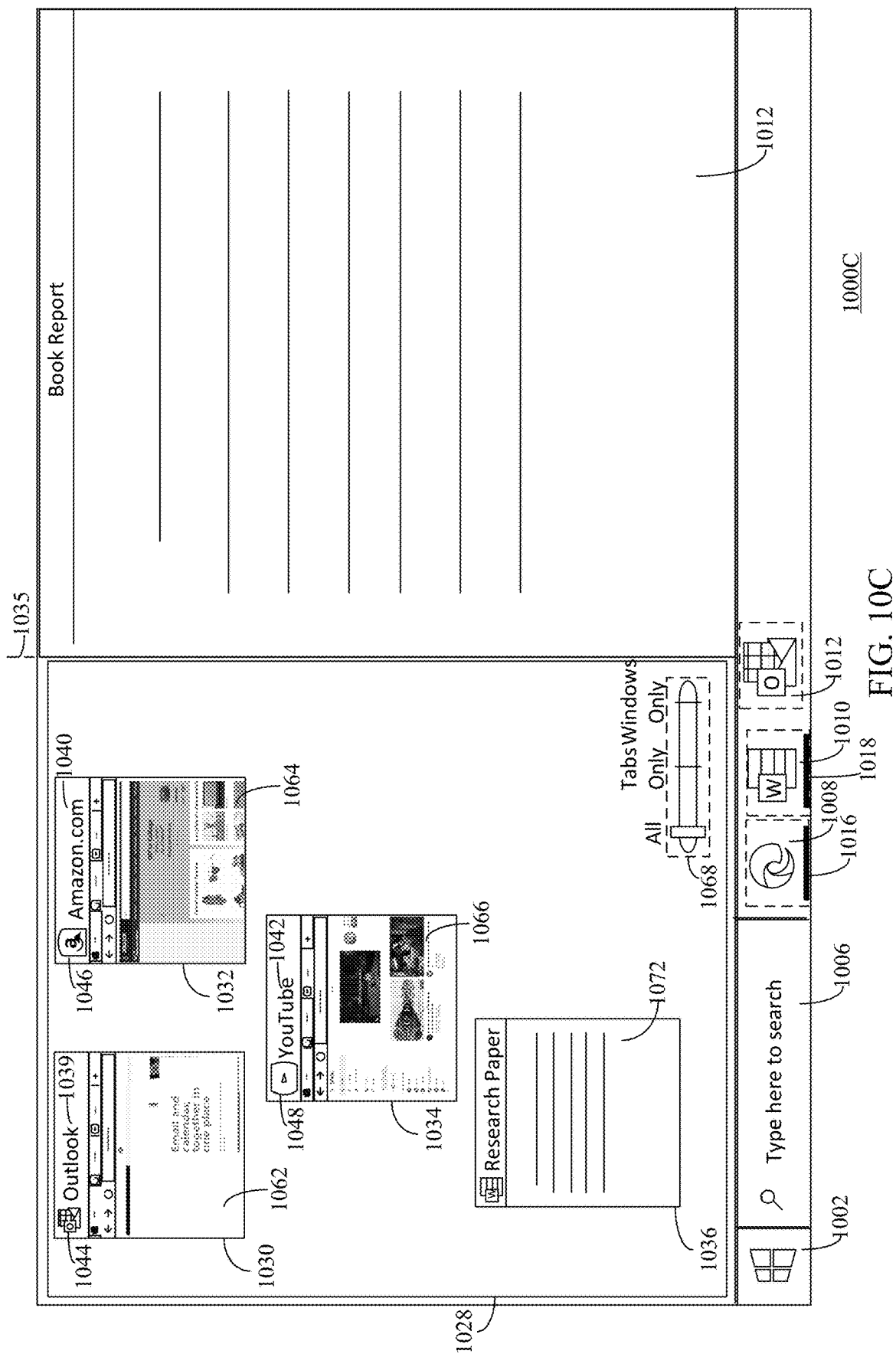

FIG. 10C depicts an example GUI screen 1000C that shows a window snap feature 1028 in accordance with an embodiment. As shown in FIG. 10C, after application window 1012 is dragged to edge 1029, application window 1012 is maximized to cover portion 1031 and initiates the display of window snap feature 1028 in second portion 1033 of desktop 1003. Window snap feature 1028 comprises a GUI window that simultaneously displays a plurality of proxy windows 1030, 1032, 1034, and 1036. In the example shown in FIG. 10C, proxy window 1030 displays the contents of tab 1018 (i.e., Web page 1026 displayed in tab 1018, as shown in FIG. 10B), proxy window 1032 displays the contents of tab 1020 (i.e., the Web page displayed in tab 1020 shown in FIG. 10B), and proxy window 1034 display the contents of tab 1022 (i.e., the Web page displayed in tab 1022 shown in FIG. 10B). Proxy window 1036 displays the contents of a minimized application window (not shown in FIG. 10B) of the word processing application associated with application icon 1010.

The manner in which proxy windows 1030, 1032, and 1034 are displayed is in accordance with the tab information received via the browser application (e.g., application 102), as described above with reference to FIG. 1. For instance, responsive to receiving the tab information for tabs 1030, 1032, and 1034, the operating system analyzes the tab information to determine a title to display for each of proxy windows 1030, 1032, and 1034, an application icon to display for each of proxy windows 1030, 1032, and 1034, a favicon to display for each of proxy windows 1030, 1032, and 1034, and/or a thumbnail to display for each of proxy windows 1030, 1032, and 1034.

In the example shown in FIG. 10C, window snap feature 1028 displays a title 1039 ("Outlook") for proxy window 1030, a title 1040 ("Amazon.com") for proxy window 1032, and a title 1042 ("YouTube") for proxy window 1034. Title 1039 corresponds to title 1050 shown in FIG. 10B, title 1040 corresponds to title 1052, and title 1042 corresponds title 1054.

Window snap feature 1028 further displays a favicon 1044 for proxy window 1030, a favicon 1046 for proxy window 1032, and a favicon 1048 for proxy window 1034. Favicon 1044 corresponds to favicon 1056, favicon 1046 corresponds favicon 1058, and favicon 1048 corresponds to favicon 1060.

Window snap feature 1028 also displays a thumbnail representative of the contents displayed in each of tabs 1018, 1020, and 1022 for each of proxy windows 1030, 1032, and 1034. For instance, window snap feature 1028 displays a thumbnail 1062 for proxy window 1030, a thumbnail 1064 for proxy window 1032, and a thumbnail 1066 for proxy window 1034. Thumbnail 1062 corresponds Web site 1026 shown in FIG. 10B displayed in tab 1018, thumbnail 1064 corresponds to the Web site displayed in tab 1020, and thumbnail 1066 corresponds to the Web site displayed in tab 1022. Each of thumbnails 1062, 1064, and 1066 maintain the same aspect ratio utilized when displaying the corresponding contents via application window 1004 shown in FIG. 10B. That is, thumbnail 1062 is proportional to the corresponding contents displayed via tab 1018 of application window 1004, thumbnail 1064 is proportional to the corresponding contents displayed via tab 1020 of application window 1004, and thumbnail 1066 is proportional to the corresponding contents displayed via tab 1022 of application window 1004.

In accordance with an embodiment, proxy windows displayed via window snap feature 1028 may be grouped in a similar manner as described above with reference to FIGS. 7C and 7D. For instance, window snap feature 1028 may group proxy windows by domain in accordance with a group identifier included in the tab information. In accordance with such an embodiment, window snap feature 1028 may initially display a single proxy window for each group. To display all the tabs associated with a particular group, a user may select the representative proxy window. In response to selecting the representative proxy window, window snap feature 1028 displays a proxy window for each of tab associated with the group, along with any other proxy window already being displayed.

In accordance with an embodiment, window snap feature 1028 further comprises a user interface element 1068 that enables a user to select whether only proxy windows representative of tabs are to be displayed, whether only proxy windows representative of application windows (not comprising a plurality of tabs) are to be displayed, or whether both proxy windows representative of tabs and application windows (not comprising a plurality of tabs) are to be displayed. In the example shown in FIG. 10C, user interface element 1068 comprises a slider-based user interface element comprising three positions. As shown in FIG. 10C, the slider is in the first position ("All"), which causes both proxy windows representative of tabs and application windows to be displayed. A user may move the slider to the second position ("Tabs Only") or the third position ("Windows Only") by sliding the slider to such positions.

Figure 10D:
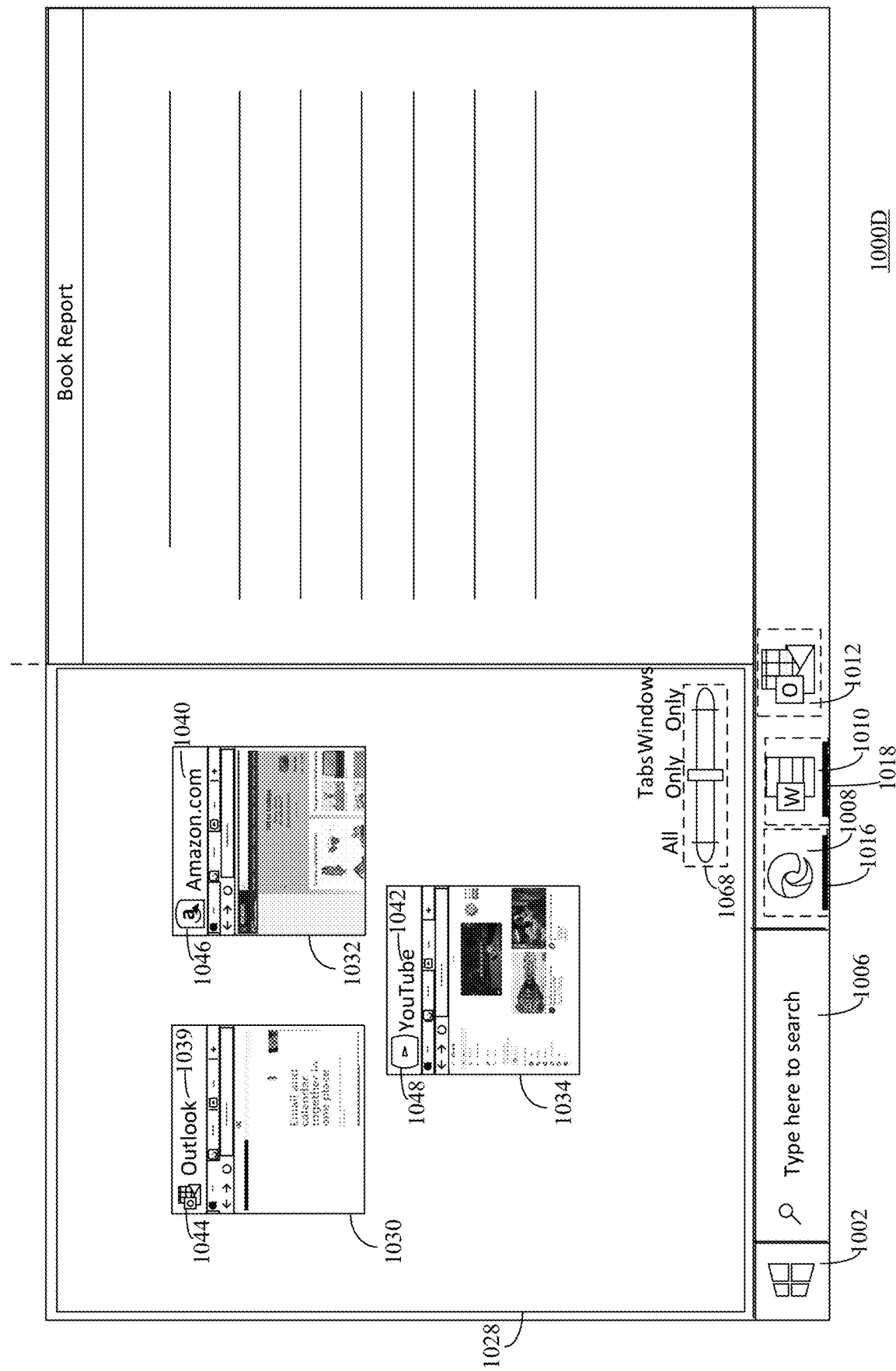

For instance, FIG. 10D depicts window snap feature 1028 in which the slider of user interface element 1068 is in the second position. Responsive to detecting that the slider has been placed in the second position, the operating system causes the proxy windows corresponding to application windows not utilizing a TDI (e.g., proxy window 1034) to be hidden while the proxy windows corresponding to tabs of an application window (e.g., proxy windows 1030, 1032, and 1034) to be maintained. As shown in FIG. 10D, only proxy windows 1030, 1032, and 1034 are displayed, while proxy window 1036 is no longer displayed.

Figure 10E:
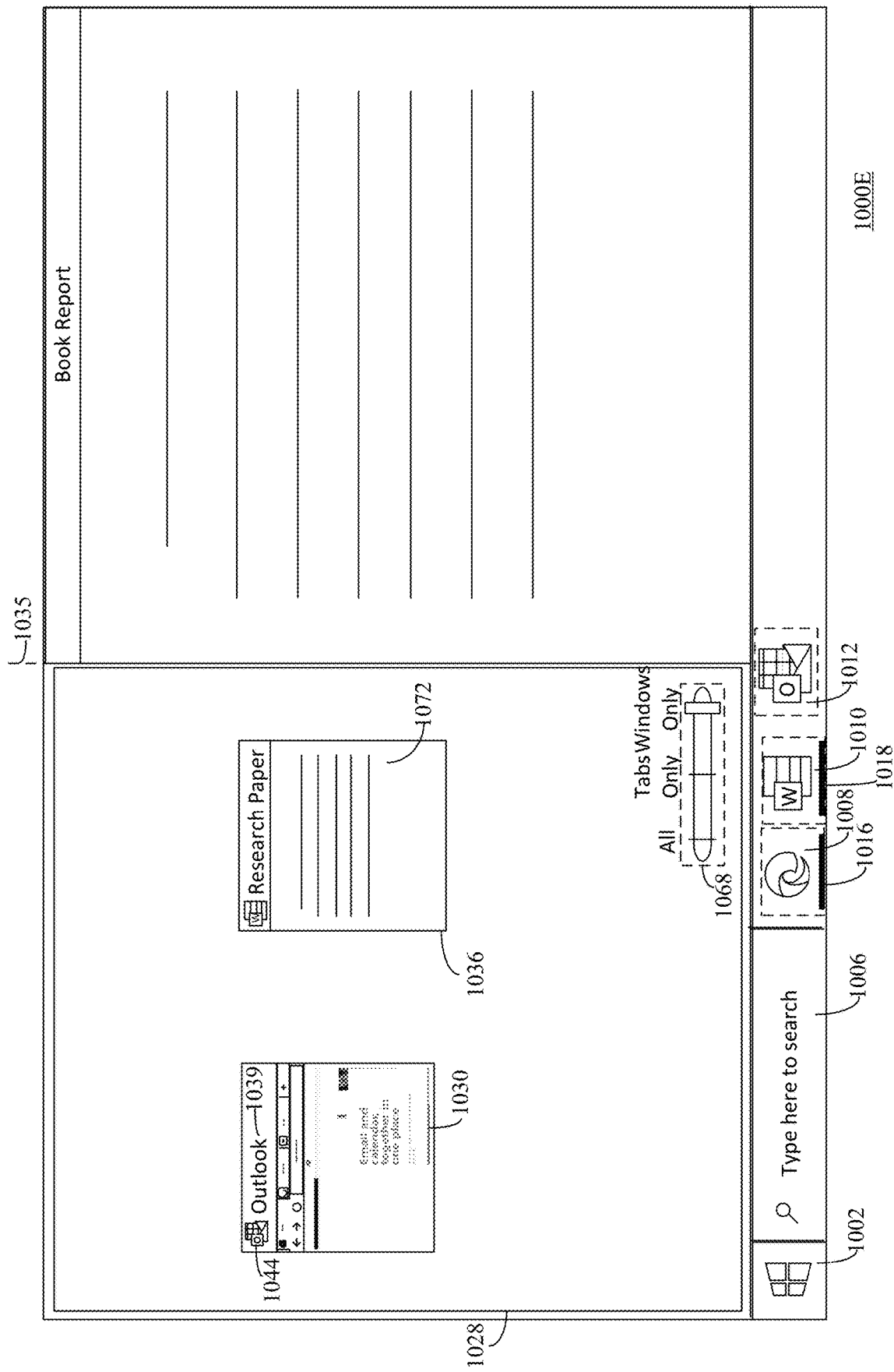

FIG. 10E depicts task switcher feature 1028 in which the slider of user interface element 1068 is in the third position.

Responsive to detecting that the slider has been placed in the third position, the operating system causes the proxy windows corresponding to tabs of an application that are not currently active (e.g., proxy windows 1032 and 1034) to be hidden while the proxy windows corresponding to application windows not utilizing a TDI (e.g., proxy window 1036) and a proxy window representative of the last active tab of application window 1004 (i.e., proxy window 1030) to be displayed. As shown in FIG. 10E, only proxy windows 1030 and 1036 are displayed, while proxy windows 1032 and 1034 are no longer displayed.

Figure 10F:
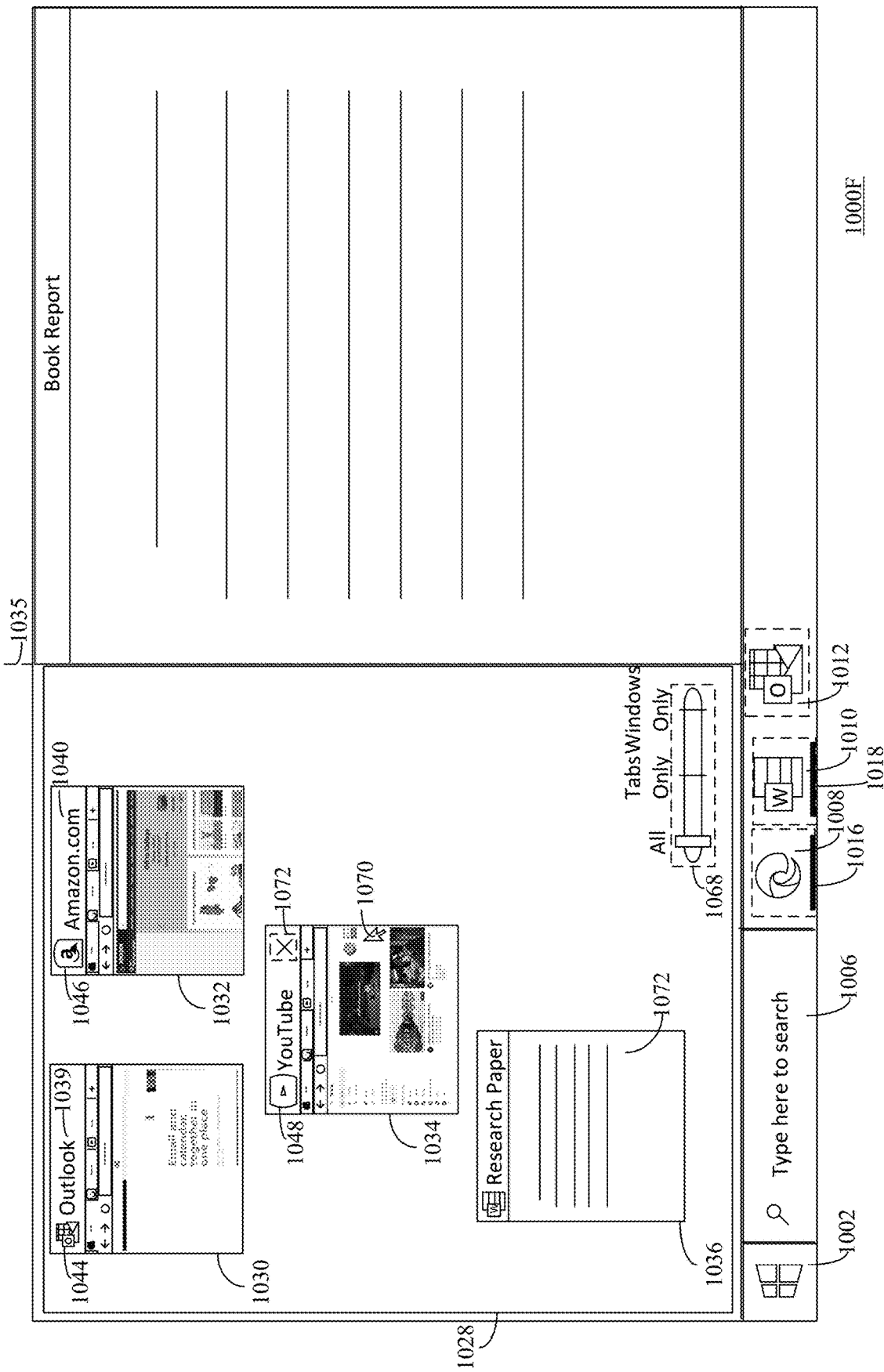
Figure 10G:
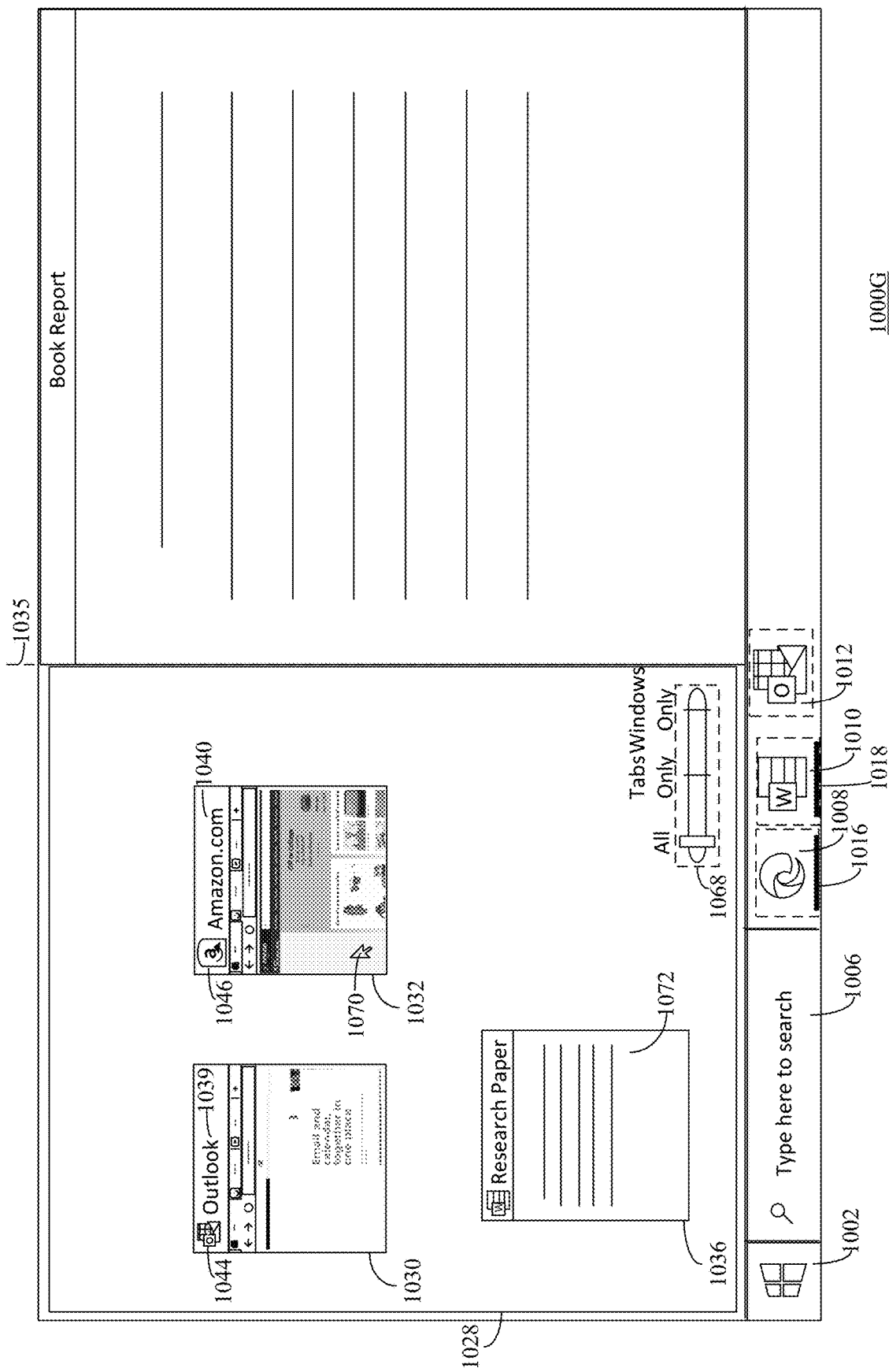

In accordance with an embodiment, a user is enabled to close opened application windows and/or tabs via window snap feature 1028. For instance, as shown in FIG. 10F, a user may select a proxy window to close, for example, by hovering a cursor 1070 over the proxy window (e.g., proxy window 1034). Upon doing so, a user-interactable element 1072 may be displayed proximate to the proxy window. User-interactable element 1072, when selected by the user, will close the proxy window and the application window or tab corresponding thereto. For instance, in the example shown in FIG. 10F, a user may select user-interactable element 1072 to close proxy window 1034. Referring to FIG. 1, responsive to operating system 104 detecting user input with respect to user-interactable element 1072, tab data model API 112 may send a command to tab manager API 108 to close the corresponding tab. The command may comprise an identifier of the proxy window (e.g., a tab identifier or the title of the proxy window). Responsive to receiving the command, application 1002 identifies the corresponding tab based on the identifier and closes the tab. As shown in FIG. 10G, responsive to selecting user-interactable element 1072, proxy window 1034 (along with tab 1022) are closed and no longer displayed.

Figure 10H:
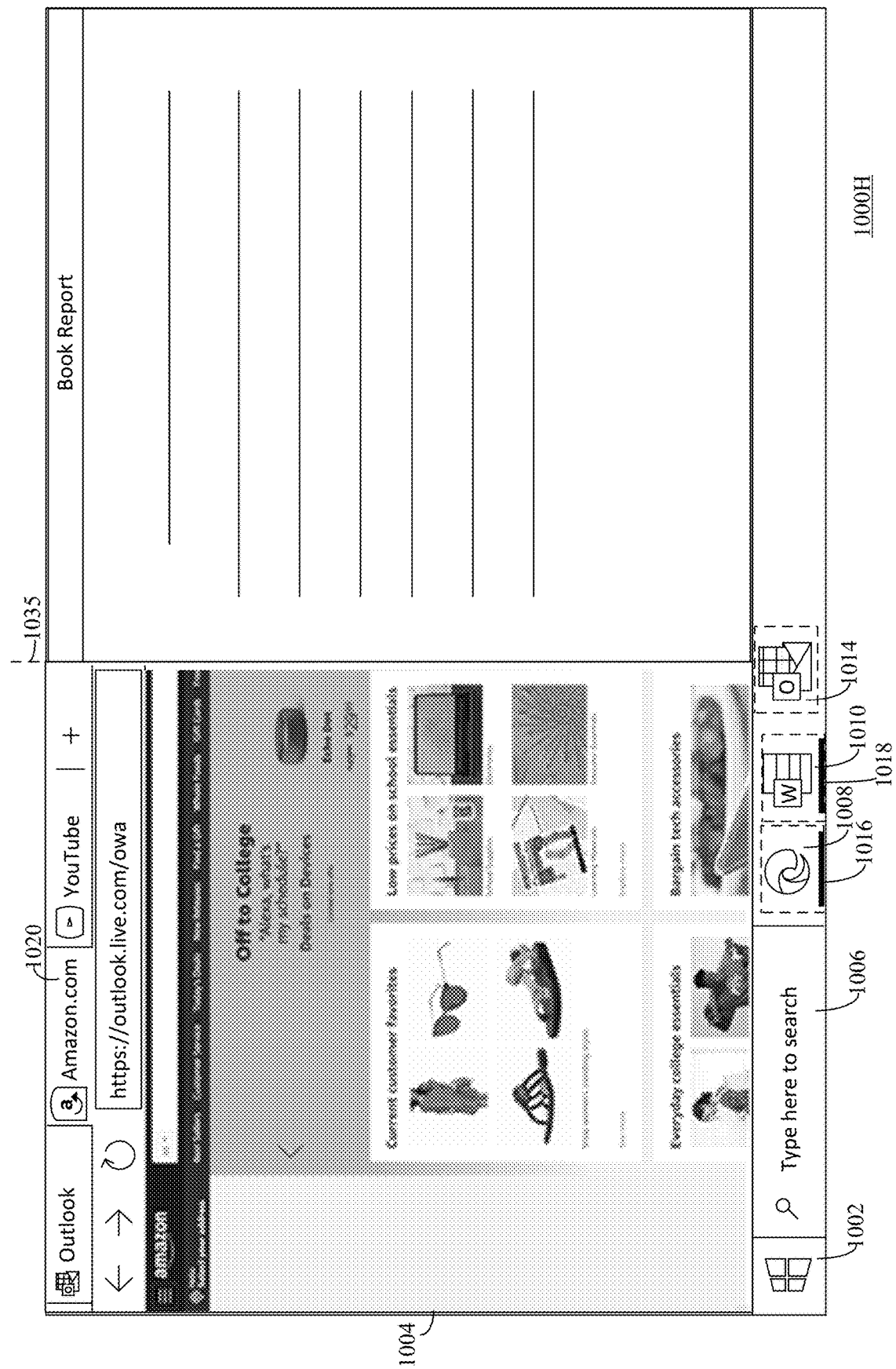

In accordance with an embodiment, a user is enabled to switch tabs utilizing task switcher feature 1028. For instance, referring again to FIG. 10G, a user may select a proxy window displaying an open tab, for example, by clicking on the proxy window (e.g., proxy window 1032). Upon selecting the proxy window, window snap feature 1028 is no longer displayed and the corresponding application window is maximized to cover second portion 1033 of desktop 103, thereby presenting a split-screen view of two application windows. For instance, in the example shown in FIG. 10G, a user selects proxy window 1032. Referring to FIG. 1, responsive to operating system 104 detecting user input that selects proxy window 1032, tab data model API 112 may send a command to tab manager API 108 that comprises an identifier of the selected proxy window (e.g., a tab identifier or title of the proxy window). Responsive to receiving the command, application 102 identifies the corresponding tab using the identifier and switches to tab 1020, as tab 1020 corresponds to selected proxy window 1032. As shown in FIG. 10H, tab 1020 is now active in application window 104, and application window 104 is maximized to cover second portion 1033 of desktop 103.

Figure 11:
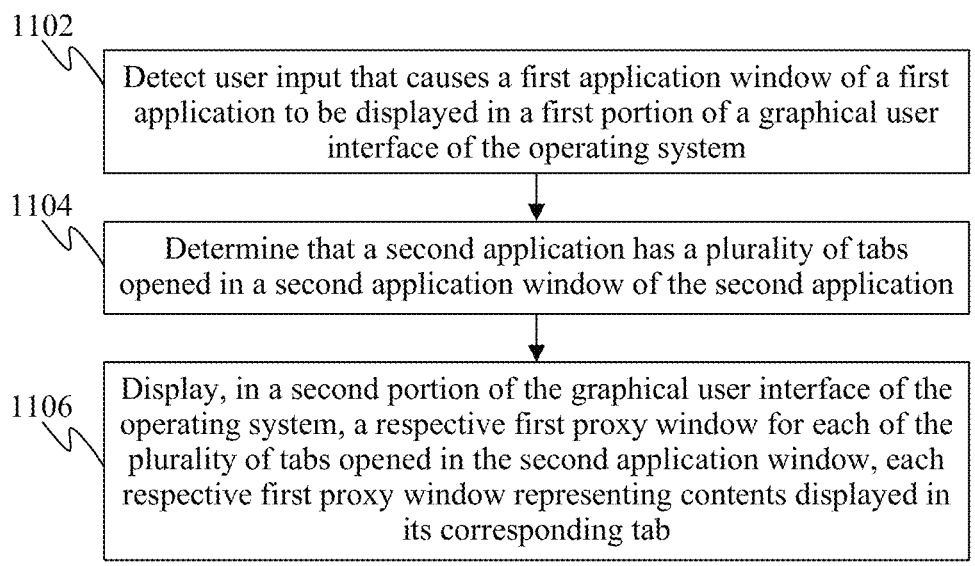
FIG. 11 shows a flowchart of a method performed by an operating system executing on a computing device to simultaneously display proxy windows for application windows and tabs included in application windows when a window snap feature is activated in accordance with example embodiment.
Figure 12:
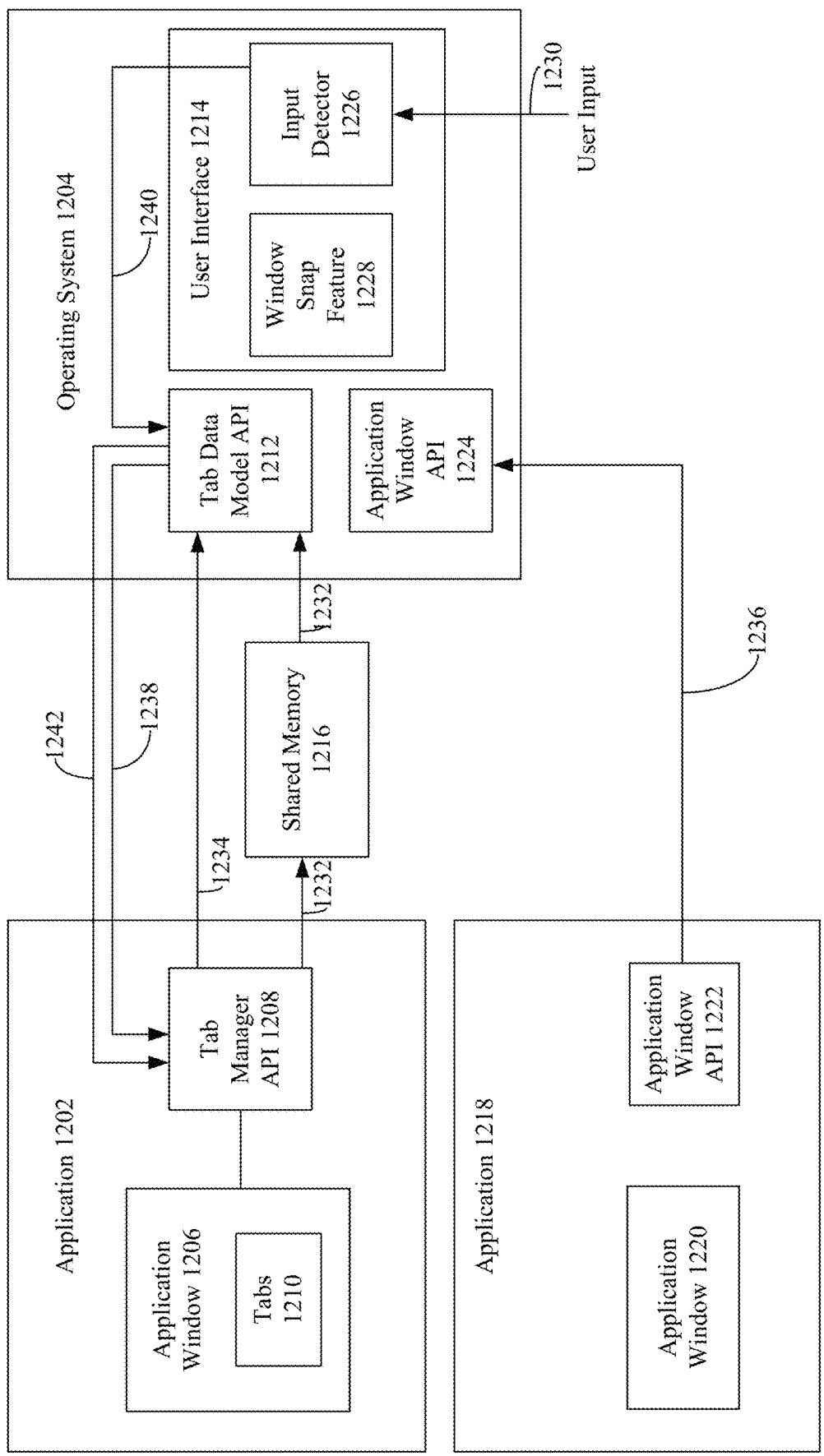
FIG. 12 shows a block diagram of a system for simultaneously displaying proxy windows for application windows and tabs included in application windows when a window snap feature is activated in accordance with an example embodiment.

Accordingly, proxy windows for application windows and tabs included in application windows may be simultaneously displayed via a window snap user interface in many ways. For example, FIG. 11 shows a flowchart 1100 of a method performed by an operating system executing on a computing device to simultaneously display proxy windows for application windows and tabs included in application windows when a window snap feature is activated in accordance with example embodiment. In an embodiment, flowchart 1100 may be implemented by system 1200, as shown in FIG. 12. FIG. 12 shows a block diagram of a system 1200 for simultaneously displaying proxy windows for application windows and tabs included in application windows via a window snap user interface in accordance with an example embodiment. As shown in FIG. 12, system 1200 includes a first application 1202, a second application 1218, an operating system 1204, and a shared memory 1216. Application 1202, application 1218, operating system 1204, and shared memory 1216 are examples of application 102, application 118, operating system 104, and shared memory 116, as respectively described above with reference to FIG. 1. Application 1202 comprises an application window 1206 and a tab manager application programming interface (API) 1208. Application window 1206 comprises a plurality of tabs 1210. Application window 1206 is an example of application window 1206 and application window 1004, as respectively described above with reference to FIGS. 1 and 10A-10H. Tabs 1210 are examples of tabs 110 and tabs 1018, 1020, and 1022, as respectively described above with reference to FIGS. 1 and 10A-10H. Tab manager API 1208 is an example of tab manager API 108, as described above with reference to FIG. 1. Operating system 1204 comprises a tab data model API 1212, user interface 1214, and an application window API 1224. Tab data model API 1212 and user interface 1214 are examples of tab data model API 112 and user interface 114, as respectively described above with reference to FIG. 1. User interface 1214 comprises an input detector 1226 and a window snap feature 1228. Window snap feature 1228 is an example of window snap feature 1028, as described above with reference to FIGS. 10A-10H. Application 1218 comprises an application window 1220 and an application window API 1222. Application 1218 may be any software application not utilizing a TDI, although the embodiments described herein are not so limited. Other structural and operational embodiments will be apparent to persons skilled in the relevant art(s) based on the following discussion regarding flowchart 1100 and system 1200.

Flowchart 1100 of FIG. 11 begins with step 1102. In step 1102, user input is detected that causes a first application window of a first application to be displayed in a first portion of a graphical user interface of the operating system. For example, with reference to FIG. 12, input detector 1226 detects user input 1230 that causes application window 1220 of application 1218 to be displayed in a first portion of user interface 1214. With reference to FIGS. 10A-10C, user input is detected that causes application window 1012 to be displayed in first portion 1031 of desktop 1003. Input detector 1226 is configured to various types of user input, e.g., touch screen input, mouse input, keyboard input, stylus input, etc.).

In accordance with one or more embodiments, user input 1230 comprises an interaction with one or more keys. In one example, the one or more keys may be a combination of two keys, such as a "windows" key and an arrow key (e.g., the left arrow key or the right arrow key). In such an example, window snap feature 1228 is activated upon the operating system detecting a user pressing both the "windows" key and the arrow key. It is noted that this combination of keys is purely exemplary and that a combination of one or more other keys may be utilized to activate the window snap user interface.

In accordance with another embodiment (as shown in FIGS. 10B-10C), user input 1230 comprises a user dragging application window 1012 to edge 1029 of the operating system's GUI (e.g., desktop 103). For example, as shown in FIG. 10B, a user may place a cursor 1070 over title bar 1024 of application window 1012, select title bar 1024 and drag application window 1012 to edge 1029. Responsive to detecting application window 1012 being dragged to edge 1029, operating system 1204 enlarges (e.g., maximizes) application window 1012 such that it covers first portion 1031.

At step 1104, a determination is made that a second application has a plurality of tabs opened in a second application window of the second application. For example, with reference to FIG. 12, tab data model API 1212 determines that application window 1202 has a plurality of tabs 1210 opened in application window 1206. Tab data model API 1212 may determine that application 1202 has a plurality of tabs 1210 opened in application window 1206 based on tab information received via tab manager API 1208.

In accordance with one or more embodiments, tab manager API 1208 may provide tab information 1232 to shared memory 1216. Tab manager API 1218 may further provide a notification 1234 to tab data model API 1212 indicating that tab information has been stored in shared memory 1216. Responsive to receiving notification 1234, tab data model API 1212 retrieves tab information 1232 from shared memory 1216.

In accordance with one or more embodiments, tab information 1232 comprises characteristics of tabs 1210. Such characteristics include, but are not limited, a number of tabs 1210 opened in application window 1206, a tab identifier that uniquely identifies each of tabs 1210, an icon representative of application 1202, a group identifier for each of tabs 1210, a title associated with each of tabs 1210, a thumbnail representative of the contents displayed for each of tabs 1210, an indication of a most recently-active tab of tabs 1210, a time stamp representative of a time at which each of tabs 1210 was created, or, an indication of a most recently-active tab of tabs 1210, a time stamp representative of a time at which each of tabs 1210 was last active. Tab data model API 1212 may determine that a plurality of tabs 1210 are opened in application window 1206 based on the number of tabs 1210, tab identifiers, and/or title received via tab manager API 1208.

It is noted that certain tab information is received directly from tab manager API 1208 rather than from shared memory 1216. For examples, the thumbnails and/or icons may be provided directly from tab manager API 1208, and therefore, tab manager API 1208 may not store the thumbnails and/or icons in shared memory 1216.

At step 1106, responsive to the first application window being displayed in the first portion of the graphical user interface of the operating system and determining and determining that the second application has the plurality of tabs opened in the second application window of the second application, a respective first proxy window for each of the plurality of tabs opened in the second application window is displayed in a second portion of the GUI of the operating system. Each respective first proxy window represents contents displayed in its corresponding tab. For example, with reference to FIGS. 10B, 10C, and 12, operating system 1204 causes window snap feature 1228 (or window snap feature 1028) to display a respective first proxy window (proxy windows 1030, 1032, and 1034) for each of tabs 1018, 1020, and 1022 opened in application window 1204 (or application window 1004). Proxy window 1030 represents the contents displayed in tab 1018 (i.e., Web site 1026, as shown in FIG. 10B), proxy window 1032 represents the contents displayed in tab 1020, and proxy window 1034 represents the contents displayed in tab 1022.

In accordance with one or more embodiments, each respective first proxy window comprises a thumbnail representative of the contents displayed in its corresponding tab. For example, with reference to FIGS. 10B, 10C, and 12, proxy window 1030 comprises thumbnail 1062, which is representative of the contents (i.e., Web page 1026, as shown in FIG. 10B) displayed in tab 1018. Proxy window 1032 comprises thumbnail 1064, which is representative of the contents displayed in tab 1020.

In accordance with one or more embodiments, each thumbnail is sized proportionally to the size of the second application window. For example, with reference to FIG. 12, tab data model API 1212 may provide a request 1238 to tab manager API 1208 for a thumbnail for each proxy window to be generated and displayed. Request 1238 may specify one or more dimensions of the thumbnails to be provided. For instance, tab data model API 1212 identifies the application window (i.e., application window 1206) in which tabs 1210 are located using a handle of application window 1206 associated with tab manager API 1208 and tab data model API 1212. Tab data model API 1212 determines dimension(s) associated with application window 1206 (e.g., the height and width) and includes the dimension(s) in request 1238. Application 1202 generates a thumbnail for each of tabs 1210 in accordance with the dimension(s) in the request and provides the thumbnails to tab manager API 1208, which in turn provides the thumbnails to data model API 1212. In accordance with an embodiment, tab data model API 1212 may also provide a scale factor in request 1238, which application 1202 utilizes to size the thumbnails such that each of the thumbnails are proportional to the contents displayed in application window 1206. For instance, if the dimensions of the contents displayed via application window 1206 are 300 pixels by 500 pixels, and the scale factor is 1:5, tab manager API 1208 scales the contents in accordance to the scale factor to generate a thumbnail having the dimensions 60 pixels by 100 pixels. In accordance with another embodiment, tab manager API 1208 provides the contents to tab data model API 1212 in its original form and tab data model API 1212 scales the contents to generate the thumbnails.

In accordance with one or more embodiments, a second proxy window for a third application executing on the computing device is displayed in the second portion of the GUI of the operating system simultaneously with the first proxy windows. The second proxy window represents the contents displayed in a third application window of the third application. A user interface element is provided that, when activated, causes the second proxy window to be hidden while maintaining the display of the first proxy windows. For example, with reference to FIGS. 10B, 10C, and 12, a second proxy window (e.g., proxy window 1036) for a word processing application corresponding to application icon 1010 is displayed in second portion 1033 of desktop 1003 simultaneously with first proxy windows (e.g., proxy windows 1030, 1032, and 1034).

Proxy window 1036 represents the contents (e.g., document 1027) displayed in application window 1012 (or application window 1220). For example, proxy window 1036 comprises thumbnail 1072, which is representative of the contents (e.g., document 1027) displayed in application window 1012. As shown in FIG. 12, application window API 1222 may provide application window information 1236 to application window API 1224 of operating system 1204. Application window information 1236 may comprise characteristics of application windows (e.g., application window 1202) opened for application 1218. Such characteristics include, but are not limited, a number of application windows opened for application 1218, a window identifier that uniquely identifies each of the application windows, an icon representative of application 1218, a title associated with each of the application windows opened for application 1218, or a thumbnail representative of the contents displayed for each of the application windows opened for application 1218. Application window API 1224 provides the application window information to window snap feature 1228. Window snap feature 1228 generates and displays the proxy windows (e.g., proxy window 1036) in accordance with the received application window information 1236.

Window snap feature 1028 provides user interface element 1068 that, when activated (e.g., placed in a second position, as shown in FIG. 10D), causes proxy window 1036 to be hidden while maintaining the display of proxy windows 1030, 1032, and 1034.

In accordance with one or more embodiments, user input is detected to close a particular first proxy window of the first proxy windows, and, responsive to detecting the user input to close the particular first proxy window of the first proxy windows, a command is provided to the second application to close a tab of the plurality of tabs corresponding to the particular first proxy window. For example, with references to FIGS. 10F, 10G, and 12, input detector 1226 is configured to detect user input to close proxy window 1034. For instance, input detector 1226 may detect that the user has activated user interface element 1072. Responsive to input detector 1226 detecting such user input, input detector 1226 provides a notification 1240 to tab data model API 1212 that causes tab data model API 1212 to provide a command 1242 to tab manager API 1208. Responsive to receiving command 1242, application 1202 closes tab 1022, which corresponds to proxy window 1034. As shown in FIG. 10G, proxy window 1034 (along with tab 1022) is closed, and therefore, is no longer displayed.

D. Proxy Windows for Applications Executing via a Remote Desktop Application

Figure 13A:
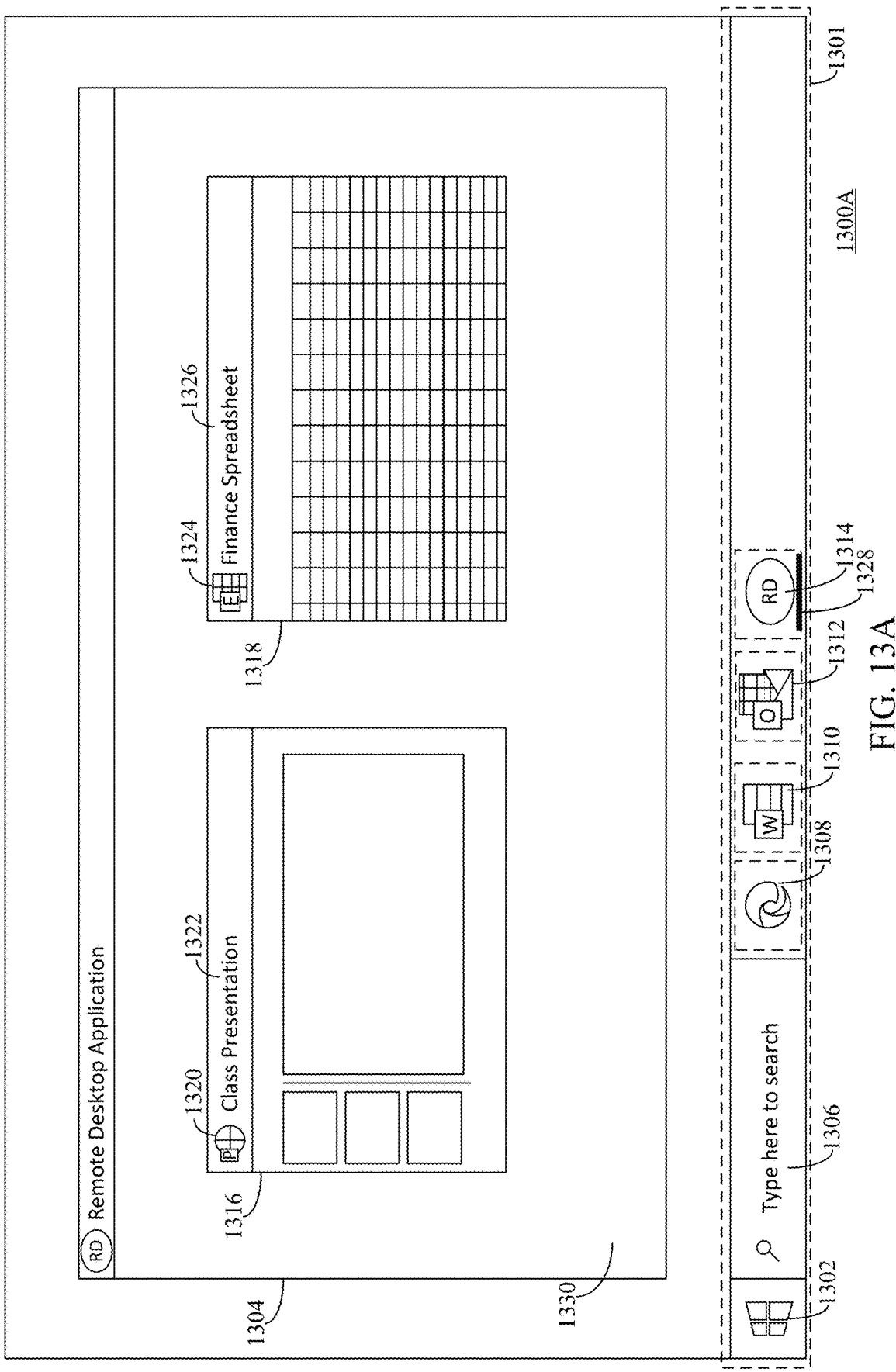
FIGS. 13A-13E depict example GUIs for providing proxy windows for applications executing via a remote desktop application in accordance with example embodiments.
Figure 13B:
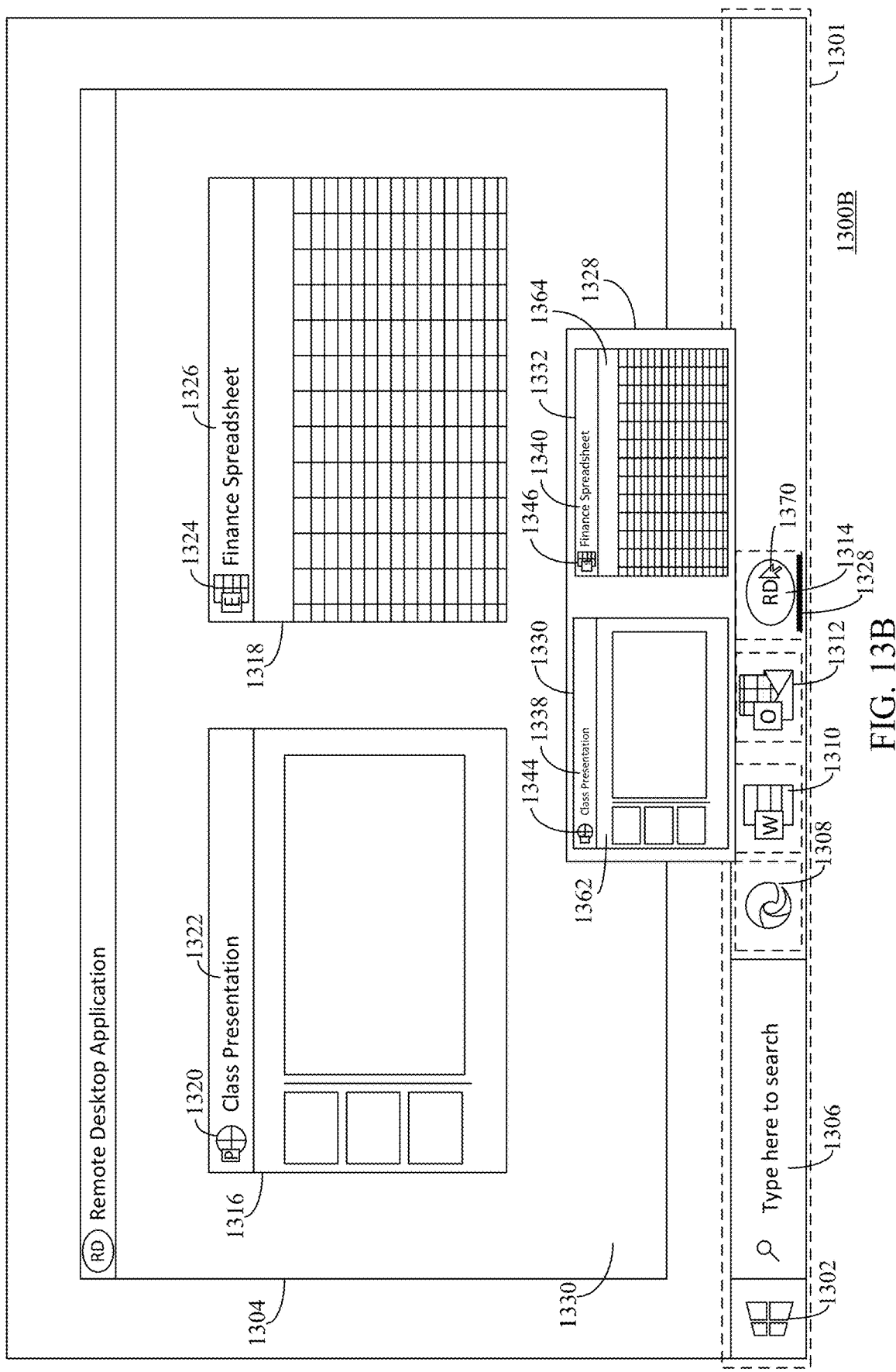

FIGS. 13A-13B depict example GUI screens 1300 that illustrate the simultaneous display of proxy windows for applications executing remotely via a remote desktop application in accordance with an example embodiment. As shown in FIG. 13A, GUI screen 1300A comprises a taskbar 1301, which is an example of taskbar 1001, as described above with reference to FIG. 10A. Taskbar 1301 comprises a start menu user interface element 1302, a search bar user interface element 1306 and a plurality of application icons 1308, 1310, 1312 and 1314. Start menu user interface element 1302, search bar user interface element 1306 and application icons 1308, 1310, and 1312 are examples of start menu user interface element 1002, search bar user interface element 1006 and application icons 1008, 1010, and 1012, as respectively described above with reference to FIGS. 10A-10H. As further shown in FIG. 13, taskbar 1301 comprises an application icon 1314. Application icon 1314 corresponds to a client-based remote desktop application, which is configured to connect to a remote computing device and cause an operating system UI (e.g., a desktop) to be displayed remotely thereon. A user is enabled to remotely launch applications and cause applications to execute on the remote computing device via the remote desktop application. Such applications are accessible at the user's local computing device via the remote desktop application. For instance, as shown in FIG. 13A, the remote desktop application corresponding to application icon 1314 is executing on the user's local computing device. Accordingly, a user interface element 1328, which indicates that the remote desktop application is executing, is displayed proximate to application icon 1314.

As further shown in FIG. 13A, an application window 1304 associated with the remote desktop application is also opened. Within application window 1304 is an operating system UI (e.g., a desktop 1330) in which application windows 1316 and 1318 are opened. Application windows 1316 and 1318 may be referred to as sub-views within application window 1304. Additional operating system UI elements (e.g., a taskbar, start menu, etc.) are not shown for brevity. Application windows 1316 and 1318 correspond to applications that are executing on the remote computing device. In the example shown in FIG. 13A, application window 1316 corresponds to a presentation application (e.g., Microsoft® PowerPoint® published by Microsoft® Corporation), and application window 1318 corresponds to a spreadsheet application (e.g., Microsoft® Excel® published by Microsoft® Corporation).

As also shown in FIG. 13A, application window 1316 comprises an application icon 1320 of the presentation application and a title 1322 of the document opened and presented via the presentation application. Application window 1318 comprises an application icon 1324 of the spreadsheet application, and a title 1326 of the document opened and presented via the spreadsheet application.

In accordance with an embodiment, the operating system is configured to generate and display proxy windows for each of the sub-views included in application window 1304 in a similar manner as described above with reference to Subsections A-C. For instance, the operating system may display proxy windows via a task switcher feature of the operating system executing on the user's local computing device (i.e., the device via which the remote desktop application is launched) in accordance with Subsection A, display proxy windows via a taskbar feature of the operating system executing on the user's local computing device in accordance with Subsection C, or display proxy windows via a window snap feature of the operating system executing on the user's local computing device in accordance with Subsection C.

An example GUI screen for presenting proxy windows via a taskbar feature is presented via FIG. 13B. As shown in FIG. 13B, the operating system detects user input (e.g., hovering a cursor 1370 over application icon 1314 for a predetermined time period) that causes the operating system to activate a tab preview feature 1328 via taskbar 1301. Tab preview feature 1328 simultaneously displays a plurality of proxy windows 1330 and 1332. In the example shown in FIG. 13B, proxy window 1332 displays the contents of application window 1316 proxy window 632 displays the contents of application window 1318.

The manner in which proxy windows 1330 and 1332 are displayed is in accordance with the tab information received via the remote desktop application in a similar manner described above with respect to the browser application described above in FIGS. 1-12. For instance, the remote desktop application may be associated with a tab (or sub-view) manager API (e.g., tab manager API 108) that provides tab (or sub-view information) for application windows 1316 and 1318. The sub-view information may be received by a tab (or sub-view) data model API (e.g., tab data model API 112) of the operating system (e.g. operating system 104) executing on the user's local computing device. Responsive to receiving the tab (or sub-view) information for application windows 1316 and 1318, the operating system analyzes the tab (or sub-view) information to determine a title to display for each of proxy windows 1330 and 1332, a favicon or application icon to display for each of proxy windows 1330 and 1332, an indication of a view of sub-views (or application windows 1316 or 1318) that is currently active, a time stamp representative of a time at which each of application windows 1316 or 1318 was created, a time stamp representative of a time at which each of application windows 1316 or 1318 was last activated, and/or a thumbnail to display for each of application windows 1316 or 1318. The operating system may also determine which of the application windows displayed via the remote desktop application are to have a proxy window generated therefor based on a group identifier included in the tab (or sub-view) information.

In the example shown in FIG. 13B, tab preview feature 1328 displays a title 1338 ("Class Presentation") for proxy window 1330, and a title 1340 ("Finance Spreadsheet") for proxy window 1332. Title 1338 corresponds to title 1322 of application window 1316, and title 1340 corresponds to title 1326 of application window 1318.

Tab preview feature 1328 further displays an application icon 1344 for proxy window 1330, and an application icon 1346 for proxy window 1332. Application icon 1344 corresponds to application icon 1320 of application window 1316, and application icon 1346 corresponds application icon 1324 associated application window 1318.

Tab preview feature 1328 also displays a thumbnail representative of the contents displayed in each of application windows 1316 and 1318. For instance, tab preview feature 1328 displays a thumbnail 1362 that corresponds to the contents of application window 1316, and tab preview feature 1328 displays a thumbnail 1364 that corresponds to the contents of application window 1318. Each of thumbnails 1362 and 1364 maintains the same aspect ratio as its corresponding application window. In the example shown in FIG. 13B, each of thumbnails 1362 and 1364 are proportional to the corresponding contents displayed via application windows 1316 and 1318.

Figure 13C:
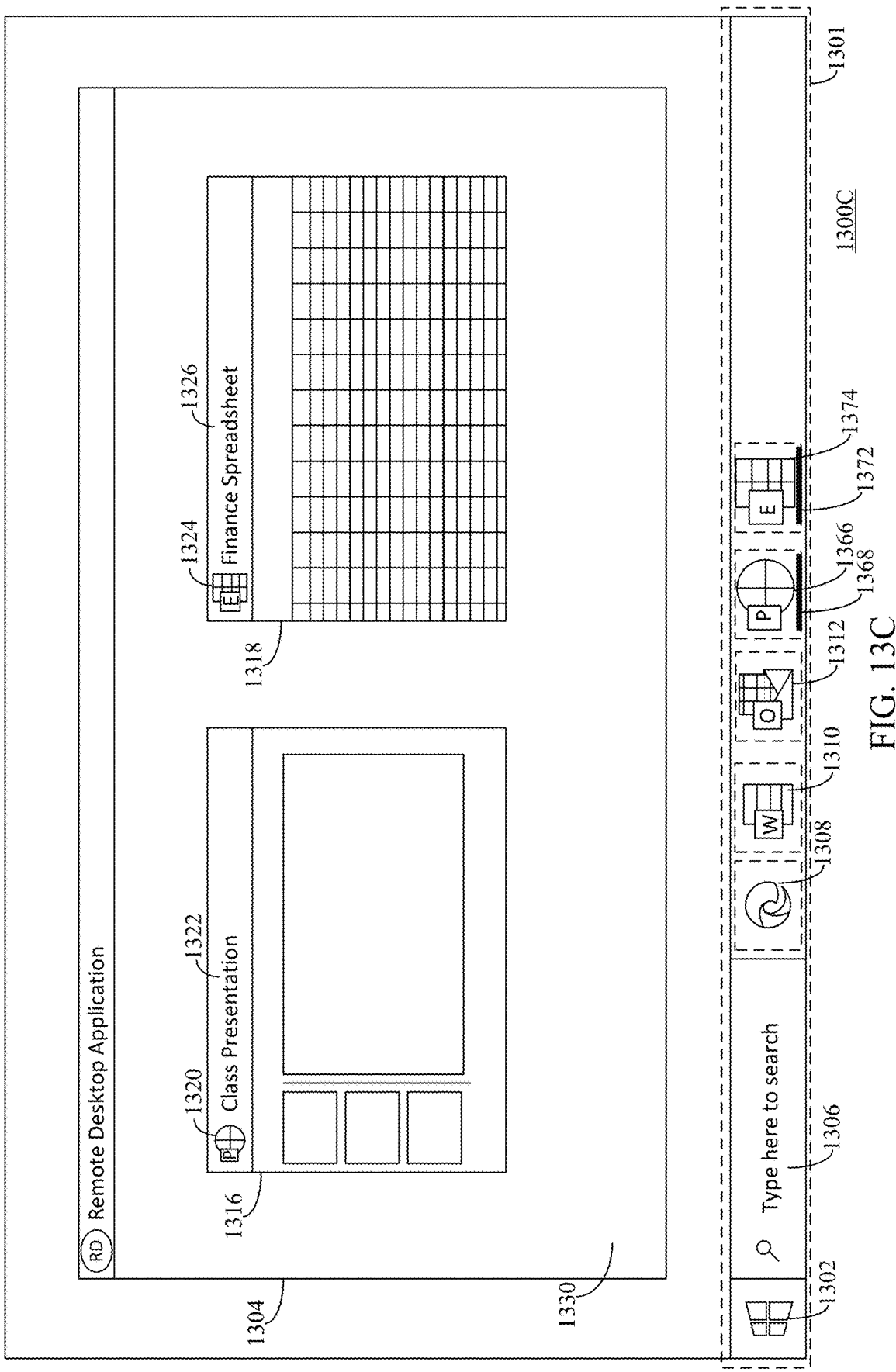

In accordance with an embodiment, rather than displaying application icon 1314 in taskbar 1301, application icons for the applications hosted via the remote desktop application may be displayed in taskbar 301. For instance, FIG. 13C depicts an example GUI screen 1300C in which application icons for application hosted via a remote desktop application are displayed via a taskbar in accordance with an example embodiment. As shown in FIG. 13C, applications icons 1366 and 1374 are displayed via taskbar 1301. Application icon 1366 corresponds to application icon 1320 of the presentation application executing via the remote desktop application. Application icon 1374 corresponds to application icon 1324 of the spreadsheet application executing via the remote desktop application. As further shown in FIG. 13C, a user interface element 1368, which indicates that the presentation application is executing (in this case, via the remote desktop application) and an application window (i.e., application window 1316) is opened therefor), is displayed proximate to application icon 1366. As also shown in FIG. 13C, a user interface element 1372, which indicates that the spreadsheet application is executing (in this case, via the remote desktop application) and an application window (i.e., application window 1318) is opened therefor), is displayed proximate to application icon 1366.

Figure 13D:
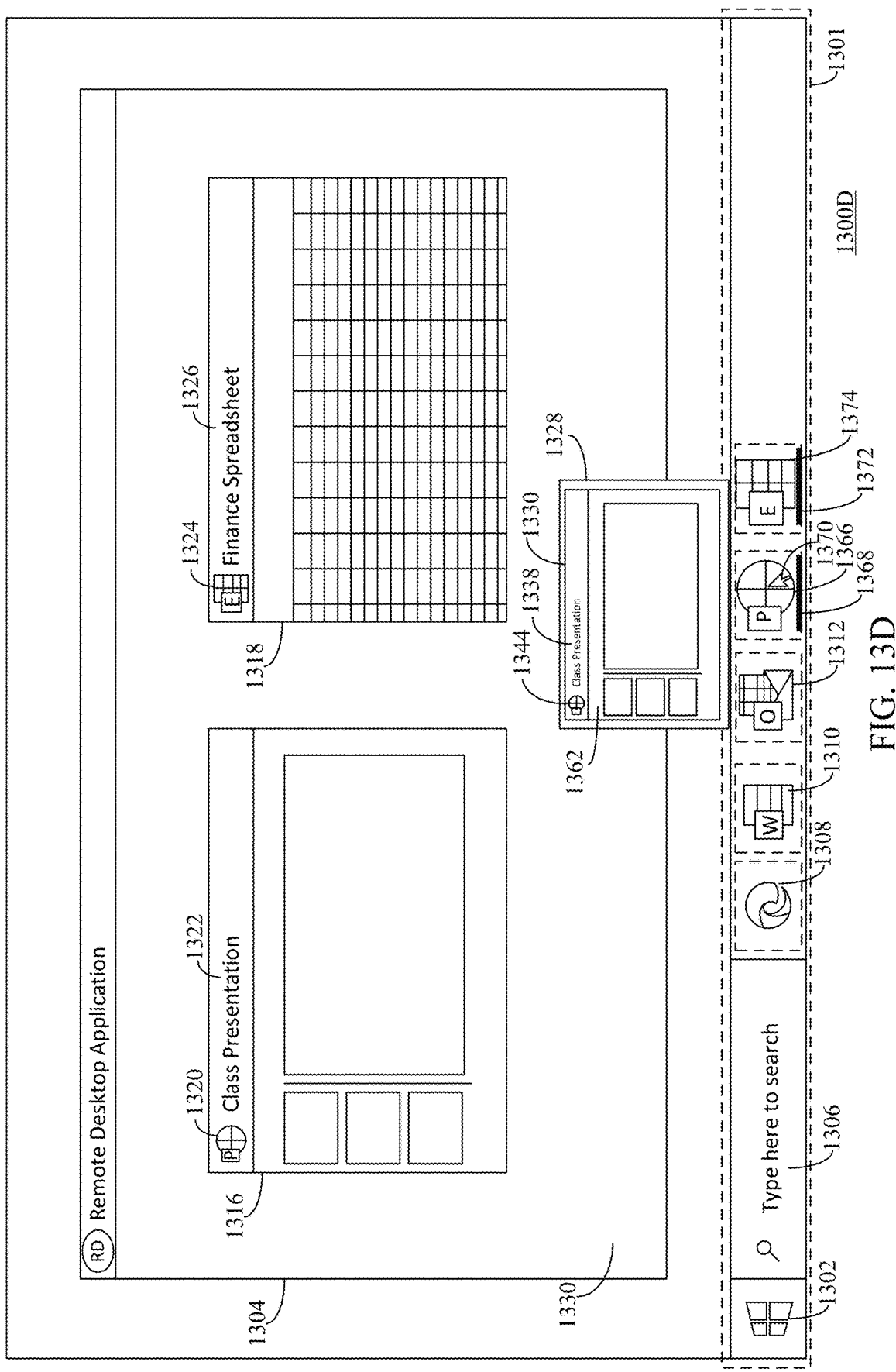
Figure 13E:
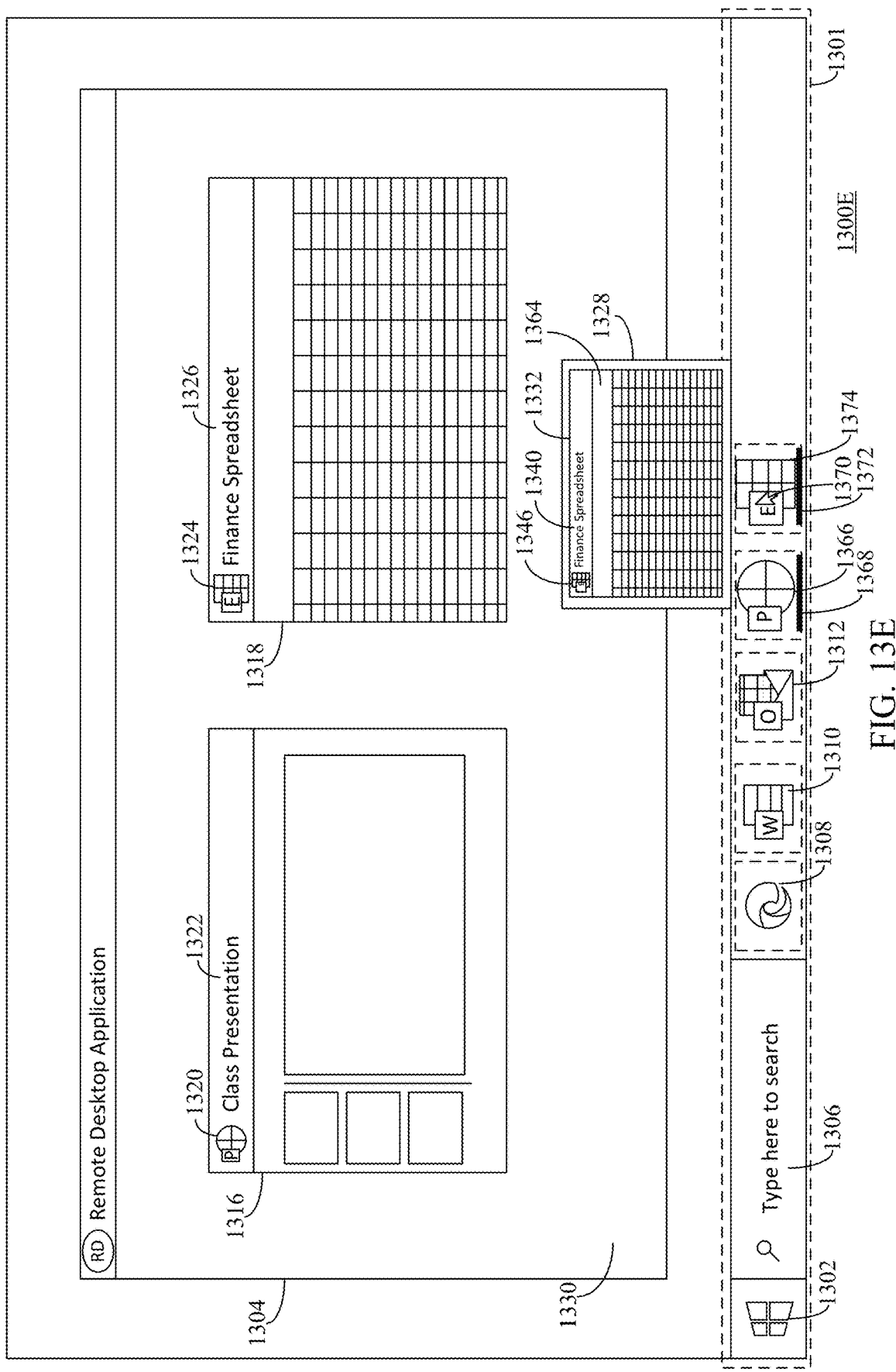

As described above, proxy windows for application windows associated with the presentation application or the spreadsheet application may be displayed via a tab preview feature. For instance, FIGS. 13D-13E depicts example GUI screens 1300D-1300E in which a tab preview feature is displayed via a taskbar in accordance with an embodiment. As shown in FIG. 13D, the operating system detects user input (e.g., hovering a cursor 1370 over application icon 1366 for a predetermined time period) that causes the operating system to activate tab preview feature 1328 via taskbar 1301. Tab preview feature 1328 may simultaneously display a proxy windows for each application window opened for the presentation application. In the example shown in FIG. 13D, only one application window (i.e., application window 1316) is opened for the presentation application. Therefore, a single proxy window (i.e., proxy window 1330) is displayed via tab preview feature 1328.

As shown in FIG. 13E, the operating system detects user input (e.g., hovering a cursor 1370 over application icon 1374 for a predetermined time period) that causes the operating system to activate tab preview feature 1328 via taskbar 1301. In the example shown in FIG. 13E, only one application window (i.e., application window 1318) is opened for the spreadsheet application. Therefore, a single proxy window (i.e., proxy window 1322) is displayed via tab preview feature 1328.

It is noted that the tab (or sub-view) display and manipulation techniques described above with respect to Subsections A-C may also be utilized for the foregoing embodiments. For instance, a user may be enabled to switch or close application windows via interaction with their corresponding proxy windows. Moreover, proxy windows for sub-views may be grouped in a similar manner as described above with reference to tab grouping in Subsections A-C.

It is further noted that the remote desktop application is not limited to client-based remote desktop applications. For instance, a user may instantiate a remote desktop application via a cloud-based environment. In such an embodiment, a user may navigate a browser application to a Web portal that enable the user to instantiate a remote desktop application via the cloud-based environment. In such an example, a separate application icon (e.g., application 1314) may not be displayed via taskbar 1301. Instead, the proxy windows for the sub-views associated with the remote desktop application may be presented in association with the browser application (e.g., application icon 1308).

III. Example Mobile and Stationary Device Embodiments

The systems and methods described above, including the proxy window generation and display techniques in reference to FIGS. 1-12, application 102, operating system 104, shared memory 116, application window 106, tab manager API 108, tabs 110, tab data model API 112, user interface 114, the GUIs described with reference to FIGS. 2A-3, application 502, operating system 504, application 518, shared memory 516, application window 506, tabs 510, tab manager API 508, application window 520, application window API 522, tab data model API 512, application window API 524, user interface 514, input detector 526, task switcher feature 528, the GUIs described with reference to FIGS. 6A-6H and 7A-7E, application 902, operating system 904, application window 906, tabs 910, tab manager API 908, shared memory 916, tab data model API 912, user interface 914, task switcher UI, input detector 926, tab preview feature 728, the GUIs described with reference to FIGS. 10A-10H, application 1202, operating system 1204, application 1218, shared memory 1216, application window 1206, tabs 1210, tab manager API 1208, application window 1220, application window API 1222, tab data model API 1212, application window API 1224, user interface 1214, task switcher feature 1228, input detector 1226, the GUIs described with reference to FIGS. 13A-13E and/or each of the components described therein, and flowcharts 400, 800, and/or 1100 may be implemented in hardware, or hardware combined with one or both of software and/or firmware. For example, application 102, operating system 104, shared memory 116, application window 106, tab manager API 108, tabs 110, tab data model API 112, user interface 114, the GUIs described with reference to FIGS. 2A-3, application 502, operating system 504, application 518, shared memory 516, application window 506, tabs 510, tab manager API 508, application window 520, application window API 522, tab data model API 512, application window API 524, user interface 514, input detector 526, task switcher feature 528, the GUIs described with reference to FIGS. 6A-6H and 7A-7E, application 902, operating system 904, application window 906, tabs 910, tab manager API 908, shared memory 916, tab data model API 912, user interface 914, task switcher UI, input detector 926, tab preview feature 728, the GUIs described with reference to FIGS. 10A-10H, application 1202, operating system 1204, application 1218, shared memory 1216, application window 1206, tabs 1210, tab manager API 1208, application window 1220, application window API 1222, tab data model API 1212, application window API 1224, user interface 1214, task switcher feature 1228, input detector 1226, the GUIs described with reference to FIGS. 13A-13E, and/or each of the components described therein, and flowcharts 400, 800, and/or 1100 may be each implemented as computer program code/instructions configured to be executed in one or more processors and stored in a computer readable storage medium. Alternatively, application 102, operating system 104, shared memory 116, application window 106, tab manager API 108, tabs 110, tab data model API 112, user interface 114, the GUIs described with reference to FIGS. 2A-3, application 502, operating system 504, application 518, shared memory 516, application window 506, tabs 510, tab manager API 508, application window 520, application window API 522, tab data model API 512, application window API 524, user interface 514, input detector 526, task switcher feature 528, the GUIs described with reference to FIGS. 6A-6H and 7A-7E, application 902, operating system 904, application window 906, tabs 910, tab manager API 908, shared memory 916, tab data model API 912, user interface 914, task switcher UI, input detector 926, tab preview feature 728, the GUIs described with reference to FIGS. 10A-10H, application 1202, operating system 1204, application 1218, shared memory 1216, application window 1206, tabs 1210, tab manager API 1208, application window 1220, application window API 1222, tab data model API 1212, application window API 1224, user interface 1214, task switcher feature 1228, input detector 1226, the GUIs described with reference to FIGS. 13A-13E, and/or each of the components described therein, and flowcharts 400, 800, and/or 1100 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 14:
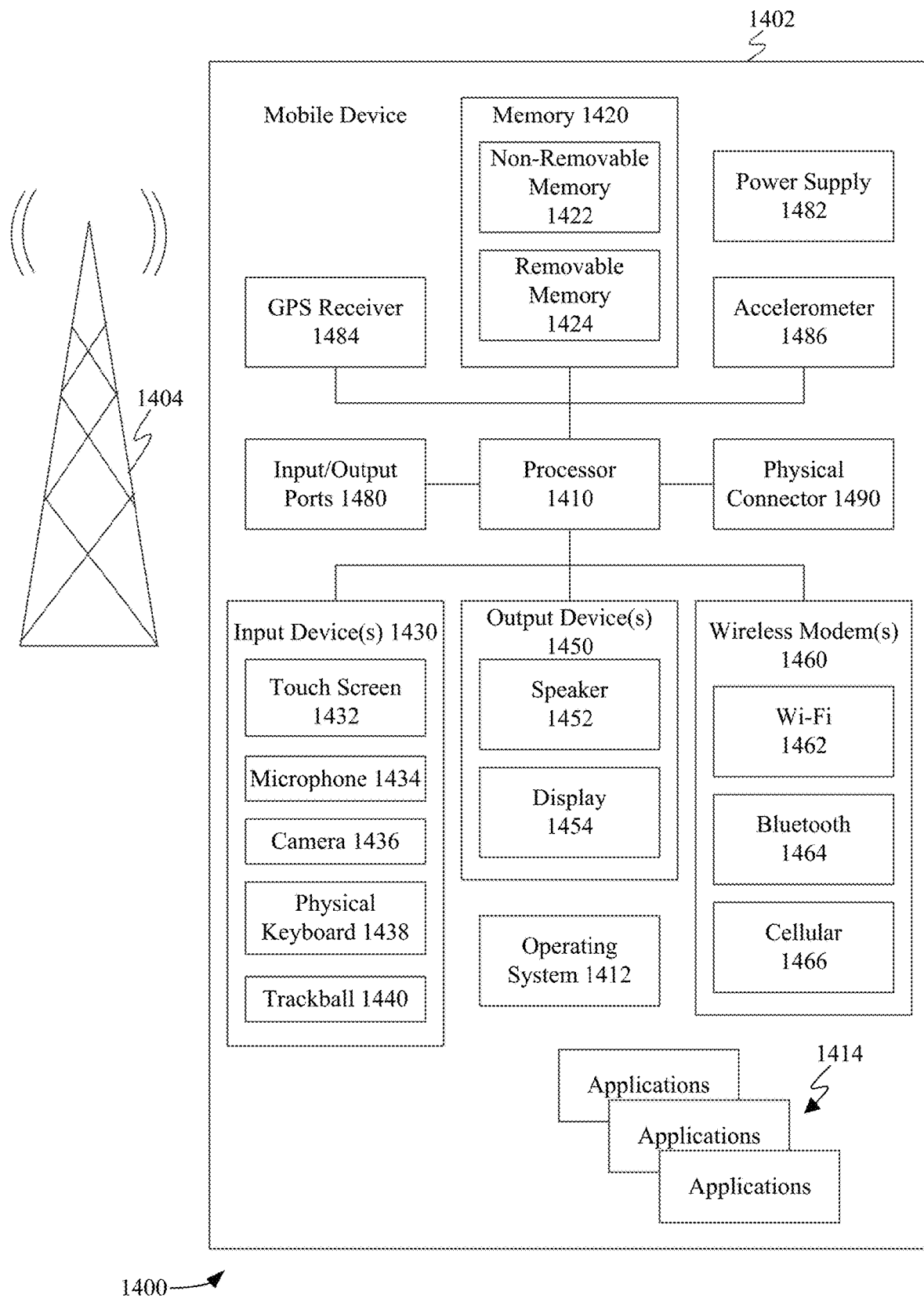
FIG. 14 is a block diagram of an exemplary user device in which embodiments may be implemented.

FIG. 14 shows a block diagram of an exemplary mobile device 1400 including a variety of optional hardware and software components, shown generally as components 1402. Any number and combination of the features/elements of application 102, operating system 104, shared memory 116, application window 106, tab manager API 108, tabs 110, tab data model API 112, user interface 114, the GUIs described with reference to FIGS. 2A-3, application 502, operating system 504, application 518, shared memory 516, application window 506, tabs 510, tab manager API 508, application window 520, application window API 522, tab data model API 512, application window API 524, user interface 514, input detector 526, task switcher feature 528, the GUIs described with reference to FIGS. 6A-6H and 7A-7E, application 902, operating system 904, application window 906, tabs 910, tab manager API 908, shared memory 916, tab data model API 912, user interface 914, task switcher UI, input detector 926, tab preview feature 728, the GUIs described with reference to FIGS. 10A-10H, application 1202, operating system 1204, application 1218, shared memory 1216, application window 1206, tabs 1210, tab manager API 1208, application window 1220, application window API 1222, tab data model API 1212, application window API 1224, user interface 1214, task switcher feature 1228, input detector 1226, the GUIs described with reference to FIGS. 13A-13E, and/or each of the components described therein, and flowcharts 400, 800, and/or 1100 may be implemented as components 1402 included in a mobile device embodiment, as well as additional and/or alternative features/elements, as would be known to persons skilled in the relevant art(s). It is noted that any of components 1402 can communicate with any other of components 1402, although not all connections are shown, for ease of illustration. Mobile device 1400 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 1404, such as a cellular or satellite network, or with a local area or wide area network.

The illustrated mobile device 1400 can include a controller or processor referred to as processor circuit 1410 for performing such tasks as signal coding, image processing, data processing, input/output processing, power control, and/or other functions. Processor circuit 1410 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1410 may execute program code stored in a computer readable medium, such as program code of one or more applications 1414, operating system 1412, any program code stored in memory 1420, etc. Operating system 1412 can control the allocation and usage of the components 1402 and support for one or more application programs 1414 (a.k.a. applications, "apps", etc.). Application programs 1414 can include common mobile computing applications (e.g., email applications, calendars, contact managers, web browsers, messaging applications) and any other computing applications (e.g., word processing applications, mapping applications, media player applications).

As illustrated, mobile device 1400 can include memory 1420. Memory 1420 can include non-removable memory 1422 and/or removable memory 1424. The non-removable memory 1422 can include RAM, ROM, flash memory, a hard disk, or other well-known memory storage technologies. The removable memory 1424 can include flash memory or a Subscriber Identity Module (SIM) card, which is well known in GSM communication systems, or other well-known memory storage technologies, such as "smart cards." The memory 1420 can be used for storing data and/or code for running operating system 1412 and applications 1414. Example data can include web pages, text, images, sound files, video data, or other data sets to be sent to and/or received from one or more network servers or other devices via one or more wired or wireless networks. Memory 1420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1420. These programs include operating system 1412, one or more application programs 1414, and other program modules and program data. Examples of such application programs or program modules may include, for example, computer program logic (e.g., computer program code or instructions) for implementing the systems and methods described above, including the embodiments described in reference to FIGS. 1-13E.

Mobile device 1400 can support one or more input devices 1430, such as a touch screen 1432, microphone 1434, camera 1436, physical keyboard 1438 and/or trackball 1440 and one or more output devices 1450, such as a speaker 1452 and a display 1454.

Other possible output devices (not shown) can include piezoelectric or other haptic output devices. Some devices can serve more than one input/output function. For example, touch screen 1432 and display 1454 can be combined in a single input/output device. The input devices 1430 can include a Natural User Interface (NUI).

Wireless modem(s) 1460 can be coupled to antenna(s) (not shown) and can support two-way communications between processor circuit 1410 and external devices, as is well understood in the art. The modem(s) 1460 are shown generically and can include a cellular modem 1466 for communicating with the mobile communication network 1404 and/or other radio-based modems (e.g., Bluetooth 1464 and/or Wi-Fi 1462). Cellular modem 1466 may be configured to enable phone calls (and optionally transmit data) according to any suitable communication standard or technology, such as GSM, 3G, 4G, 5G, etc. At least one of the wireless modem(s) 1460 is typically configured for communication with one or more cellular networks, such as a GSM network for data and voice communications within a single cellular network, between cellular networks, or between the mobile device and a public switched telephone network (PSTN).

Mobile device 1400 can further include at least one input/output port 1480, a power supply 1482, a satellite navigation system receiver 1484, such as a Global Positioning System (GPS) receiver, an accelerometer 1486, and/or a physical connector 1490, which can be a USB port, IEEE 1394 (FireWire) port, and/or RS-232 port. The illustrated components 1402 are not required or all-inclusive, as any components can be not present and other components can be additionally present as would be recognized by one skilled in the art.

Figure 15:
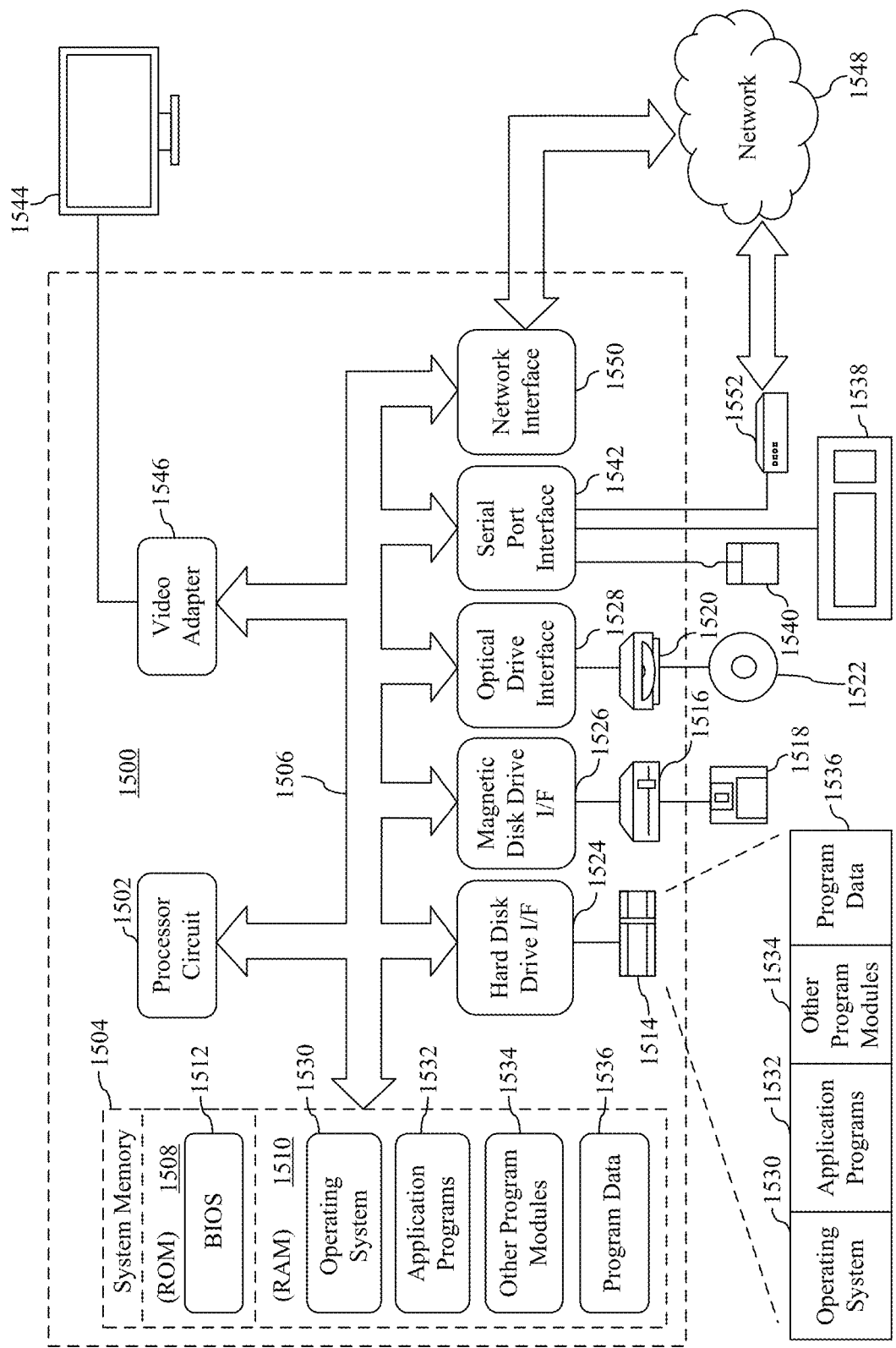
FIG. 15 is a block diagram of an example processor-based computer system that may be used to implement various embodiments.

Furthermore, FIG. 15 depicts an exemplary implementation of a computing device 1500 in which embodiments may be implemented, including application 102, operating system 104, shared memory 116, application window 106, tab manager API 108, tabs 110, tab data model API 112, user interface 114, the GUIs described with reference to FIGS. 2A-3, application 502, operating system 504, application 518, shared memory 516, application window 506, tabs 510, tab manager API 508, application window 520, application window API 522, tab data model API 512, application window API 524, user interface 514, input detector 526, task switcher feature 528, the GUIs described with reference to FIGS. 6A-6H and 7A-7E, application 902, operating system 904, application window 906, tabs 910, tab manager API 908, shared memory 916, tab data model API 912, user interface 914, task switcher UI, input detector 926, tab preview feature 728, the GUIs described with reference to FIGS. 10A-10H, application 1202, operating system 1204, application 1218, shared memory 1216, application window 1206, tabs 1210, tab manager API 1208, application window 1220, application window API 1222, tab data model API 1212, application window API 1224, user interface 1214, task switcher feature 1228, input detector 1226, the GUIs described with reference to FIGS. 13A-13E, and/or each of the components described therein, and flowcharts 400, 800, and/or 1100. The description of computing device 1500 provided herein is provided for purposes of illustration, and is not intended to be limiting. Embodiments may be implemented in further types of computer systems, as would be known to persons skilled in the relevant art(s).

As shown in FIG. 15, computing device 1500 includes one or more processors, referred to as processor circuit 1502, a system memory 1504, and a bus 1506 that couples various system components including system memory 1504 to processor circuit 1502. Processor circuit 1502 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1502 may execute program code stored in a computer readable medium, such as program code of operating system 1530, application programs 1532, other programs 1534, etc. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

Computing device 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMS, ROMs, and other hardware storage media.

A number of program modules may be stored on the hard disk, magnetic disk, optical disk, ROM, or RAM. These programs include operating system 1530, one or more application programs 1532, other programs 1534, and program data 1536. Application programs 1532 or other programs 1534 may include, for example, computer program logic (e.g., computer program code or instructions) for implementing the systems and methods described above, including the embodiments described above with reference to FIGS. 1-13E.

A user may enter commands and information into the computing device 1500 through input devices such as keyboard 1538 and pointing device 1540. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1502 through a serial port interface 1542 that is coupled to bus 1506, but may be connected by other interfaces, such as a parallel port, game port, or a universal serial bus (USB).

A display screen 1544 is also connected to bus 1506 via an interface, such as a video adapter 1546. Display screen 1544 may be external to, or incorporated in computing device 1500. Display screen 1544 may display information, as well as being a user interface for receiving user commands and/or other information (e.g., by touch, finger gestures, virtual keyboard, etc.). In addition to display screen 1544, computing device 1500 may include other peripheral output devices (not shown) such as speakers and printers.

Computing device 1500 is connected to a network 1548 (e.g., the Internet) through an adaptor or network interface 1550, a modem 1552, or other means for establishing communications over the network. Modem 1552, which may be internal or external, may be connected to bus 1506 via serial port interface 1542, as shown in FIG. 15, or may be connected to bus 1506 using another interface type, including a parallel interface.

As used herein, the terms "computer program medium," "computer-readable medium," and "computer-readable storage medium" are used to generally refer to physical hardware media such as the hard disk associated with hard disk drive 1514, removable magnetic disk 1518, removable optical disk 1522, other physical hardware media such as RAMs, ROMs, flash memory cards, digital video disks, zip disks, MEMs, nanotechnology-based storage devices, and further types of physical/tangible hardware storage media (including system memory 1504 of FIG. 15). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1532 and other programs 1534) may be stored on the hard disk, magnetic disk, optical disk, ROM, RAM, or other hardware storage medium. Such computer programs may also be received via network interface 1550, serial port interface 1552, or any other interface type. Such computer programs, when executed or loaded by an application, enable computing device 1500 to implement features of embodiments discussed herein. Accordingly, such computer programs represent controllers of the computing device 1500.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A method performed by an operating system executing on a computing device is described herein. The method comprises: detecting user input to initiate a simultaneous display, in a graphical user interface of the operating system, of a first application window of a first application and a second application window of a second application executing on the computing device; determining that the first application has a plurality of tabs opened in the first application window of the first application; and responsive to detecting the user input and determining that the first application has the plurality of tabs opened in the first application window of the first application, displaying, in the graphical user interface of the operating system, a respective first proxy window for each of the plurality of tabs simultaneously with a second proxy window for the second application window, each respective first proxy window representing contents displayed in its corresponding tab, the second proxy window representing contents displayed in the second application window of the second application In accordance with an embodiment of the foregoing method, each respective first proxy window comprises a thumbnail representative of the contents displayed in its corresponding tab, and wherein the second proxy window comprises a thumbnail representative of the contents displayed in the second application window.

In accordance with an embodiment of the foregoing method, each thumbnail is sized proportionally to the size of the first application window.

In accordance with an embodiment of the foregoing method, said determining comprises: receiving, via an application programming interface of the first application, a characteristic of the plurality of tabs, the characteristic comprising at least one of: a number of the plurality of tabs opened in the first application window; an icon representative of the first application; a group identifier for each of the plurality of tabs; a title associated with each of the plurality of tabs; the thumbnail for each of the plurality of tabs; an indication of a most recently-active tab of the plurality of tabs; a time stamp representative of a time at which each of the plurality of tabs was created; or a time stamp representative of a time at which each of the plurality of tabs was last active.

In accordance with an embodiment of the foregoing method, the method further comprises: providing a user interface element that enables a designation of an N most recently active tabs of the plurality of tabs to be represented via third proxy windows representing the contents displayed in the N most recently active tabs, wherein N is a positive integer greater than one.

In accordance with an embodiment of the foregoing method, the method further comprises: providing a user interface element that, when activated, causes the second proxy window to be hidden while maintaining the display of the first proxy windows.

In accordance with an embodiment of the foregoing method, the method further comprises: detecting user input to close a particular first proxy window of the first proxy windows; and responsive to detecting the user input to close the particular first proxy window of the first proxy windows, providing a command to the first application to close a tab of the plurality of tabs corresponding to the particular first proxy window.

Another method performed by an operating system executing on a computing device is described herein. The method comprises: detecting user input with respect to an icon pinned to a taskbar of a graphical user interface of the operating system; determining that an application associated with the icon has a plurality of tabs opened in an application window of the application; and responsive to detecting the user input and determining that the application associated with the icon has the plurality of tabs opened in the application window of the application, simultaneously displaying a respective proxy window for each of the plurality of tabs in the graphical user interface of the operating system, each respective proxy window representing contents displayed in its corresponding tab.

In accordance with an embodiment of the foregoing method, the icon pinned to the taskbar represents a Web site and comprises a favicon associated with a domain of the Web site.

In accordance with an embodiment of the foregoing method, said simultaneously displaying comprises simultaneously displaying a respective proxy window for each tab of the plurality of tabs that is associated with a same group identifier, the group identifier identifying that each said tab displays a Web site associated with the domain; and the respective proxy window, for each said tab, represents the contents of the Web site displayed in its corresponding tab.

In accordance with an embodiment of the foregoing method, the method further comprises providing a user interface element proximate to the icon, the user interface element indicating that the application is executing and that a Web site associated with the domain is displayed in at least one tab of the plurality of tabs.

In accordance with an embodiment of the foregoing method, each respective proxy window comprises a thumbnail representative of the contents displayed in its corresponding tab.

In accordance with an embodiment of the foregoing method, each proxy window comprises a thumbnail representative of the contents displayed in its corresponding tab.

In accordance with an embodiment of the foregoing method, said determining comprises: receiving, via an application programming interface of the application, a characteristic of the plurality of tabs, the characteristic comprising at least one of: a number of the plurality of tabs opened in the application window; an icon representative of the application; a title associated with each of the plurality of tabs; the group identifier for each of the plurality of tabs; the thumbnail for each of the plurality of tabs; an indication of a most recently-active tab of the plurality of tabs; a time stamp representative of a time at which each of the plurality of tabs was created; or a time stamp representative of a time at which each of the plurality of tabs was last active.

In accordance with an embodiment of the foregoing method, the method further comprises: detecting user input to close a particular proxy window of the proxy windows; and responsive to detecting the user input to close the particular proxy window of the proxy windows, providing a command to the application to close a tab of the plurality of tabs corresponding to the particular proxy window.

A further method performed by an operating system executing on a computing device is described herein. The method comprises: detecting user input that causes a first application window of a first application to be displayed in a first portion of a graphical user interface of the operating system; determining that a second application has a plurality of tabs opened in a second application window of the second application; and responsive to the first application window being displayed in the first portion of the graphical user interface of the operating system and determining that the second application has the plurality of tabs opened in the second application window of the second application, displaying, in a second portion of the graphical user interface of the operating system, a respective first proxy window for each of the plurality of tabs opened in the second application window, each respective first proxy window representing contents displayed in its corresponding tab.

In accordance with an embodiment of the foregoing method, each respective first proxy window comprises a thumbnail representative of the contents displayed in its corresponding tab.

In accordance with an embodiment of the foregoing method, each thumbnail is sized proportionally to the size of the second application window.

In accordance with an embodiment of the foregoing method, said determining comprises: receiving, via an application programming interface of the second application, a characteristic of the plurality of tabs, the characteristic comprising at least one of: a number of the plurality of tabs opened in the second application window; an icon representative of the second application; a group identifier for each of the plurality of tabs; a title associated with each of the plurality of tabs; the thumbnail for each of the plurality of tabs; an indication of a most recently-active tab of the plurality of tabs; a time stamp representative of a time at which each of the plurality of tabs was created; or a time stamp representative of a time at which each of the plurality of tabs was last active.

In accordance with an embodiment of the foregoing method, the method further comprises: displaying, in the second portion of the graphical user interface of the operating system, a second proxy window for a third application executing on the computing device simultaneously with the first proxy windows, the second proxy window representing the contents displayed in a third application window of the third application; and providing a user interface element that, when activated, causes the second proxy window to be hidden while maintaining the display of the first proxy windows.

In accordance with an embodiment of the foregoing method, the first portion comprises a first half of the graphical user interface of the operating system, and the second portion comprises a second half of the graphical user interface of the operating system.

In accordance with an embodiment of the foregoing method, the method further comprises: detecting user input to close a particular first proxy window of the first proxy windows; and responsive to detecting the user input to close the particular first proxy window of the first proxy windows, providing a command to the second application to close a tab of the plurality of tabs corresponding to the particular first proxy window.

A computing device is also described herein. The computing devices comprises at least one processor circuit; and at least one memory that stores program code configured to be executed by the at least one processor circuit. The program code comprises: an operating system configured to: detect user input that causes a first application window of a first application to be displayed in a first portion of a graphical user interface of the operating system; determine that a second application has a plurality of tabs opened in a second application window of the second application; and responsive to the first application window being displayed in the first portion of the graphical user interface of the operating system and determining that the second application has the plurality of tabs opened in the second application window of the second application, display, in a second portion of the graphical user interface of the operating system, a respective first proxy window for each of the plurality of tabs opened in the second application window, each respective first proxy window representing contents displayed in its corresponding tab.

In accordance with an embodiment of the foregoing computing device, each respective first proxy window comprises a thumbnail representative of the contents displayed in its corresponding tab.

In accordance with an embodiment of the foregoing computing device, each thumbnail is sized proportionally to the size of the second application window.

In accordance with an embodiment of the foregoing computing device, said determining comprises: receiving, via an application programming interface of the second application, a characteristic of the plurality of tabs, the characteristic comprising at least one of: a number of the plurality of tabs opened in the second application window; an icon representative of the second application; a group identifier for each of the plurality of tabs; a title associated with each of the plurality of tabs; the thumbnail for each of the plurality of tabs; an indication of a most recently-active tab of the plurality of tabs; a time stamp representative of a time at which each of the plurality of tabs was created; or a time stamp representative of a time at which each of the plurality of tabs was last active.

In accordance with an embodiment of the foregoing computing device, the operating system is further configured to: display, in the second portion of the graphical user interface of the operating system, a second proxy window for a third application executing on the computing device simultaneously with the first proxy windows, the second proxy window representing the contents displayed in a third application window of the third application; and provide a user interface element that, when activated, causes the second proxy window to be hidden while maintaining the display of the first proxy windows.

In accordance with an embodiment of the foregoing computing device, the first portion comprises a first half of the graphical user interface of the operating system, and the second portion comprises a second half of the graphical user interface of the operating system.

In accordance with an embodiment of the foregoing computing device, the operating system is further configured to: detect user input to close a particular first proxy window of the first proxy windows; and responsive to detecting the user input to close the particular first proxy window of the first proxy windows, provide a command to the second application to close a tab of the plurality of tabs corresponding to the particular first proxy window.

A computer-readable storage medium having program instructions recorded thereon that, when executed by at least one processor of a computing device perform a method is further described herein. The method comprises: detecting user input that causes a first application window of a first application to be displayed in a first portion of a graphical user interface of the operating system; determining that a second application has a plurality of tabs opened in a second application window of the second application; and responsive to the first application window being displayed in the first portion of the graphical user interface of the operating system and determining that the second application has the plurality of tabs opened in the second application window of the second application, displaying, in a second portion of the graphical user interface of the operating system, a respective first proxy window for each of the plurality of tabs opened in the second application window, each respective first proxy window representing contents displayed in its corresponding tab.

In accordance with an embodiment of the computer-readable storage medium, each respective first proxy window comprises a thumbnail representative of the contents displayed in its corresponding tab.

In accordance with an embodiment of the computer-readable storage medium, each thumbnail is sized proportionally to the size of the second application window.

In accordance with an embodiment of the computer-readable storage medium, said determining comprises: receiving, via an application programming interface of the second application, a characteristic of the plurality of tabs, the characteristic comprising at least one of: a number of the plurality of tabs opened in the second application window; an icon representative of the second application; a group identifier for each of the plurality of tabs; a title associated with each of the plurality of tabs; the thumbnail for each of the plurality of tabs; an indication of a most recently-active tab of the plurality of tabs; a time stamp representative of a time at which each of the plurality of tabs was created; or a time stamp representative of a time at which each of the plurality of tabs was last active.

In accordance with an embodiment of the computer-readable storage medium, the method further comprises: displaying, in the second portion of the graphical user interface of the operating system, a second proxy window for a third application executing on the computing device simultaneously with the first proxy windows, the second proxy window representing the contents displayed in a third application window of the third application; and providing a user interface element that, when activated, causes the second proxy window to be hidden while maintaining the display of the first proxy windows.

In accordance with an embodiment of the computer-readable storage medium, the first portion comprises a first half of the graphical user interface of the operating system, and the second portion comprises a second half of the graphical user interface of the operating system.

V. CONCLUSION

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A method performed by an operating system executing on a computing device, comprising:
   detecting user input that causes a first application window of a first application to be maximized in a first portion of a desktop of a graphical user interface of the operating system;

determining that a second application has a plurality of tabs opened in a second application window of the second application; and responsive to the first application window being maximized in the first portion of the desktop of the graphical user interface of the operating system and determining that the second application has the plurality of tabs opened in the second application window of the second application, simultaneously displaying, in a second portion of the desktop of the graphical user interface of the operating system, a respective first proxy window for each of the plurality of tabs opened in the second application window, each respective first proxy window representing contents displayed in its corresponding tab.

2. The method of claim 1, wherein each respective first proxy window comprises a thumbnail representative of the contents displayed in its corresponding tab.

3. The method of claim 2, wherein each thumbnail is sized proportionally to the size of the second application window.

4. The method of claim 2, wherein said determining comprises:
receiving, via an application programming interface of the second application, a characteristic of the plurality of tabs, the characteristic comprising at least one of:
a number of the plurality of tabs opened in the second application window;
an icon representative of the second application;
a group identifier for each of the plurality of tabs;
a title associated with each of the plurality of tabs;
the thumbnail for each of the plurality of tabs;
an indication of a most recently-active tab of the plurality of tabs;
a time stamp representative of a time at which each of the plurality of tabs was created; or
a time stamp representative of a time at which each of the plurality of tabs was last active.

5. The method of claim 4, wherein a group of tabs of the plurality of tabs each has a same group identifier, and
wherein the displaying the respective first proxy window for each of the plurality of tabs opened in the second application window comprises displaying a representative proxy window for the group of tabs.

6. The method of claim 1, further comprising:
displaying, in the second portion of the graphical user interface of the operating system, a second proxy window for a third application executing on the computing device simultaneously with the first proxy windows, the second proxy window representing the contents displayed in a third application window of the third application; and
providing a user interface element that, when activated, causes the second proxy window to be hidden while maintaining the display of the first proxy windows.

7. The method of claim 1, further comprising:
responsive to detecting user input corresponding to a selection of a respective first proxy window for a selected tab of the plurality of tabs opened in the second application window, displaying the selected tab in the second portion of the graphical user interface of the operating system.

8. A computing device comprising:
a processor circuit; and
memory storing instructions that, when executed by the processor circuit, cause the processor circuit to:
detect user input that causes a first application window of a first application to be maximized in a first portion of a desktop of a graphical user interface of an operating system running on the computing device;
determine that a second application has a plurality of tabs opened in a second application window of the second application; and
responsive to the first application window being maximized in the first portion of the desktop of the graphical user interface of the operating system and determining that the second application has the plurality of tabs opened in the second application window of the second application, simultaneously display, in a second portion of the desktop of the graphical user interface of the operating system, a respective first proxy window for each of the plurality of tabs opened in the second application window, each respective first proxy window representing contents displayed in its corresponding tab.

9. The computing device of claim 8, wherein each respective first proxy window comprises a thumbnail representative of the contents displayed in its corresponding tab.

10. The computing device of claim 9, wherein each thumbnail is sized proportionally to the size of the second application window.

11. The computing device of claim 9, wherein the instructions to determine that the second application has the plurality of tabs opened in the second application window of the second application comprise instructions that, when executed by the processor circuit, cause the processor circuit to:
receive, via an application programming interface of the second application, a characteristic of the plurality of tabs, the characteristic comprising at least one of:
a number of the plurality of tabs opened in the second application window;
an icon representative of the second application;
a group identifier for each of the plurality of tabs;
a title associated with each of the plurality of tabs;
the thumbnail for each of the plurality of tabs;
an indication of a most recently-active tab of the plurality of tabs;
a time stamp representative of a time at which each of the plurality of tabs was created; or
a time stamp representative of a time at which each of the plurality of tabs was last active.

12. The computing device of claim 11, wherein a group of tabs of the plurality of tabs each has a same group identifier, and
wherein the displaying the respective first proxy window for each of the plurality of tabs opened in the second application window comprises displaying a representative proxy window for the group of tabs.

13. The computing device of claim 8, wherein the memory further stores instructions that, when executed by the processor circuit, cause the processor circuit to:
display, in the second portion of the graphical user interface of the operating system, a second proxy window for a third application executing on the computing device simultaneously with the first proxy windows, the second proxy window representing the contents displayed in a third application window of the third application; and
provide a user interface element that, when activated, causes the second proxy window to be hidden while maintaining the display of the first proxy windows.

14. The computing device of claim 8, wherein the memory further stores instructions that, when executed by the processor circuit, cause the processor circuit to:
responsive to detecting user input corresponding to a selection of a respective first proxy window for a selected tab of the plurality of tabs opened in the second application window, display the selected tab in the second portion of the graphical user interface of the operating system.

15. A computer-readable storage medium storing instructions that, when executed by a processor circuit, cause the processor circuit to:
detect user input that causes a first application window of a first application to be maximized in a first portion of a desktop of a graphical user interface of an operating system running on a computing device;
determine that a second application has a plurality of tabs opened in a second application window of the second application; and
responsive to the first application window being maximized in the first portion of the desktop of the graphical user interface of the operating system and determining that the second application has the plurality of tabs opened in the second application window of the second application, simultaneously display, in a second portion of the desktop of the graphical user interface of the operating system, a respective first proxy window for each of the plurality of tabs opened in the second application window, each respective first proxy window representing contents displayed in its corresponding tab.

16. The computer-readable storage medium of claim 15, wherein each respective first proxy window comprises a thumbnail representative of the contents displayed in its corresponding tab.

17. The computer-readable storage medium of claim 16, wherein each thumbnail is sized proportionally to the size of the second application window.

18. The computer-readable storage medium of claim 16, wherein the instructions to determine that the second application has the plurality of tabs opened in the second application window of the second application comprise instructions that, when executed by the processor circuit, cause the processor circuit to:
receive, via an application programming interface of the second application, a characteristic of the plurality of tabs, the characteristic comprising at least one of:
a number of the plurality of tabs opened in the second application window;
an icon representative of the second application;
a group identifier for each of the plurality of tabs;
a title associated with each of the plurality of tabs;
the thumbnail for each of the plurality of tabs;
an indication of a most recently-active tab of the plurality of tabs;
a time stamp representative of a time at which each of the plurality of tabs was created; or
a time stamp representative of a time at which each of the plurality of tabs was last active.

19. The computer-readable storage medium of claim 15, further storing instructions that, when executed by the processor circuit, cause the processor circuit to:
display, in the second portion of the graphical user interface of the operating system, a second proxy window for a third application executing on the computing device simultaneously with the first proxy windows, the second proxy window representing the contents displayed in a third application window of the third application; and
provide a user interface element that, when activated, causes the second proxy window to be hidden while maintaining the display of the first proxy windows.

20. The computer-readable storage medium of claim 15, further storing instructions that, when executed by the processor circuit, cause the processor circuit to:
responsive to detecting user input corresponding to a selection of a respective first proxy window for a selected tab of the plurality of tabs opened in the second application window, display the selected tab in the second portion of the graphical user interface of the operating system.

* * * * *